United States Patent
Wang

(10) Patent No.: US 11,495,953 B2
(45) Date of Patent: Nov. 8, 2022

(54) ENCLOSURE FOR CABLE DISTRIBUTION ASSEMBLY

(71) Applicant: CommScope Technologies LLC, Hickory, NC (US)

(72) Inventor: Chi-Ming Wang, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 62 days.

(21) Appl. No.: 17/072,875

(22) Filed: Oct. 16, 2020

(65) Prior Publication Data
US 2021/0104881 A1 Apr. 8, 2021

Related U.S. Application Data

(63) Continuation of application No. 16/376,255, filed on Apr. 5, 2019, now Pat. No. 10,819,096, which is a (Continued)

(51) Int. Cl.
*G02B 6/44* (2006.01)
*H02G 3/08* (2006.01)
(Continued)

(52) U.S. Cl.
CPC .............. *H02G 3/18* (2013.01); *G02B 6/4416* (2013.01); *G02B 6/4471* (2013.01); *H02G 3/088* (2013.01); *H02G 9/02* (2013.01); *H02G 3/0493* (2013.01)

(58) Field of Classification Search
CPC ............ H02G 3/18; H02G 3/088; H02G 9/02; H02G 3/0493; G02B 6/4416; G02B 6/4471
See application file for complete search history.

(56) References Cited

U.S. PATENT DOCUMENTS 5,938,462 A 8/1999 Wilson et al.
5,984,728 A 11/1999 Chen
(Continued)

FOREIGN PATENT DOCUMENTS

CN 1981226 A 6/2007
CN 101095072 A 12/2007
(Continued)

OTHER PUBLICATIONS

Canford Catkit Ethercon Stage Patchbox, [online], [retrieved on Sep. 24, 2019]. Retrieved from Internet, https://www.canford.eo.uk/Products/2009575/49-880_CANFORD-CATKIT-ETHERCON- -STAGE-PATCHBOX-4-way-4x-Ethercon-to-4x-Ethercon.
(Continued)

*Primary Examiner* — Sung H Pak
(74) *Attorney, Agent, or Firm* — Merchant & Gould P.C.

(57) ABSTRACT

An enclosure for breaking out a trunk cable includes: a base having a generally flat surface adapted for mounting to a mounting surface; a shell having a front and two side walls extending from opposite sides of the front and two opposed end walls, the side walls of the shell mounted to the base to form a cavity; a plurality of connectors mounted to each of the side walls; and a trunk cable routed into the cavity through one of the end walls, the trunk cable comprising a plurality of power conductors and/or a plurality of optical fibers. The power conductors and the optical fibers are connected with respective ones of the plurality of connectors.

20 Claims, 61 Drawing Sheets

Related U.S. Application Data continuation of application No. 15/670,484, filed on Aug. 7, 2017, now Pat. No. 10,263,406, which is a continuation of application No. 15/071,620, filed on Mar. 16, 2016, now Pat. No. 9,742,176.

(60) Provisional application No. 62/189,425, filed on Jul. 7, 2015, provisional application No. 62/174,951, filed on Jun. 12, 2015, provisional application No. 62/133,936, filed on Mar. 16, 2015.

(51) Int. Cl.
*H02G 3/18* (2006.01)
*H02G 9/02* (2006.01)
*H02G 3/04* (2006.01)

(56) References Cited

U.S. PATENT DOCUMENTS

| | | | |
|---|---|---|---|
| D443,248 S | 6/2001 | Sakasegawa | |
| D538,742 S | 3/2007 | Pickvet et al. | |
| D549,656 S | 8/2007 | Hsiao | |
| 7,292,763 B2 | 11/2007 | Smith | |
| RE40,358 E | 6/2008 | Thompson | |
| 7,477,824 B2 | 1/2009 | Reagan et al. | |
| 7,489,849 B2 | 2/2009 | Reagan et al. | |
| 7,805,044 B2 | 9/2010 | Reagan et al. | |
| 7,844,158 B2 | 11/2010 | Gronvall | |
| 8,275,228 B2 | 9/2012 | Livingston et al. | |
| 8,532,490 B2 | 9/2013 | Smith et al. | |
| 8,565,571 B2 | 10/2013 | Kimbrell | |
| 8,792,767 B2 | 7/2014 | Fabrykowski | |
| 8,929,740 B2 | 1/2015 | Smith | |
| 9,069,151 B2 | 6/2015 | Conner | |
| 9,078,287 B2 | 7/2015 | Khemakhem | |
| 9,106,981 B2 | 8/2015 | Vastmans et al. | |
| 9,466,962 B1 | 10/2016 | Gretz | |
| 9,742,176 B2 * | 8/2017 | Wang | H02G 3/088 |
| D809,406 S | 2/2018 | Seo et al. | |
| D825,471 S | 8/2018 | Wang | |
| 10,263,406 B2 | 4/2019 | Wang | |
| D875,050 S | 2/2020 | Cheng | |
| D876,364 S | 2/2020 | Wang | |
| D876,367 S | 2/2020 | Wang | |
| 10,819,096 B2 | 10/2020 | Wang | |
| D924,807 S | 7/2021 | Bao | |
| D931,220 S | 9/2021 | Wang | |
| D944,743 S | 3/2022 | Wang | |
| D945,373 S | 3/2022 | Wang | |
| 2005/0163448 A1 | 7/2005 | Blackwell, Jr. et al. | |
| 2005/0175307 A1 | 8/2005 | Battey et al. | |
| 2005/0213921 A1 | 9/2005 | Mertesdorf et al. | |
| 2006/0093303 A1 | 5/2006 | Reagan et al. | |
| 2006/0153516 A1 | 7/2006 | Napiorkowski | |
| 2008/0191831 A1 | 8/2008 | Matyas et al. | |
| 2009/0134915 A1 | 5/2009 | Hwang et al. | |
| 2013/0084050 A1 | 4/2013 | Vastmans et al. | |
| 2013/0108227 A1 * | 5/2013 | Conner | G02B 6/4471 385/101 |
| 2014/0105539 A1 | 4/2014 | Conner et al. | |
| 2014/0199079 A1 | 7/2014 | Smith et al. | |
| 2015/0219856 A1 | 8/2015 | Wang | |
| 2016/0276817 A1 | 9/2016 | Wang | |
| 2017/0141563 A1 | 5/2017 | Islam et al. | |
| 2021/0091481 A1 | 3/2021 | Fermelis et al. | |

FOREIGN PATENT DOCUMENTS

| | | |
|---|---|---|
| CN | 104041066 A | 9/2014 |
| WO | 2013/063045 | 5/2013 |
| WO | 2014/158369 | 10/2014 |

OTHER PUBLICATIONS

Chinese Office Action corresponding to Chinese Application No. 201680028436.9 dated May 23, 2019.

European Examination Report corresponding to European Application No. 16765637.0 dated Sep. 25, 2019.

European Search Report corresponding to European Application No. 16765637.0 dated Nov. 23, 2018.

PCT International Search Report and Written Opinion for corresponding PCT Application No. PCT/US2016/022600, dated Jun. 27, 2016.

PCT Notification Concerning Transmittal of International Preliminary Report on Patentability for corresponding PCT Application No. PCT/US2016/022600 dated Sep. 28, 2017.

Australian Exam Report in Application 2016233370, dated Jun. 10, 2020, 4 pages.

Chinese Office Action in Application 202010184543.9, dated Nov. 20, 2020, 14 pgs.

Australian Exam Report in Application 2021200449, dated Feb. 24, 2022, 3 pages.

* cited by examiner

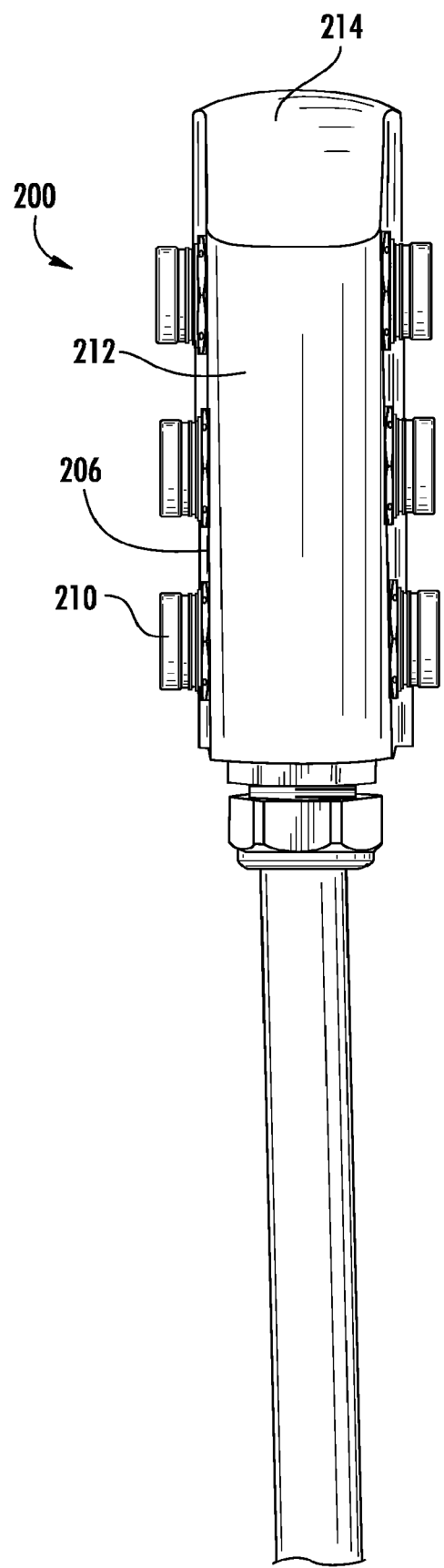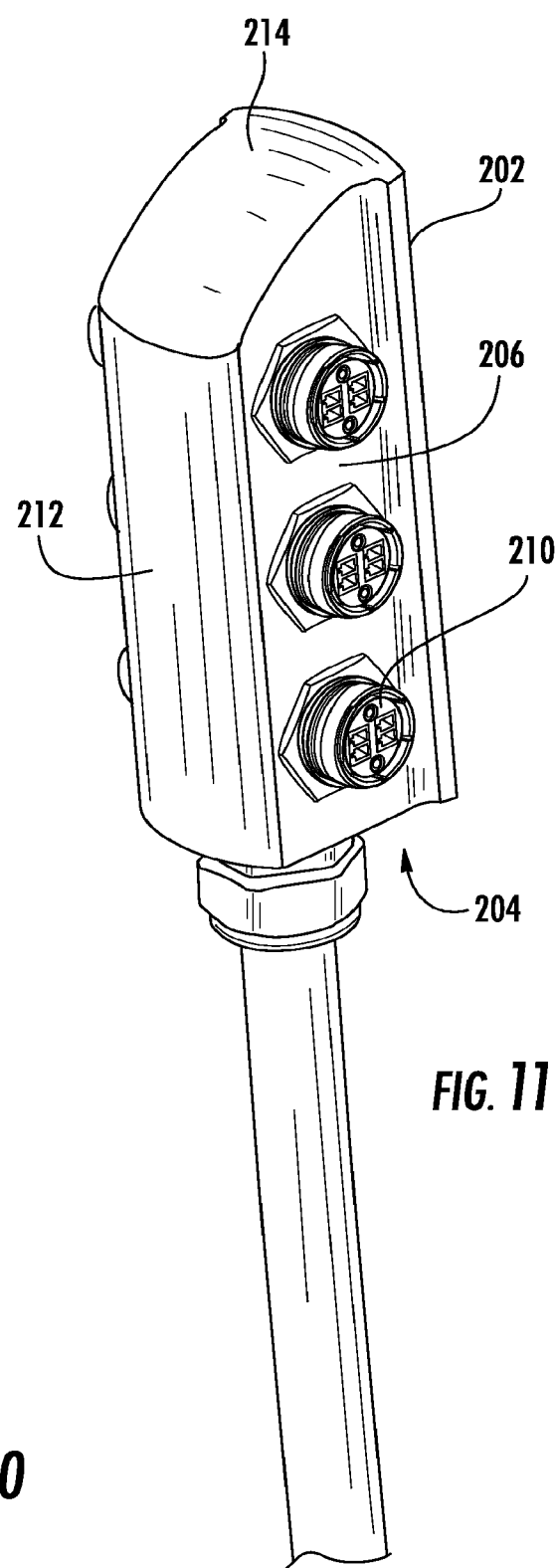
FIG. 10
FIG. 11

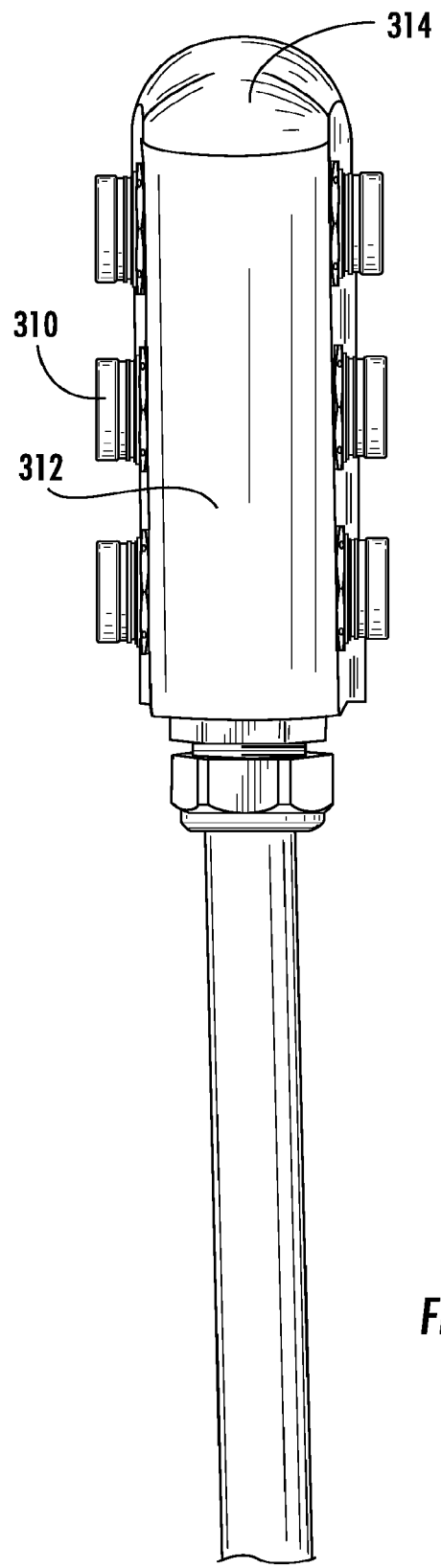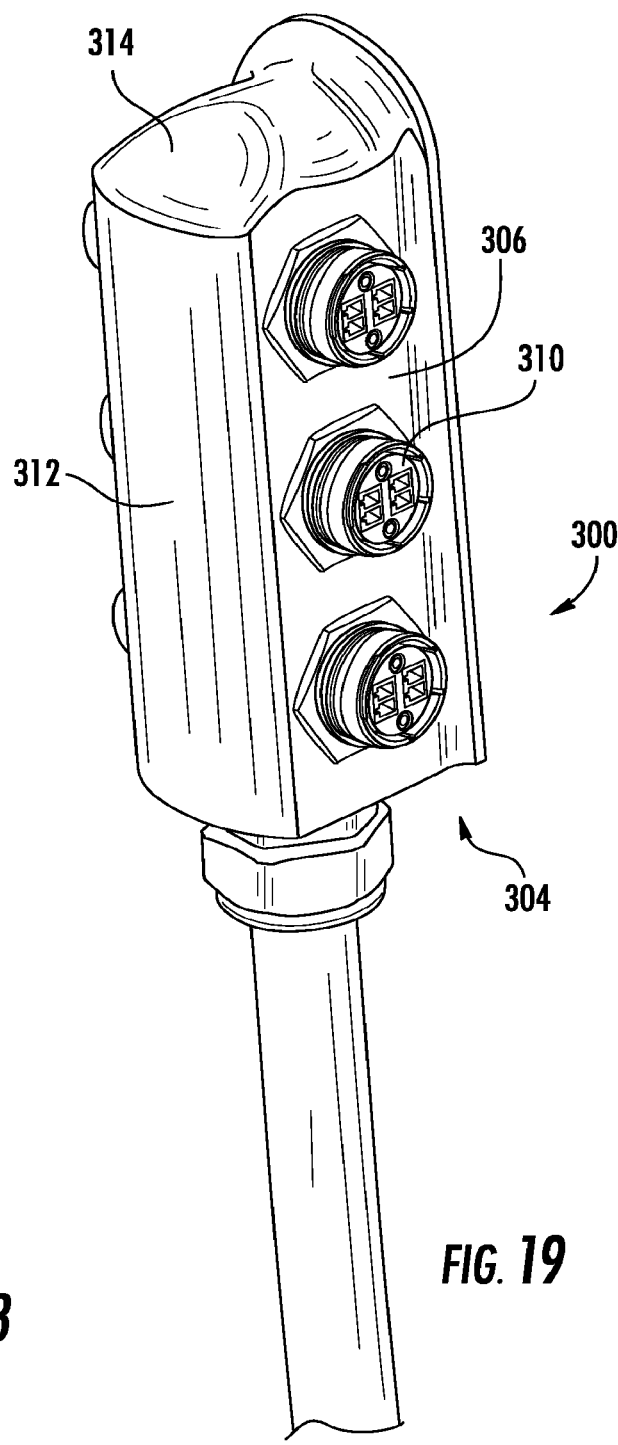
FIG. 18
FIG. 19

ENCLOSURE FOR CABLE DISTRIBUTION ASSEMBLY

RELATED APPLICATIONS

The present application is a continuation of and claims priority to U.S. patent application Ser. No. 16/376,255, filed Apr. 5, 2019, now U.S. Pat. No. 10,819,096, which is a continuation of and claims priority to U.S. patent application Ser. No. 15/670,484, filed Aug. 7, 2017, now U.S. Pat. No. 10,263,406, which is a continuation of and claims priority to U.S. patent application Ser. No. 15/071,620, filed Mar. 16, 2016, now U.S. Pat. No. 9,742,176, and claims priority from and the benefit of U.S. Provisional Patent Application Nos. 62/133,936, filed Mar. 16, 2015; 62/174,951, filed Jun. 12, 2015; and 62/189,425, filed Jul. 7, 2015, the disclosures of which are hereby incorporated herein by reference in their entirety.

FIELD OF THE INVENTION

The present invention relates to an outdoor enclosure for receiving at least one input cable and for presenting multiple connectors. More particularly, the present invention is suitable for employment on an antenna tower, with an input cable extending up the tower and the connectors presenting fiber optic and/or power receptacles for receiving mating fiber optic and/or power connectors of tower-mounted equipment.

BACKGROUND

Background art can be seen in U.S. Pat. Nos. 7,477,824, 7,489,849, 7,805,044, 8,275,228 and 8,532,490, and U.S. Published Patent Application Nos. 2005/0163448 and 2005/0175307, each of which is herein incorporated by reference.

SUMMARY

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

As a first aspect, embodiments of the invention are directed to an enclosure for breaking out a trunk cable, comprising: a base having a generally flat surface adapted for mounting to a mounting surface; a shell having a front and two side walls extending from opposite sides of the front and two opposed end walls, the side walls of the shell mounted to the base to form a cavity; a plurality of connectors mounted to each of the side walls; and a trunk cable routed into the cavity through one of the end walls, the trunk cable comprising a plurality of power conductors and/or a plurality of optical fibers. The power conductors and the optical fibers are connected with respective ones of the plurality of connectors.

As a second aspect, embodiments of the invention are directed to an assembly enclosure for breaking out a trunk cable, comprising: a base having a generally flat surface adapted for mounting to a mounting surface; a shell having a front and two side walls extending from opposite sides of the front and two opposed end walls, the side walls of the shell mounted to the base to form a cavity; a plurality of connectors mounted to each of the side walls; and a trunk cable routed into the cavity through one of the end walls, the trunk cable comprising a plurality of power conductors and/or a plurality of optical fibers; the power conductors and the optical fibers being connected with respective ones of the plurality of connectors; wherein each of the side walls is disposed at an oblique angle to the flat surface of the base. Each of the side walls is disposed at an oblique angle to the flat surface of the base. The front comprises a rounded profile that merges with the side walls. The front includes no connectors mounted thereon.

As a third aspect, embodiments of the invention are directed to an assembly enclosure for breaking out a trunk cable, comprising: a base having a generally flat surface adapted for mounting to a mounting surface; a shell having a front and two side walls extending from opposite sides of the front and two opposed end walls, the side walls of the shell mounted to the base to form a cavity; a plurality of connectors mounted to each of the side walls; and a trunk cable routed into the cavity through one of the end walls, the trunk cable comprising a plurality of power conductors and/or a plurality of optical fibers; the power conductors and the optical fibers being connected with respective ones of the plurality of connectors. The front comprises a flat surface on which connectors are mounted.

BRIEF DESCRIPTION OF THE DRAWINGS

The present invention will become more fully understood from the detailed description given hereinbelow and the accompanying drawings which are given by way of illustration only, and thus, are not limits of the present invention.

FIGS. 10-17 are various views of an enclosure according to additional embodiments of the invention.

FIGS. 18-25 are various views of the enclosure of FIG. 1.

DETAILED DESCRIPTION OF EMBODIMENTS OF THE INVENTION

Figure 1:
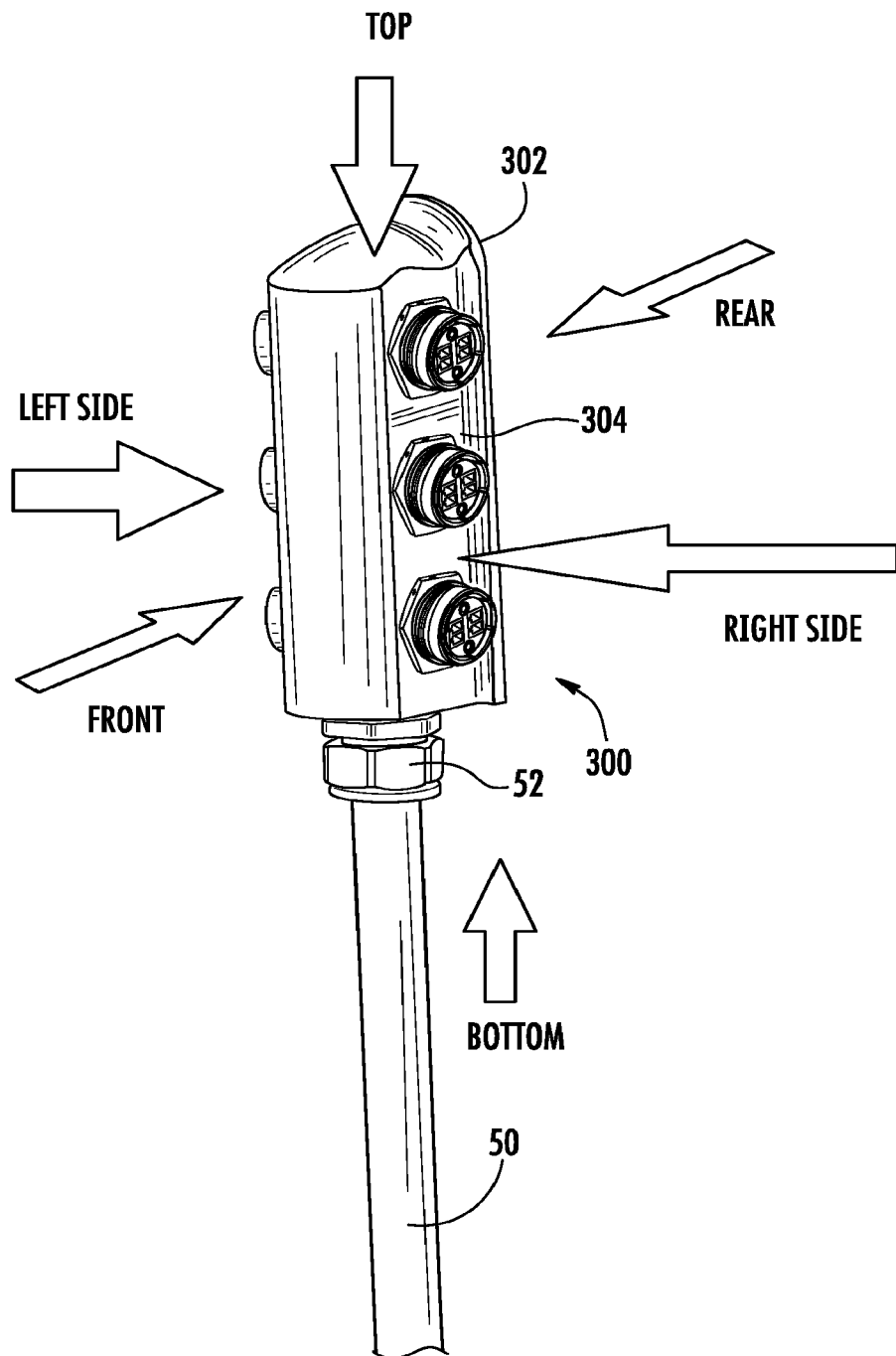
FIG. 1 is a perspective view of an enclosure for distribution of the power conductors and optical fibers of a hybrid trunk cable according to embodiments of the invention that illustrates the definitions of directional terms.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

The present invention offers a series of designs for enclosures, which may be formed by an injection/thermal molding process, but not limited to such a process. Such enclosures may be well-suited for the transition of a cable (such as a hybrid power/fiber cable, which has multiple power conductors and multiple optical fibers to be distributed) to RRUs, antennas, and other electronic and/or communications equipment on the top of an antenna tower or similar structure.

In one embodiment of the present invention, the enclosure moves away from the prior use of a base enclosure mounted to a support and lid mounted to the base enclosure. Instead, enclosures according to embodiments of the present invention essentially flip or reverse the roles of the base and the lid, such that the enclosure is mounted to an apparatus or support via the lid (now a "base"). In other words, a base with a flat panel/surface is mounted to the support, and is covered by a shell, on which connectors are mounted. This kind of arrangement can allow for a lot of design freedom, as designers are no longer locked into a flat shape at the opening of the enclosure. This also allows for easier interior access and assembly (particularly on versions having angled shells). FIG. 1 shows the base 302 and shell 304 (labeled "front") of an exemplary enclosure 300, and also illustrates the spatial terms top, bottom, front, rear, right and left.

The enclosures may optionally use hybrid (i.e., multimedia), power, or fiber connectors, which are more robust to the environment and allow for more vulnerable positioning, e.g., at places other than at the bottom of the enclosure. The connectors are connected to the power conductors and/or optical fibers of the trunk cable within the enclosure.

With features of the present invention, different design concepts are enabled to better utilize the enclosure space and make things easier for the installers. Several embodiments illustrating the various potential designs in accordance the present invention follow. Each design is sleek, has a smaller tower footprint, decreased windload, and may be easier to install than the enclosures of the prior art.

Figure 2:
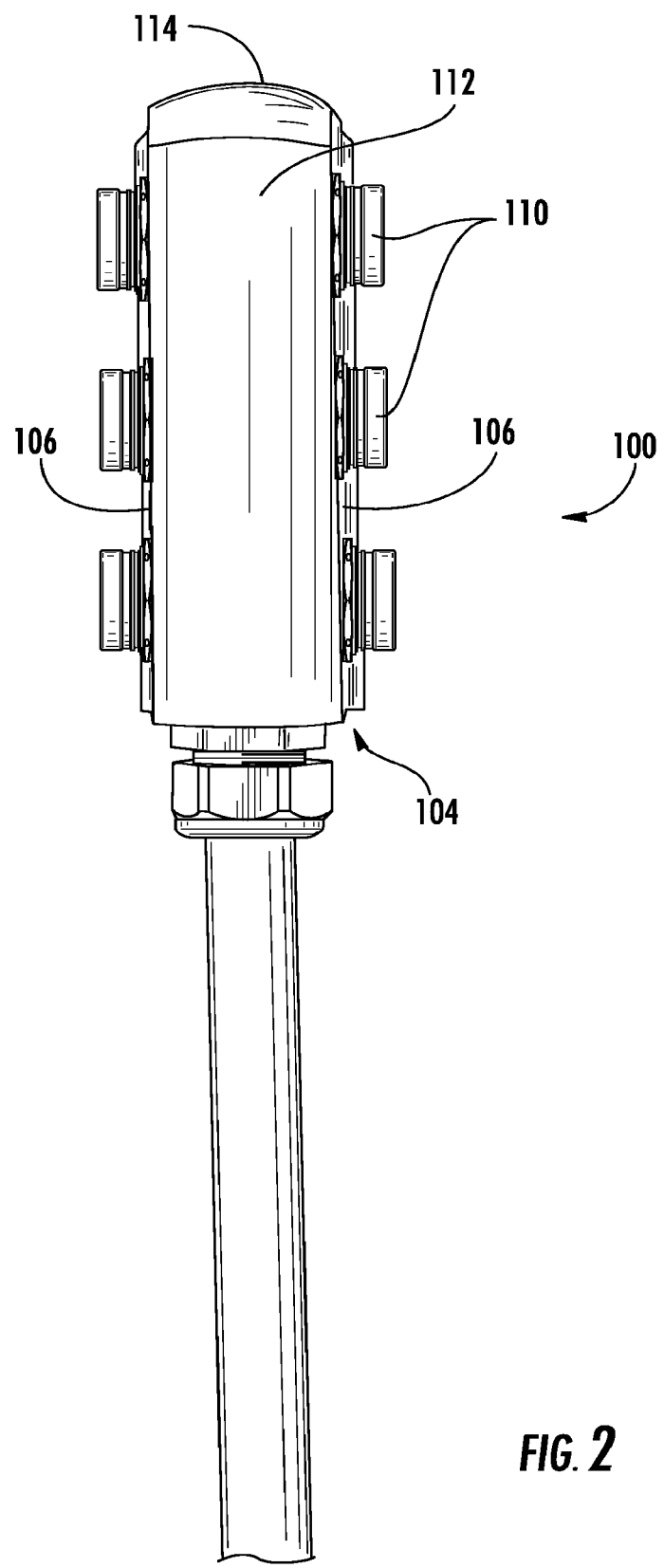
FIGS. 2-9 are various views of an enclosure according to alternative embodiments of the invention.
Figure 3:
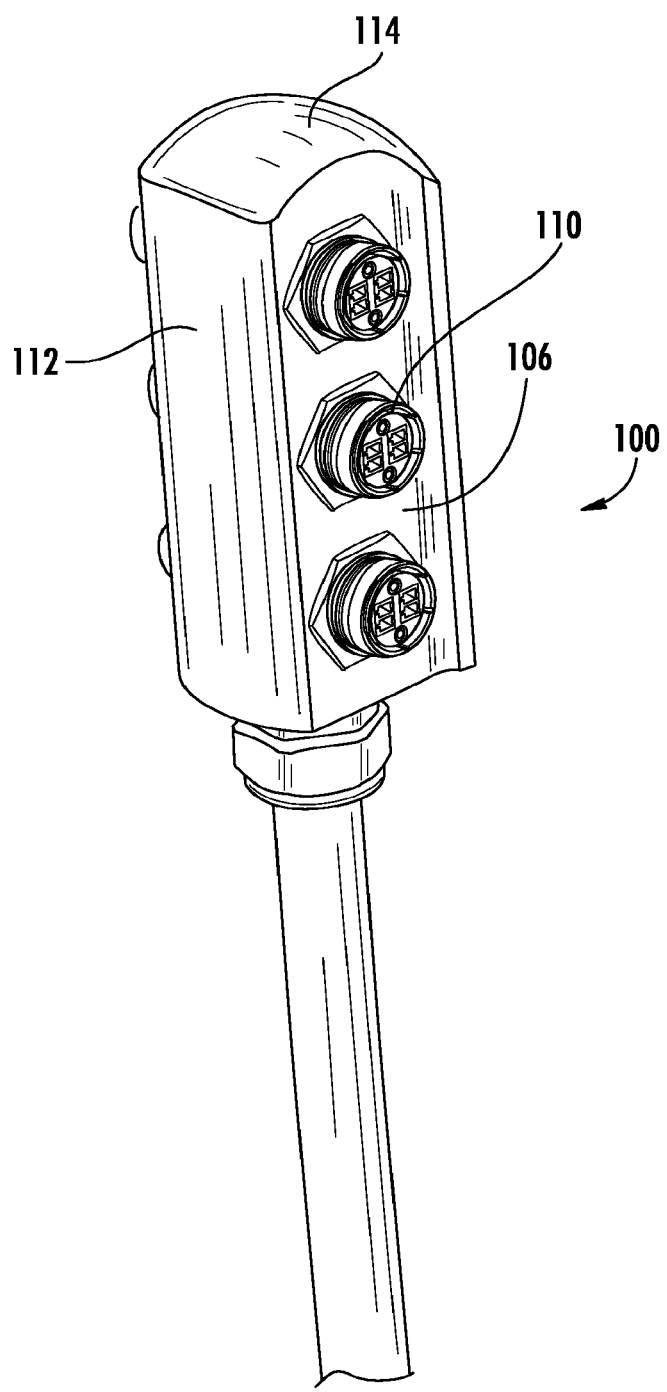
Figure 4:
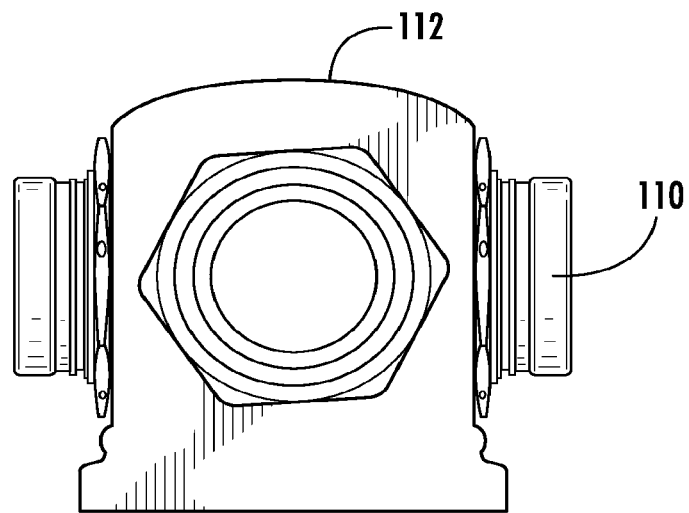
Figure 5:
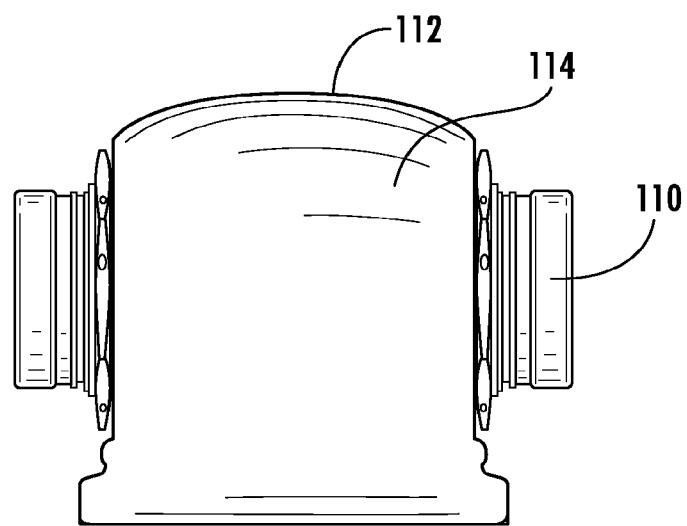
Figure 6:
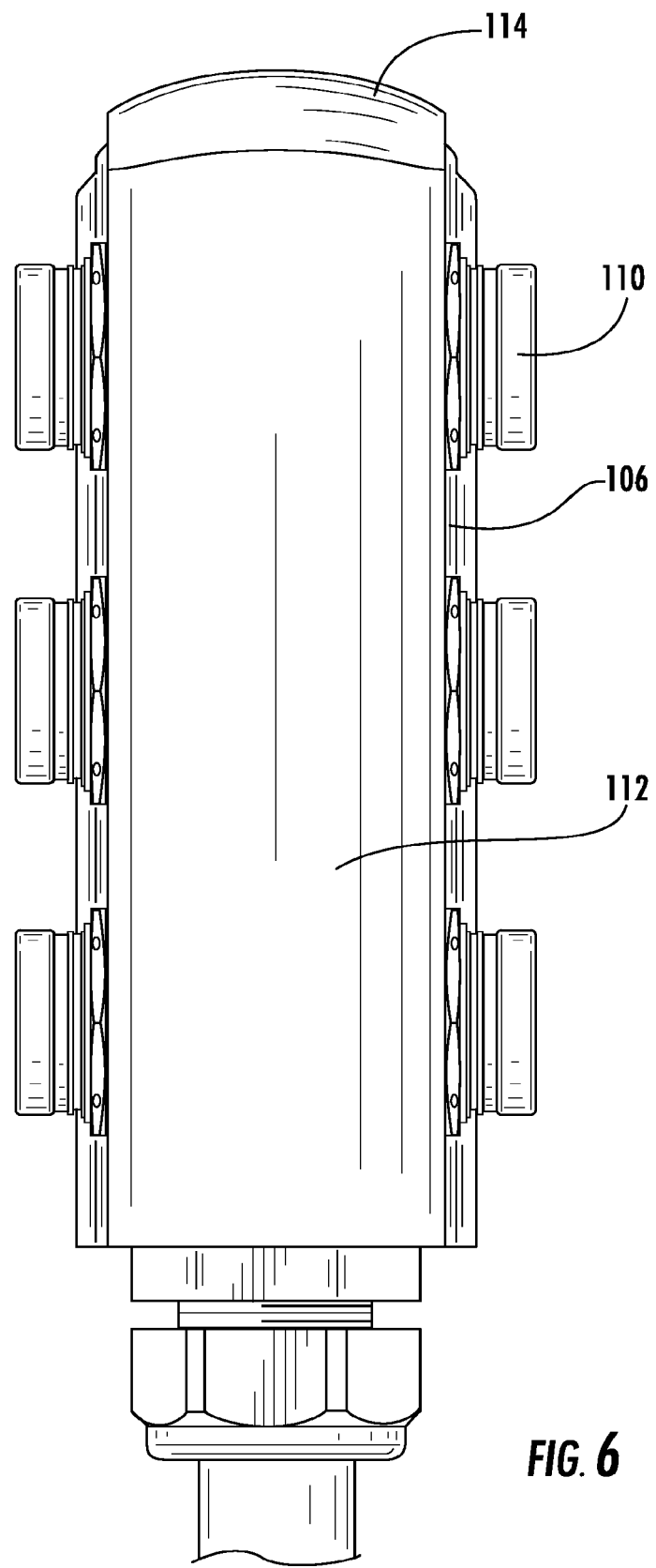
Figure 7:
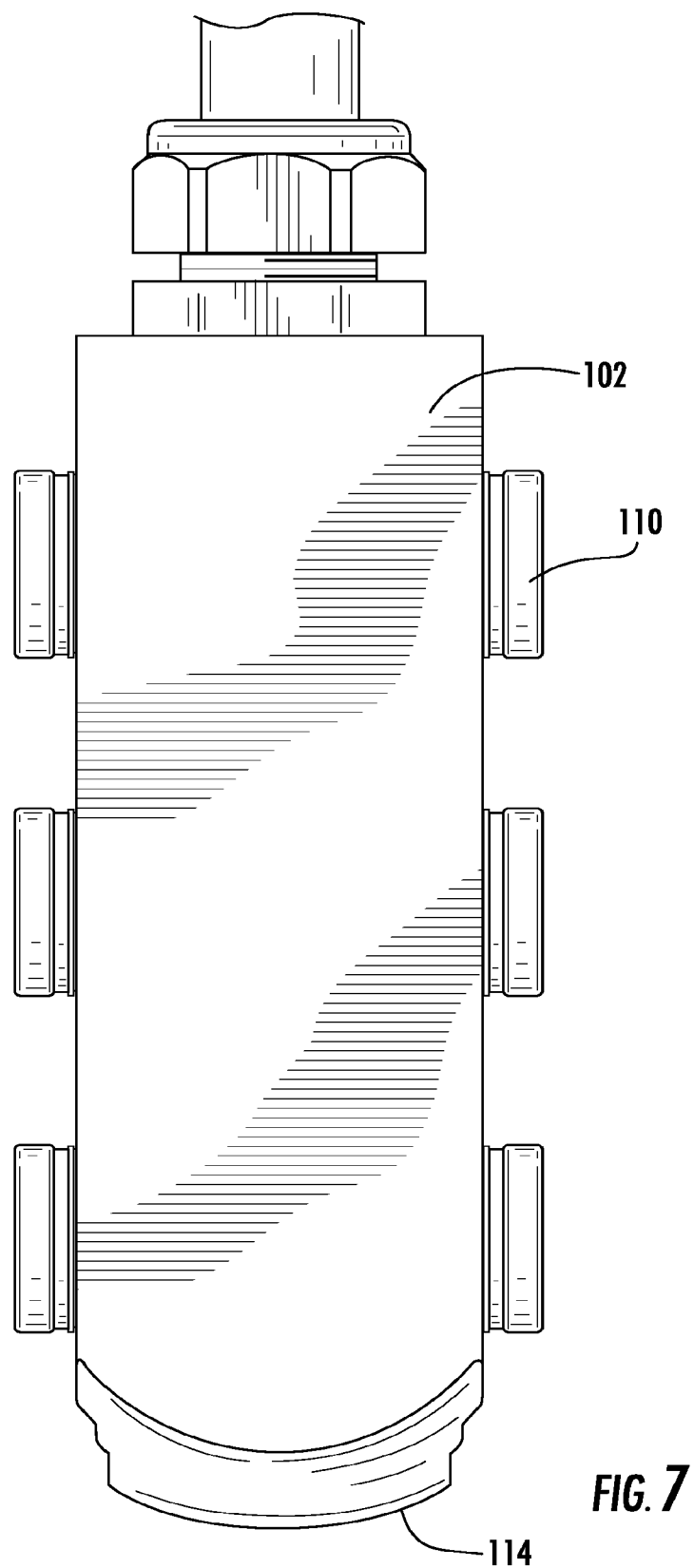
Figure 8:
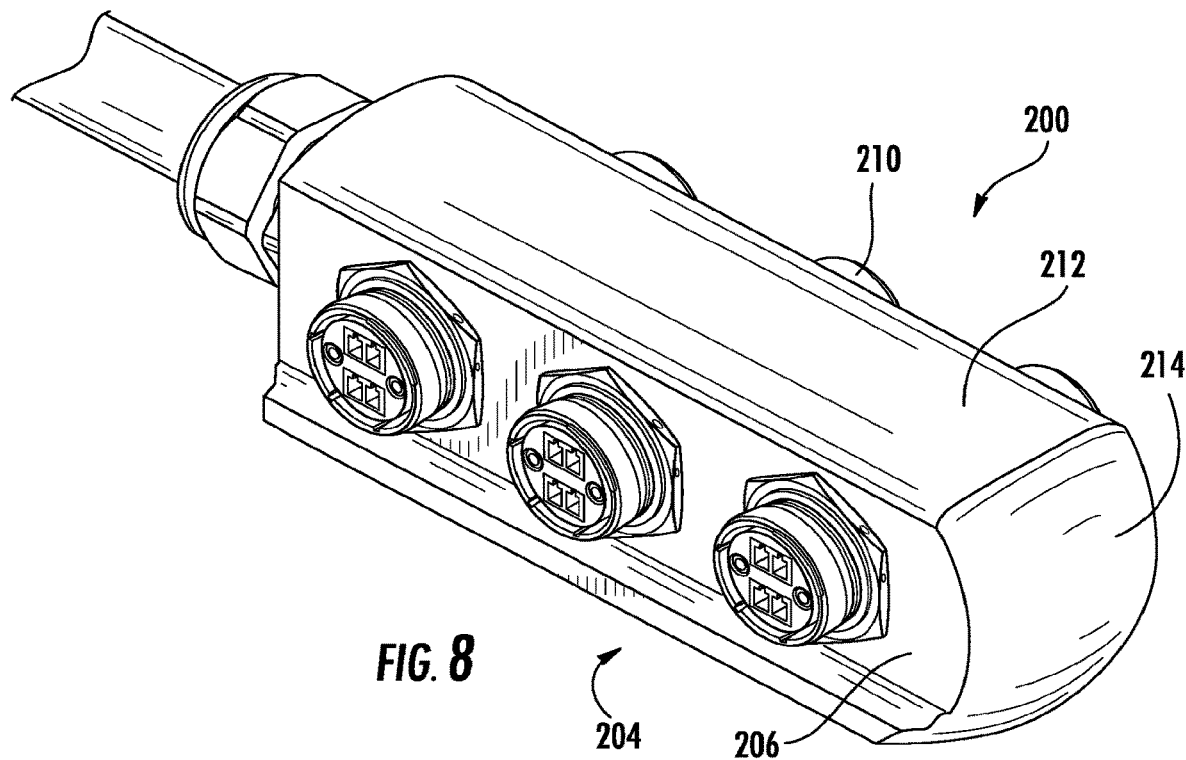
Figure 9:
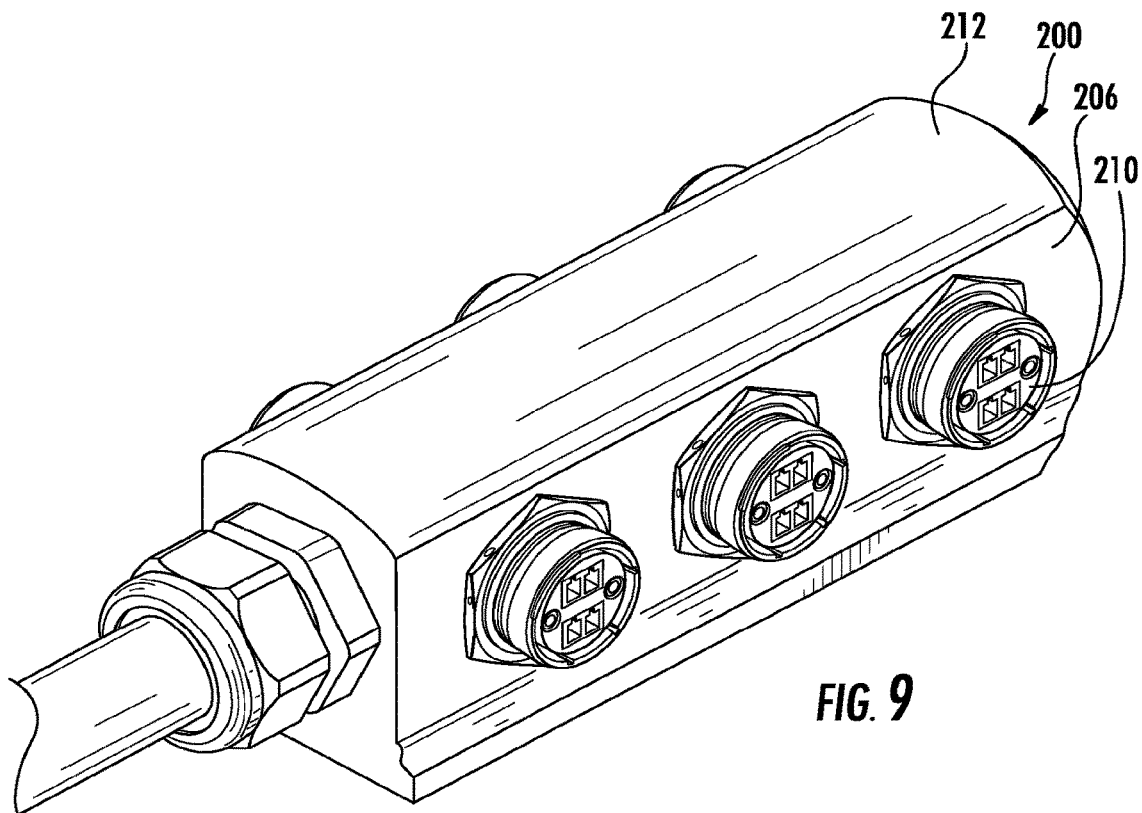
Figure 12:
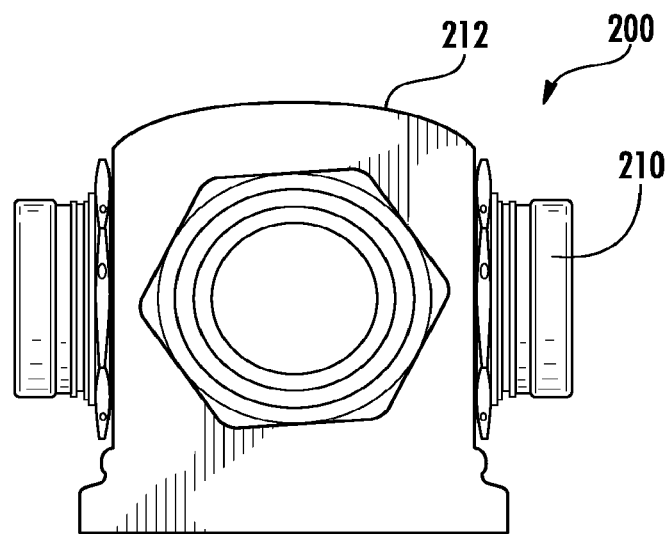
Figure 13:
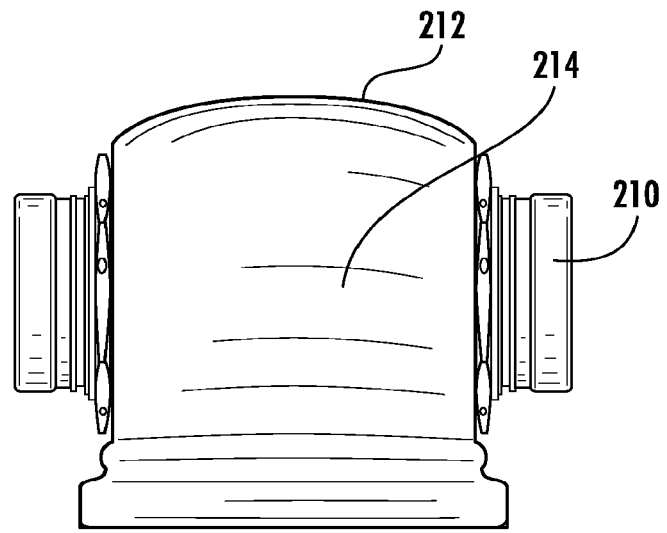
Figure 14:
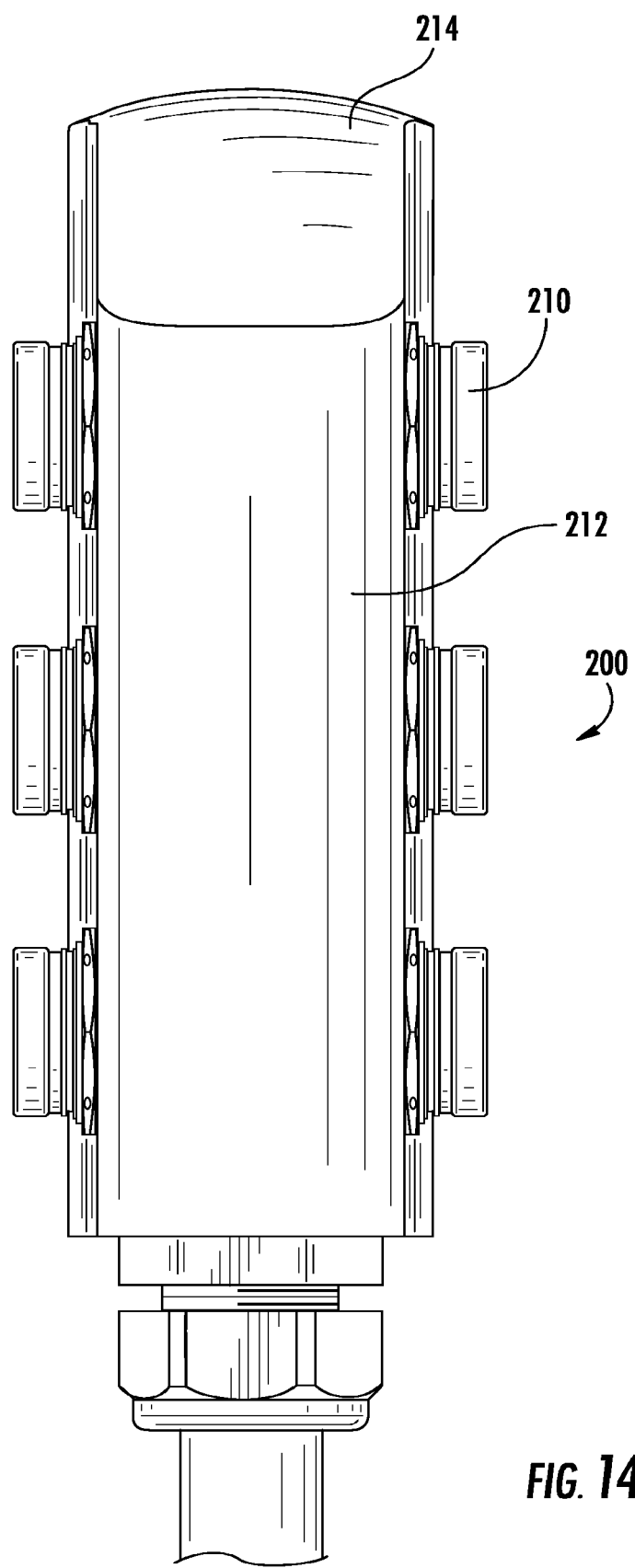
Figure 15:
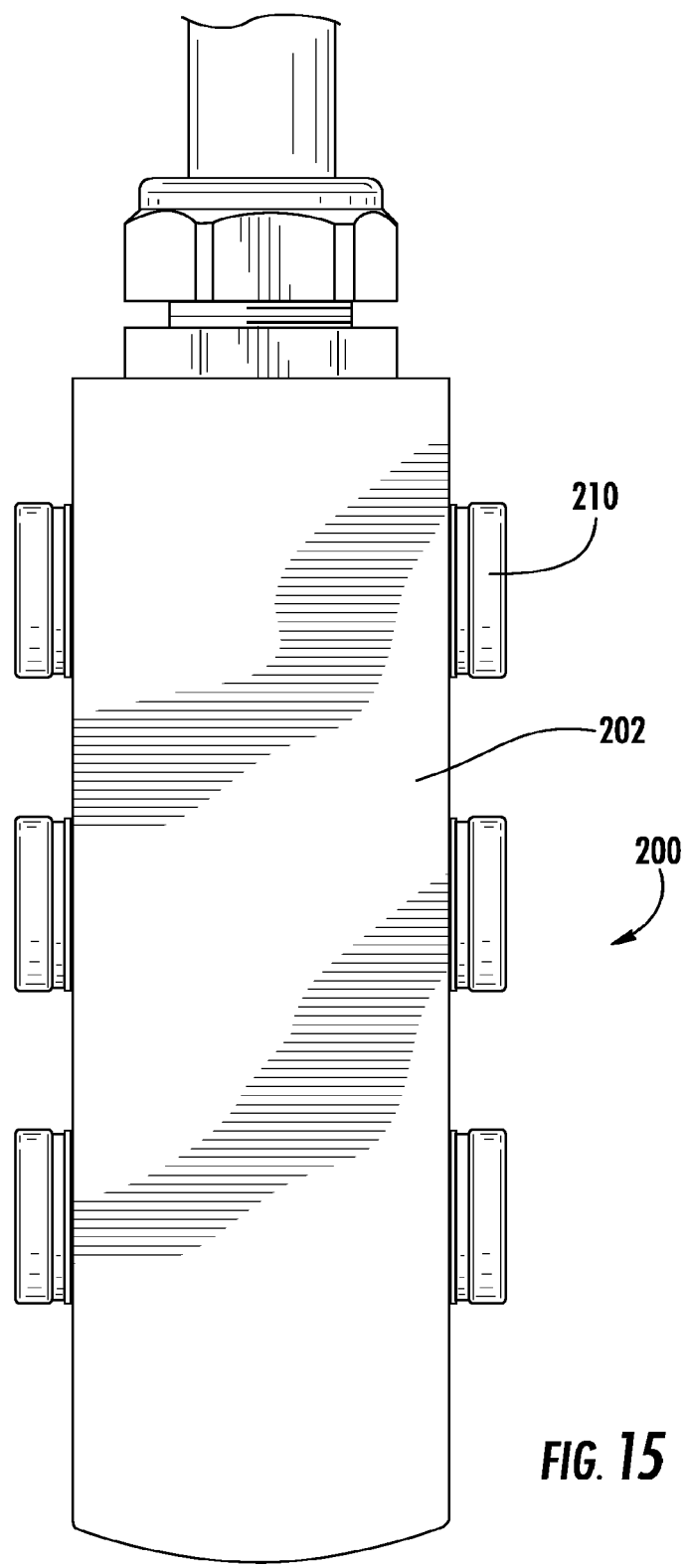
Figure 16:
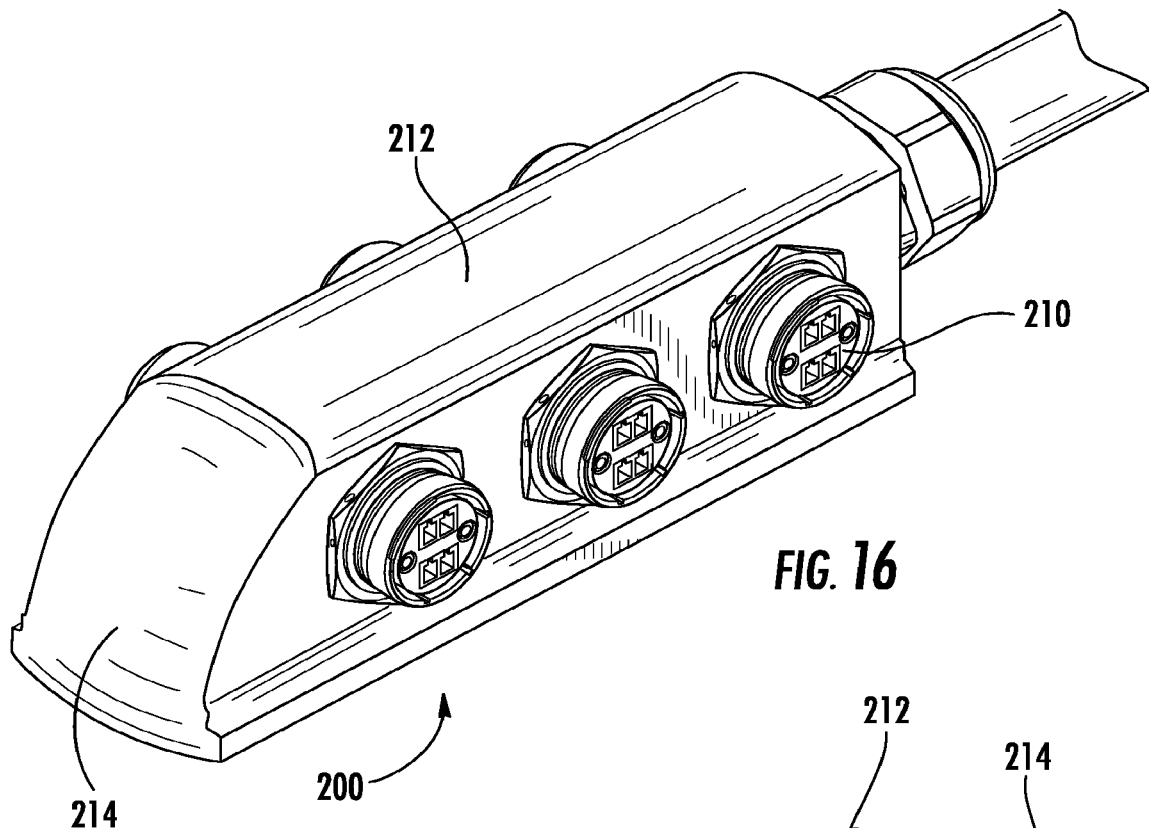
Figure 17:
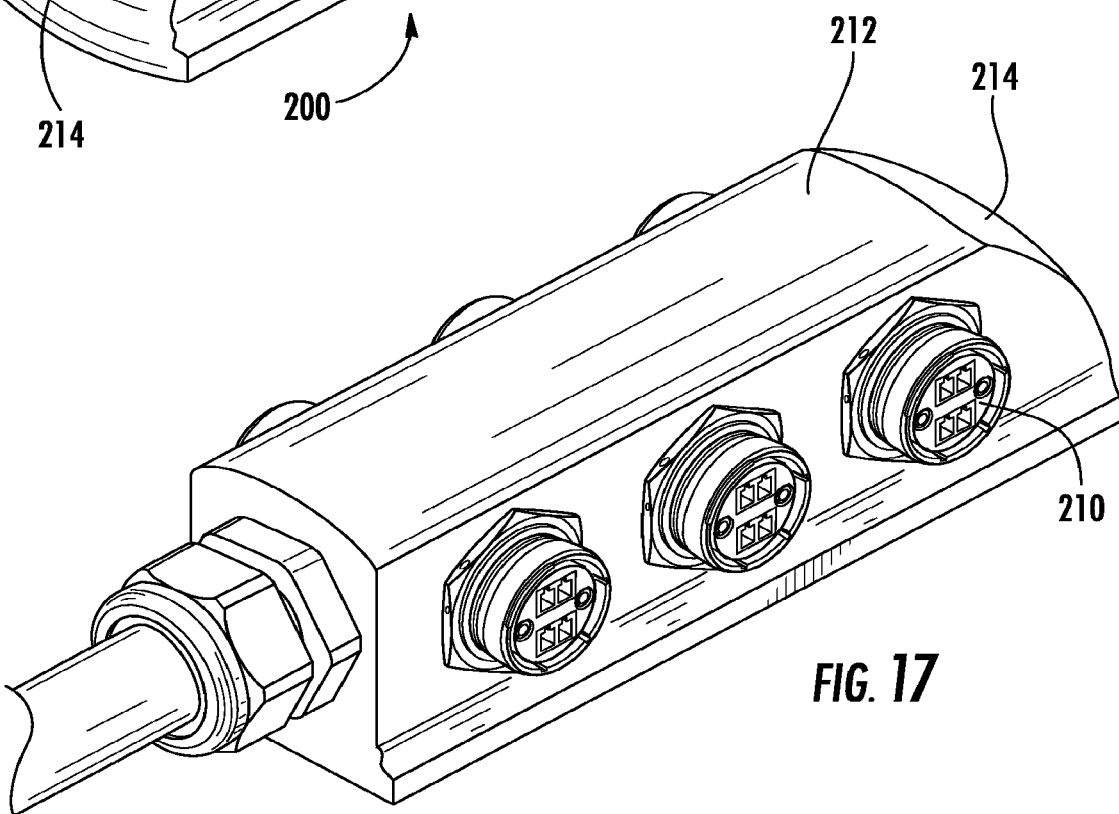
Figure 20:
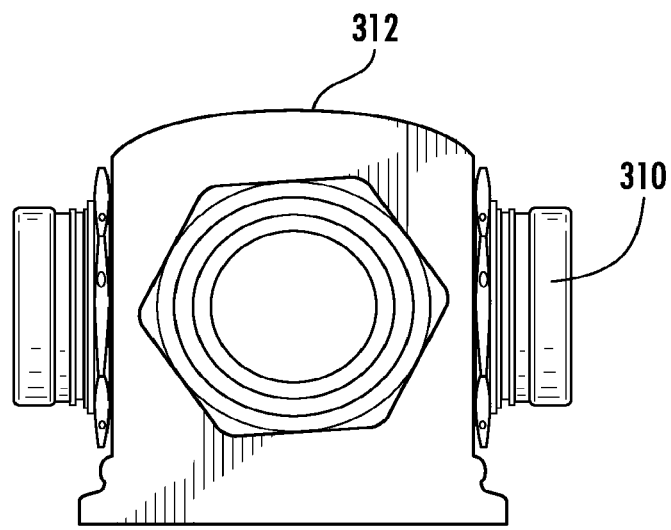
Figure 21:
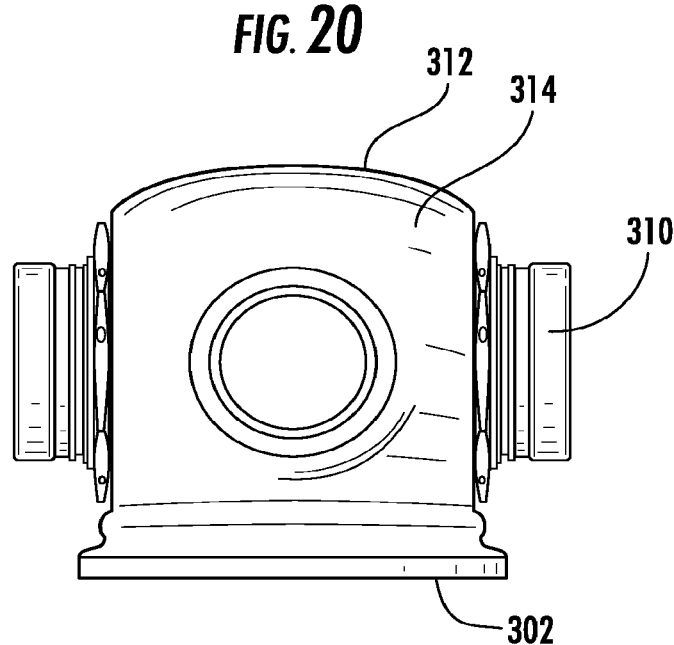
Figure 22:
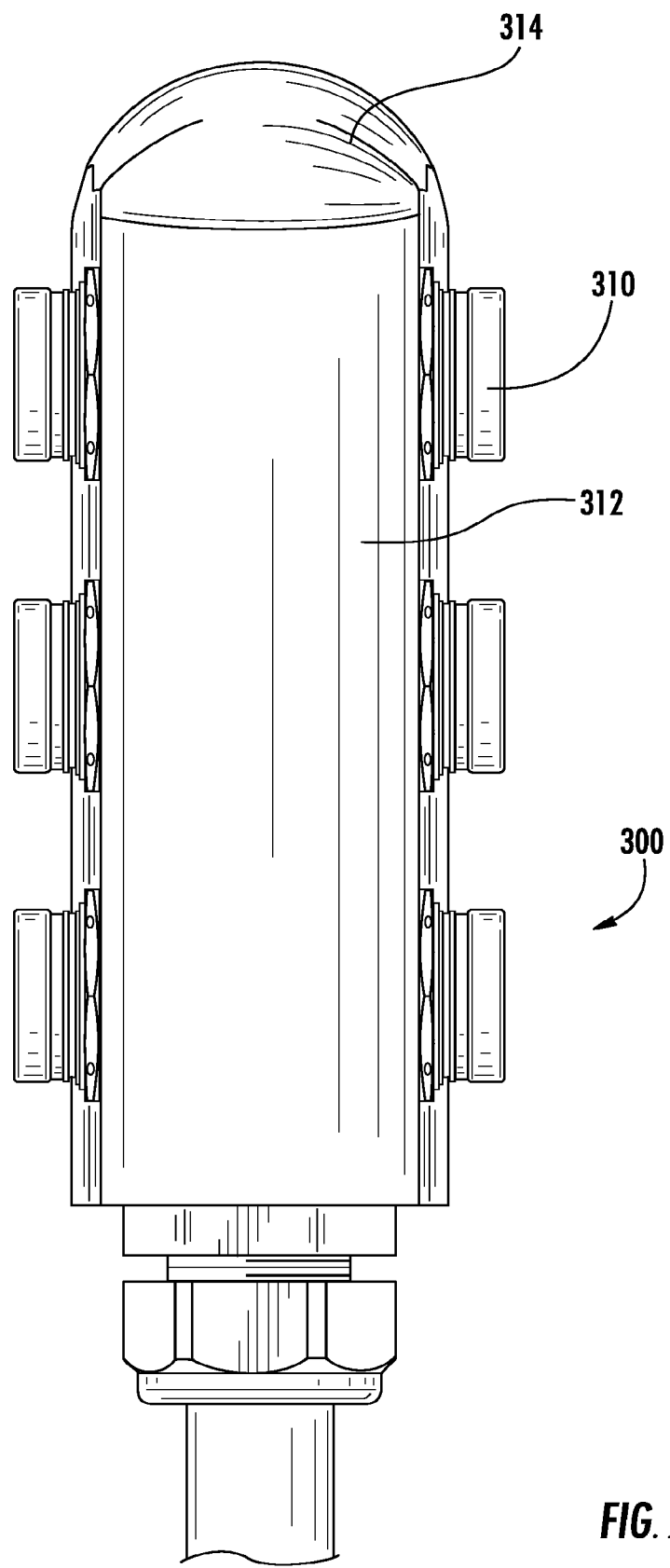
Figure 23:
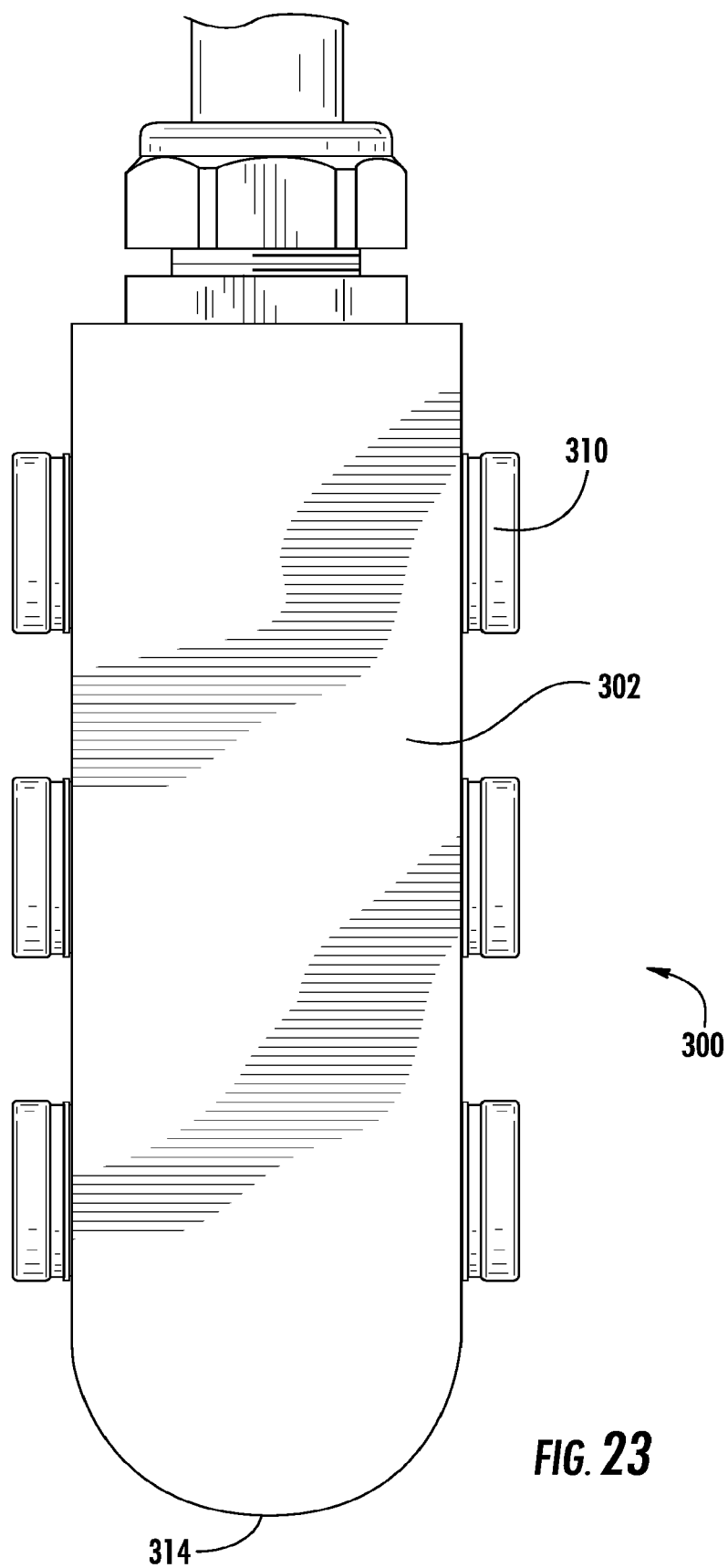
Figure 24:
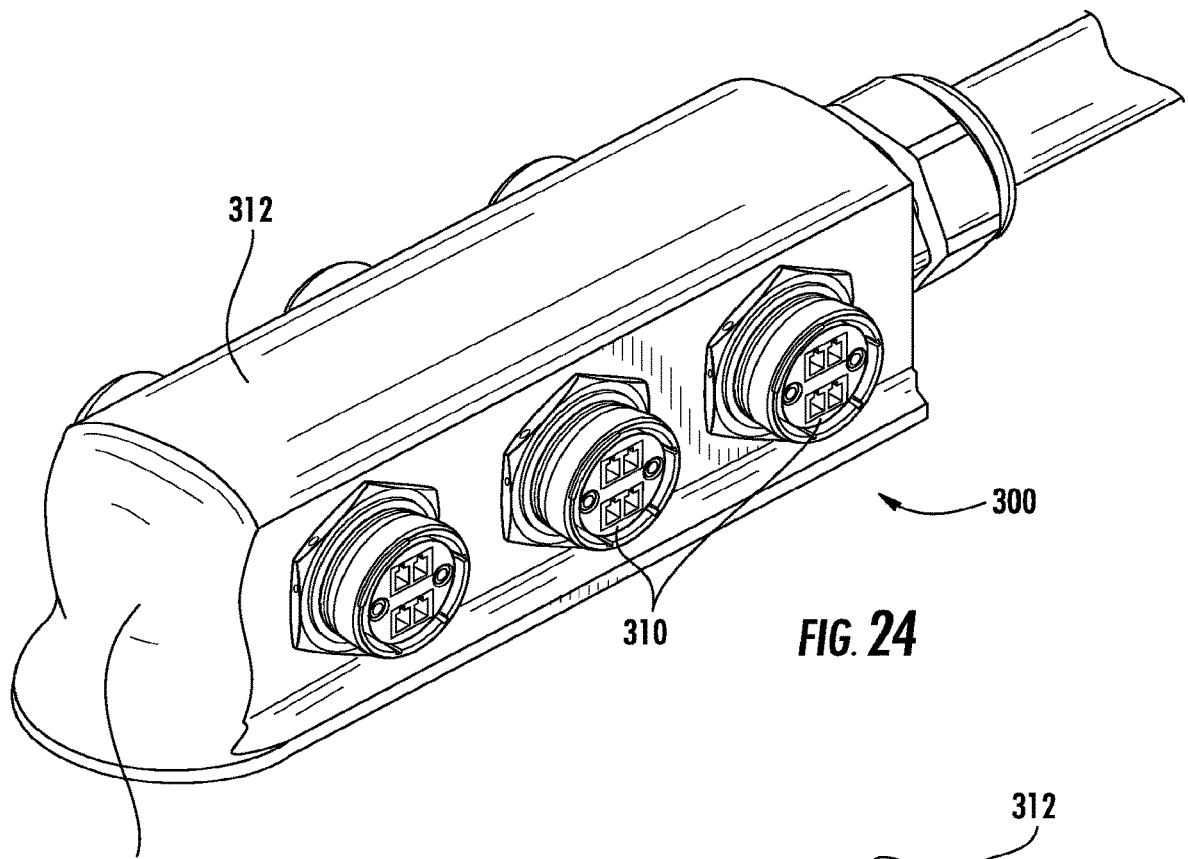
Figure 25:
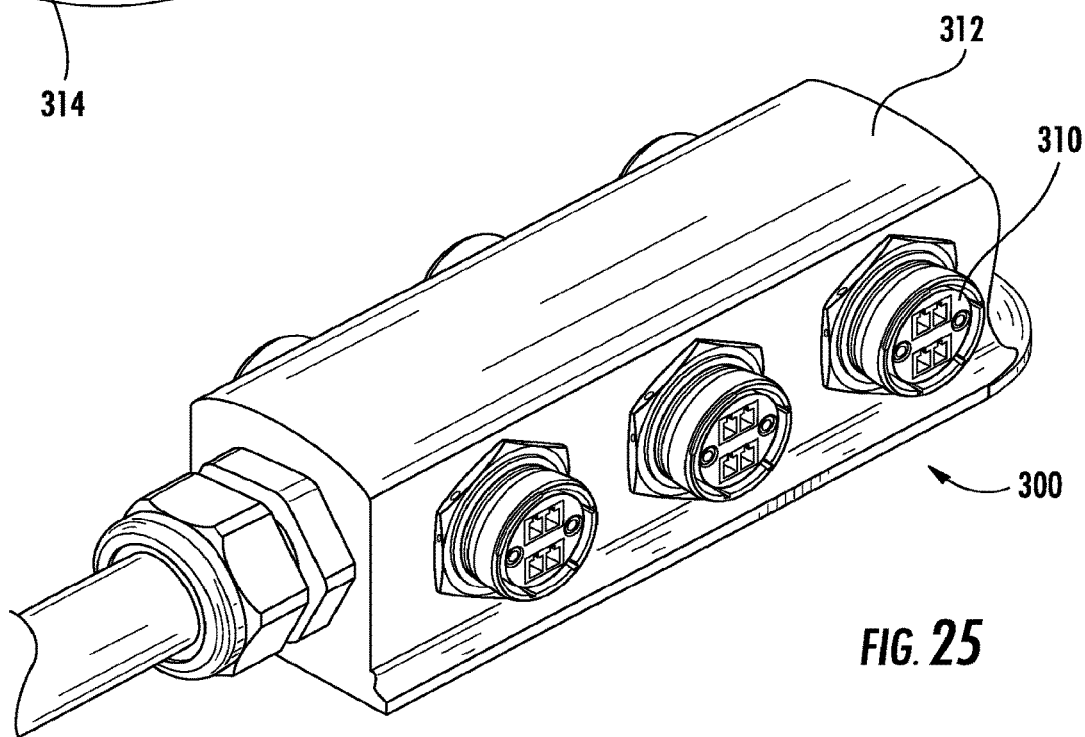
Figure 26:
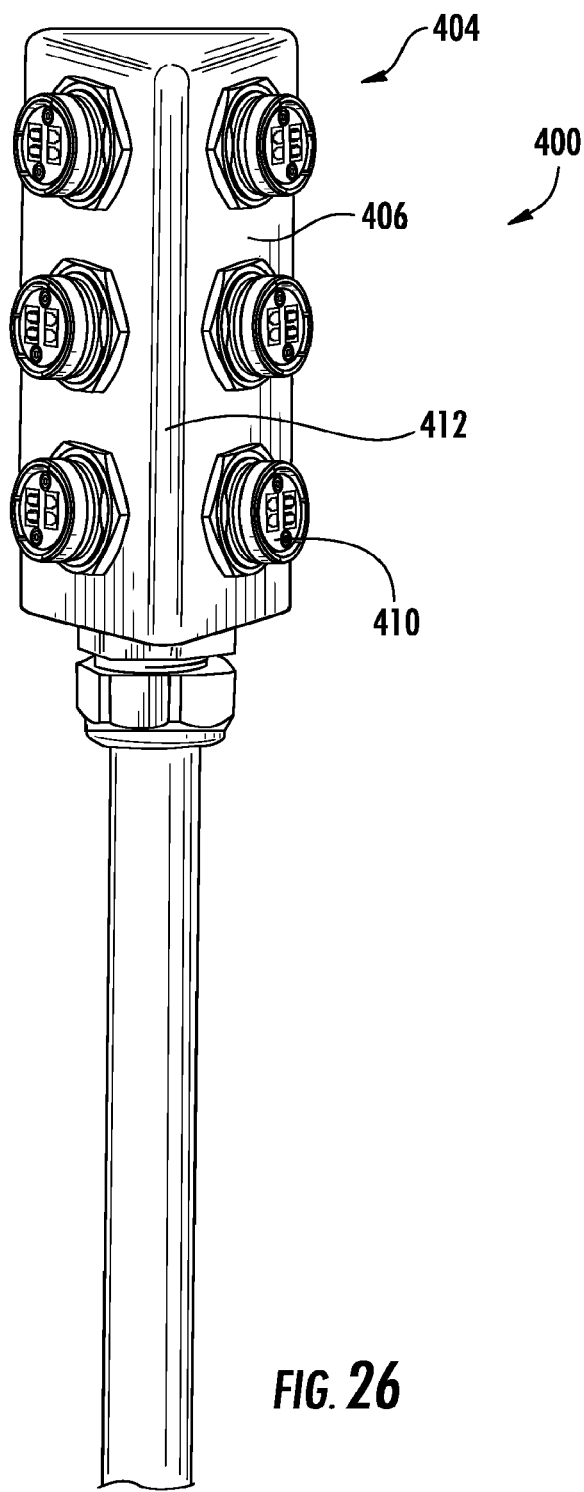
FIGS. 26-32 are various views of an enclosure according to further embodiments of the invention.
Figure 27:
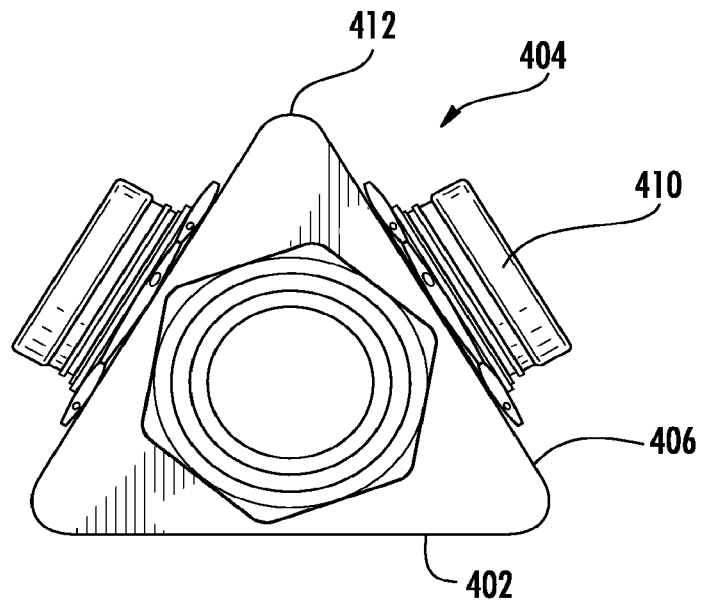
Figure 28:
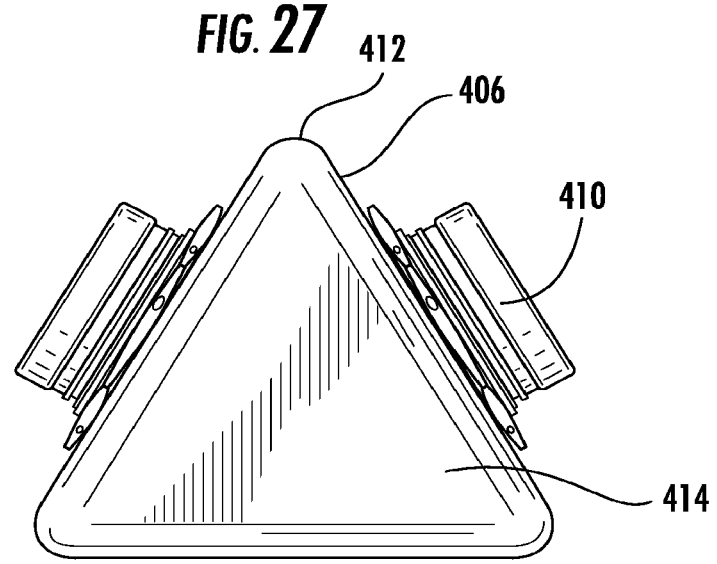
Figure 29:
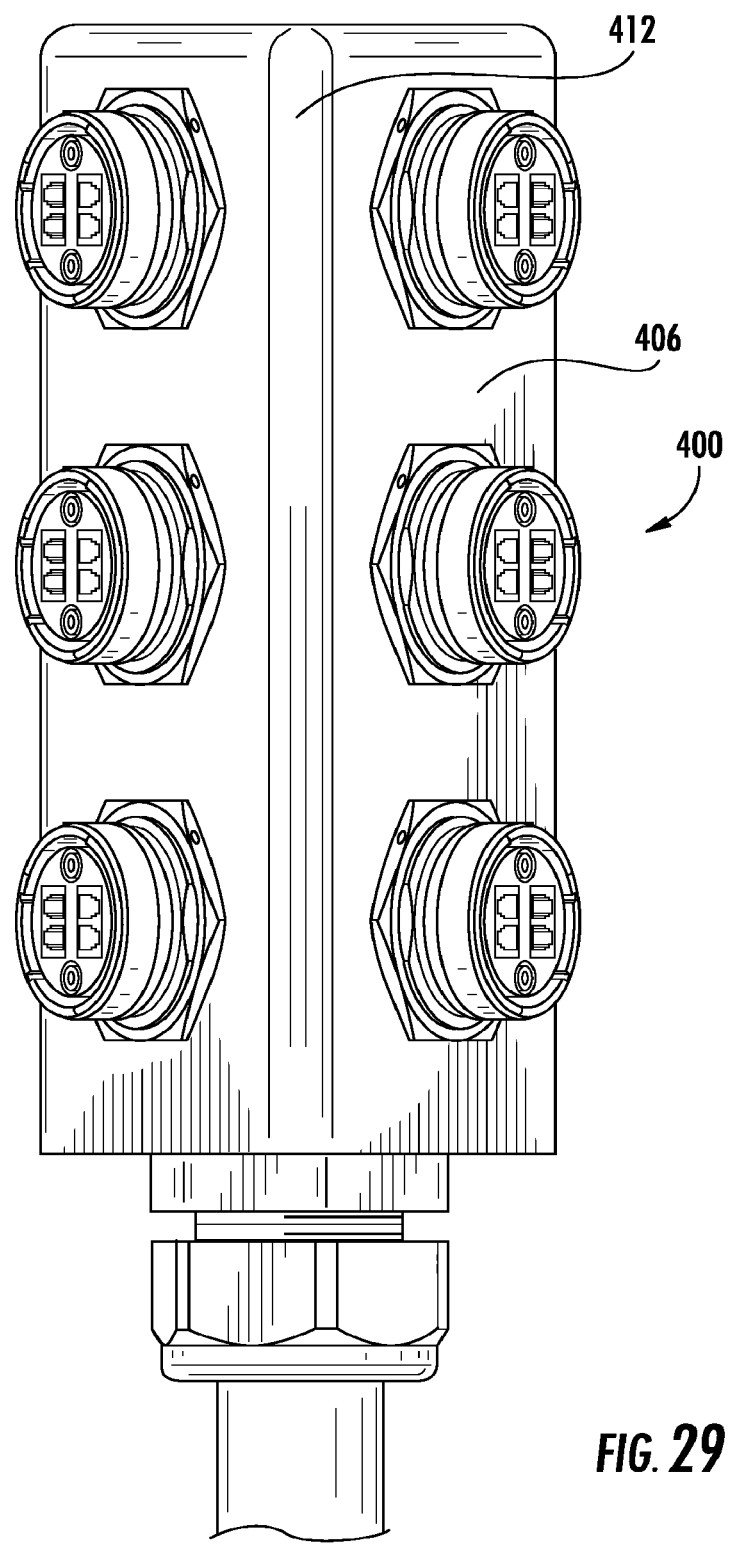
Figure 30:
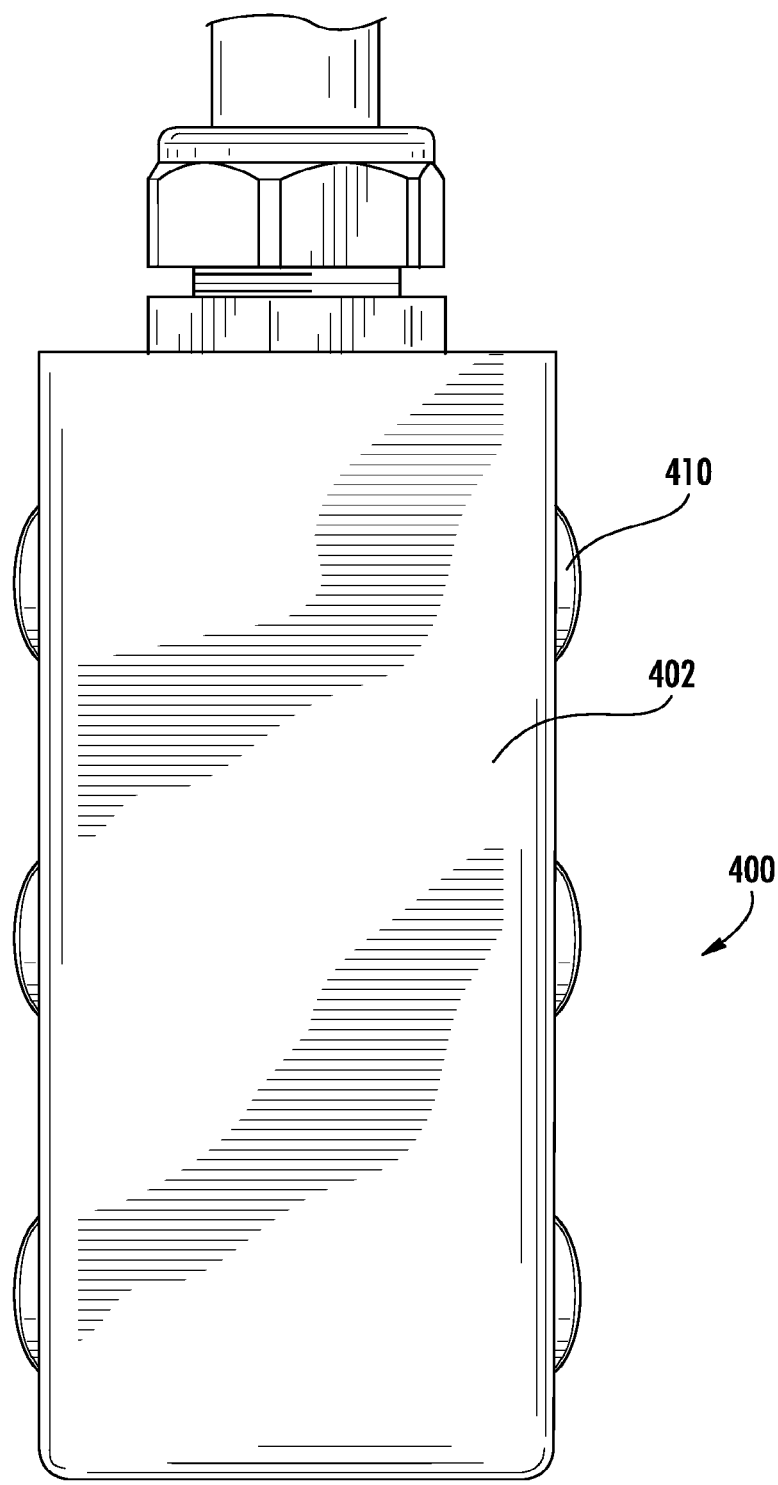
Figure 31:
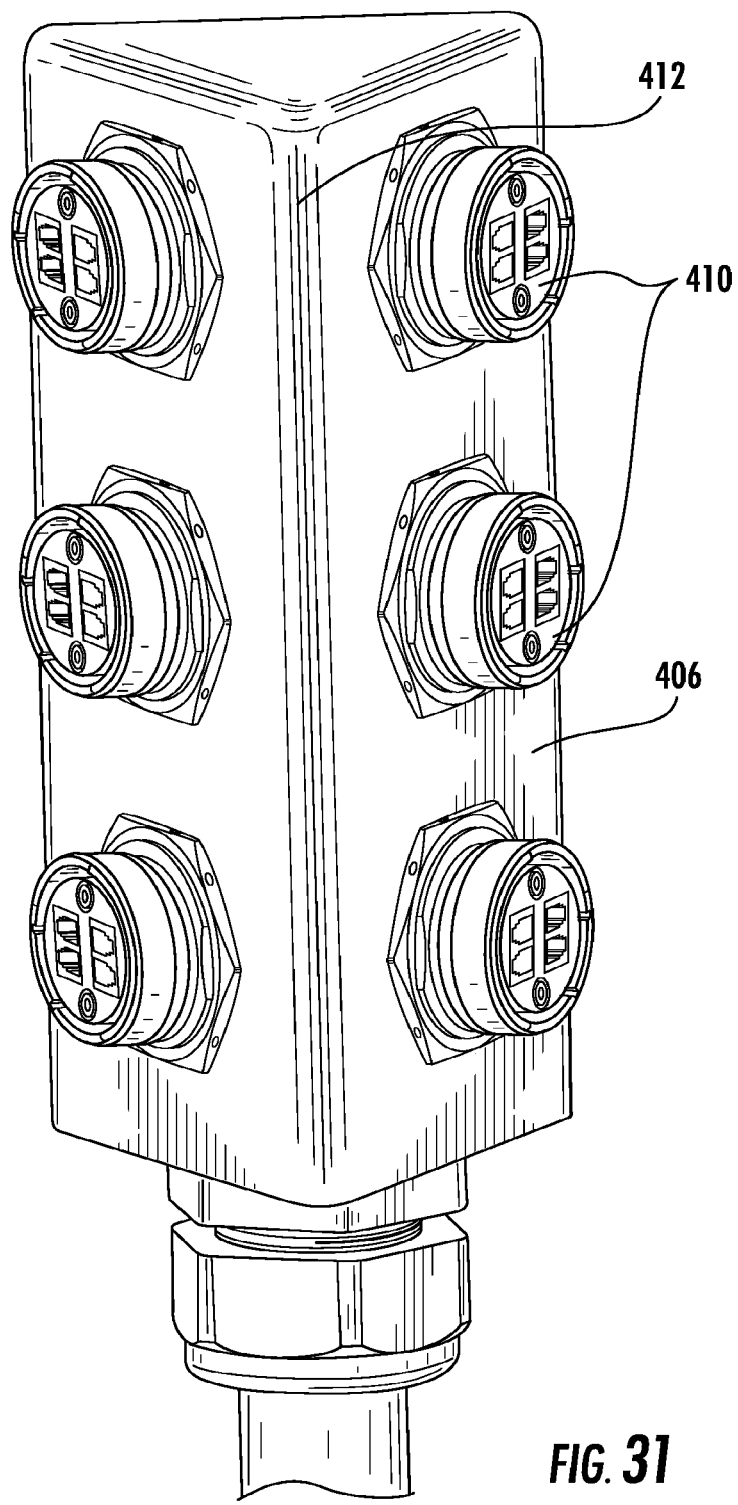
Figure 32:
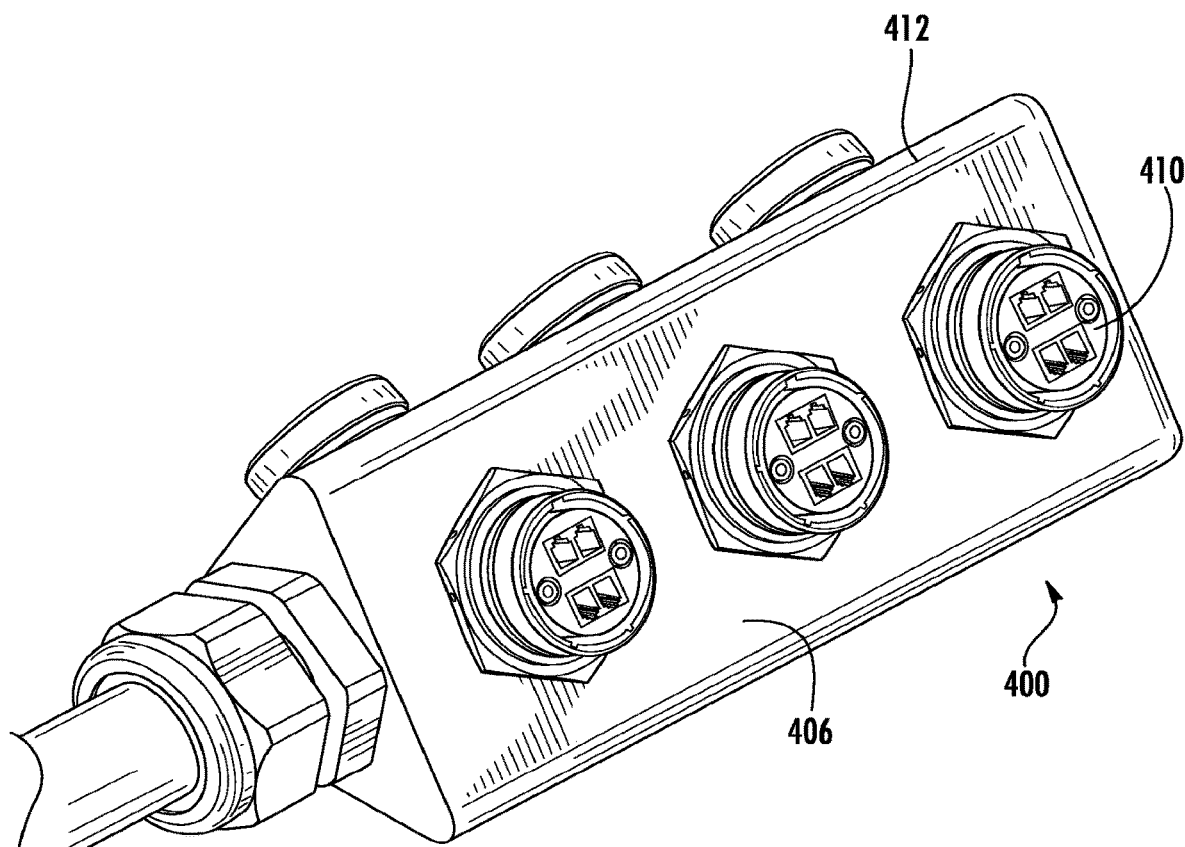
Figure 33:
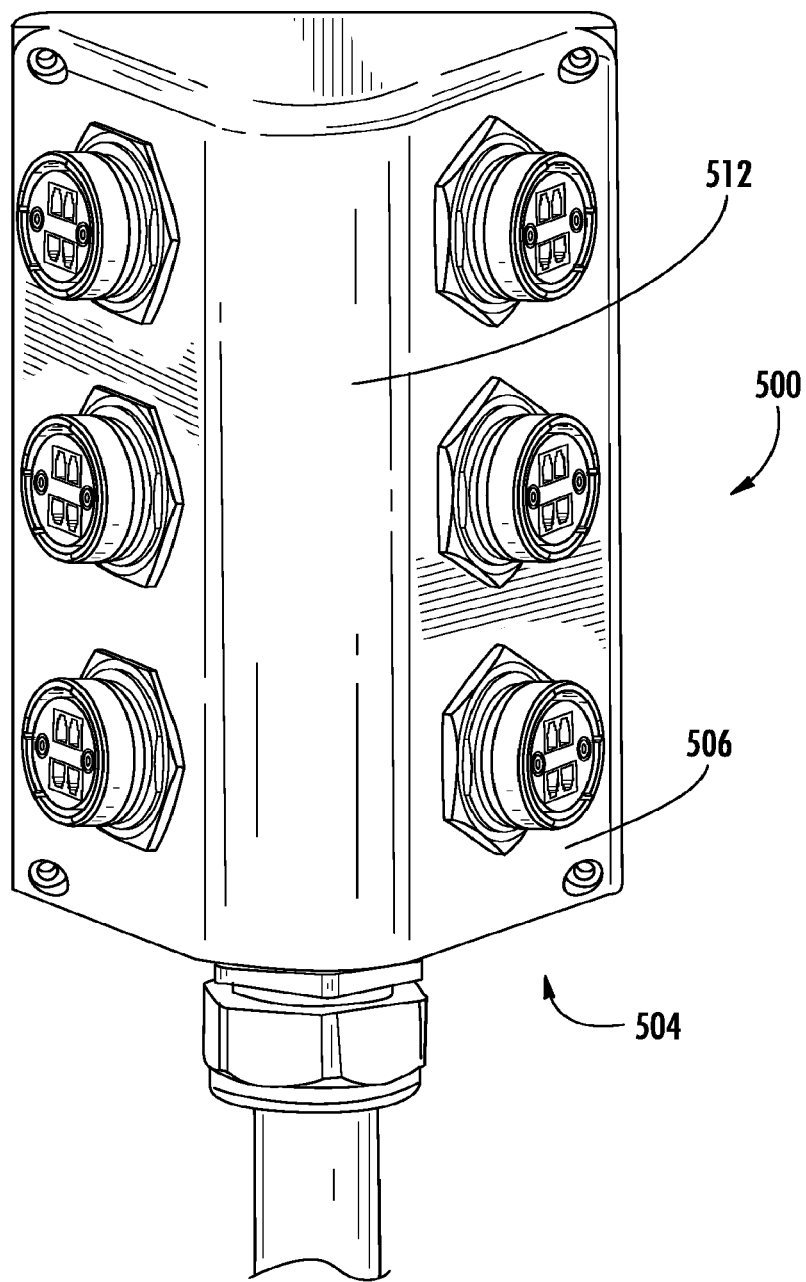
FIGS. 33-40 are various views of an enclosure according to still further embodiments of the invention.
Figure 34:
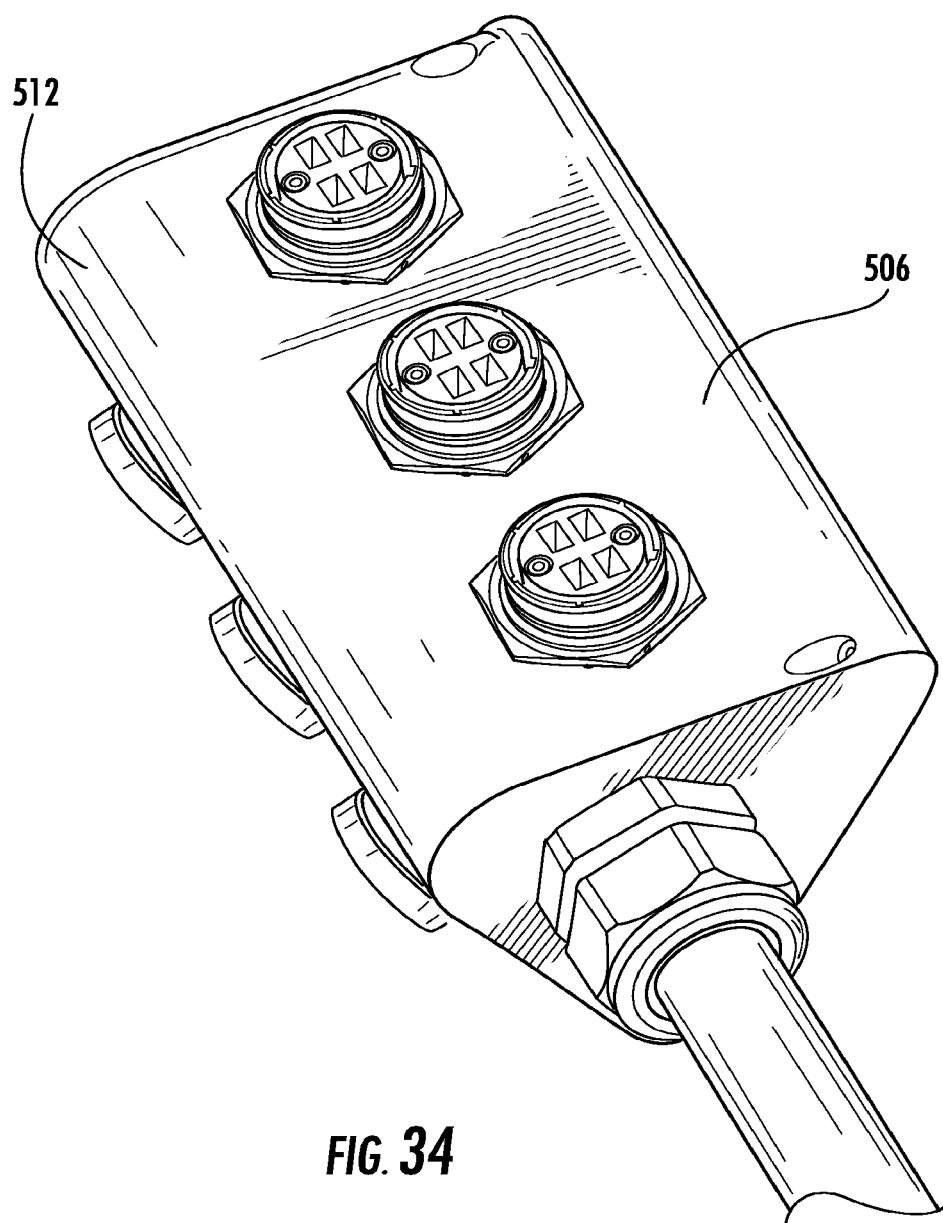
Figure 35:
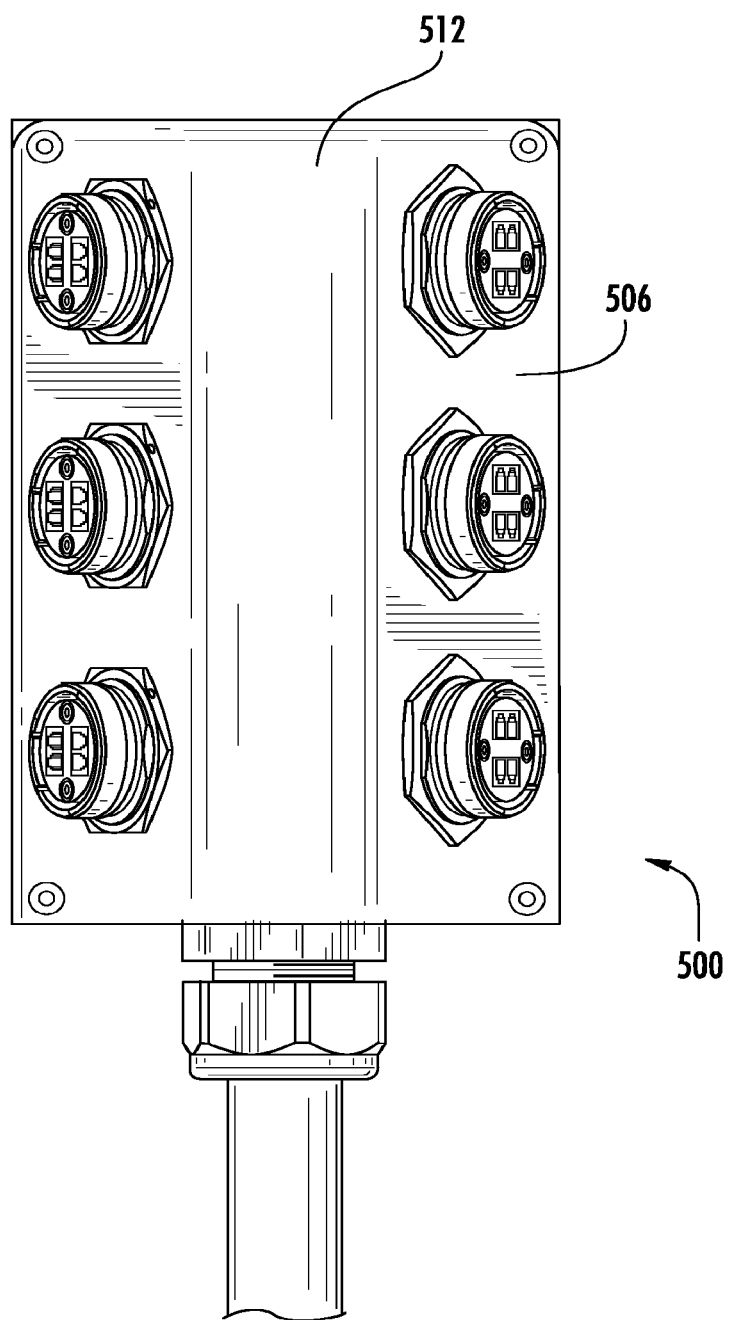
Figure 36:
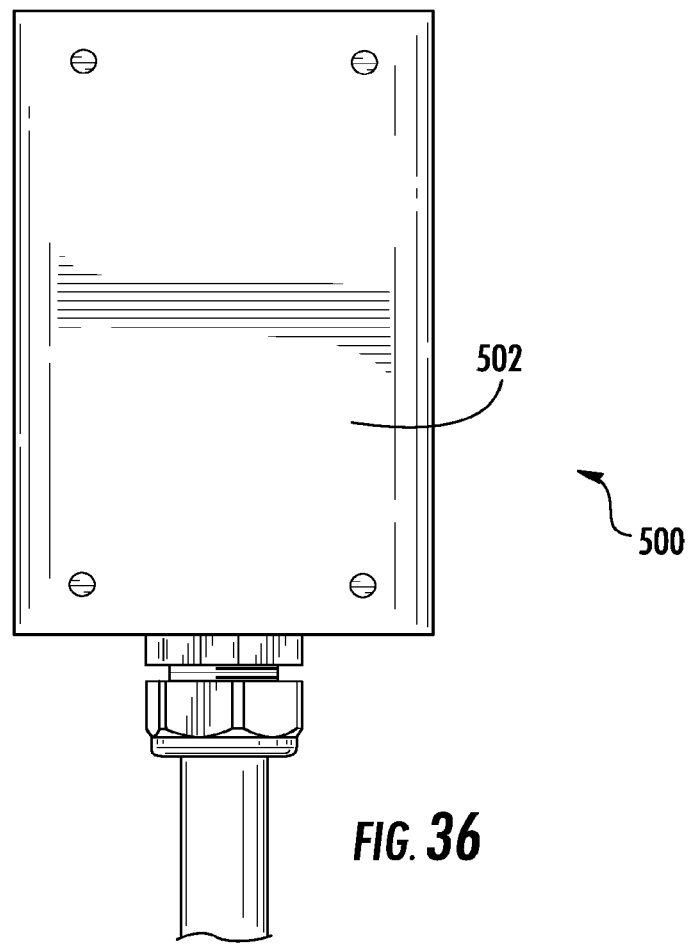
Figure 37:
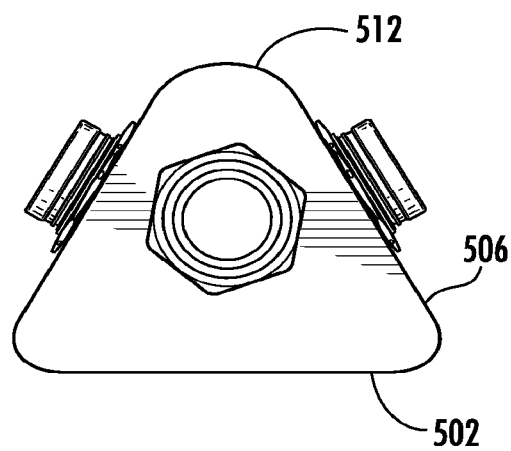
Figure 38:
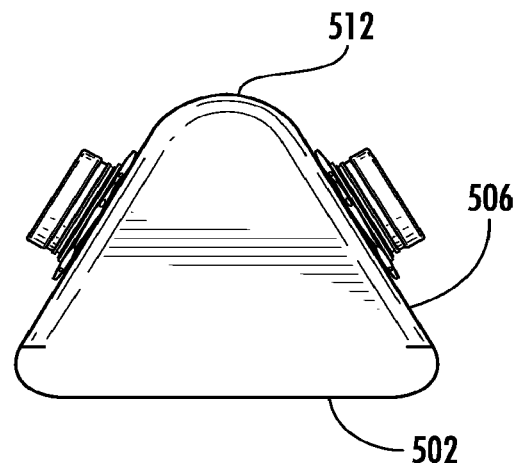
Figure 39:
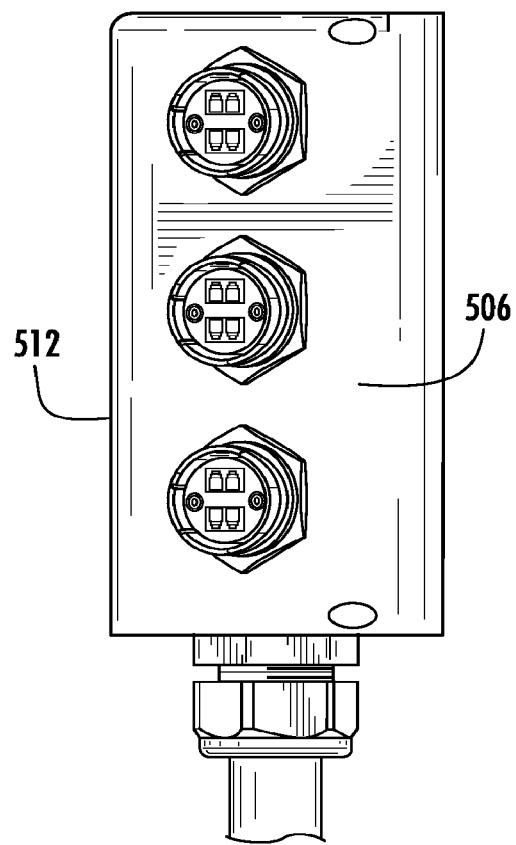
Figure 40:
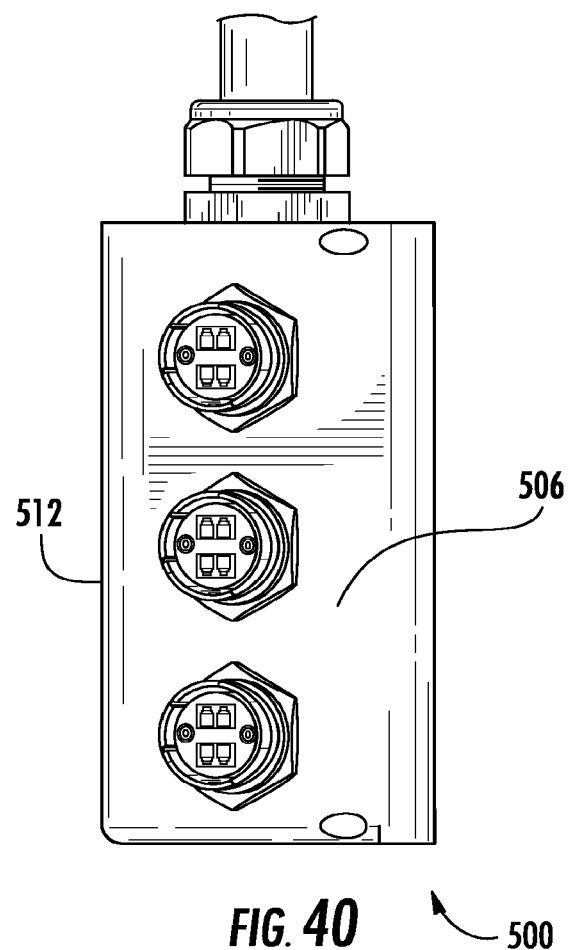
Figure 41:
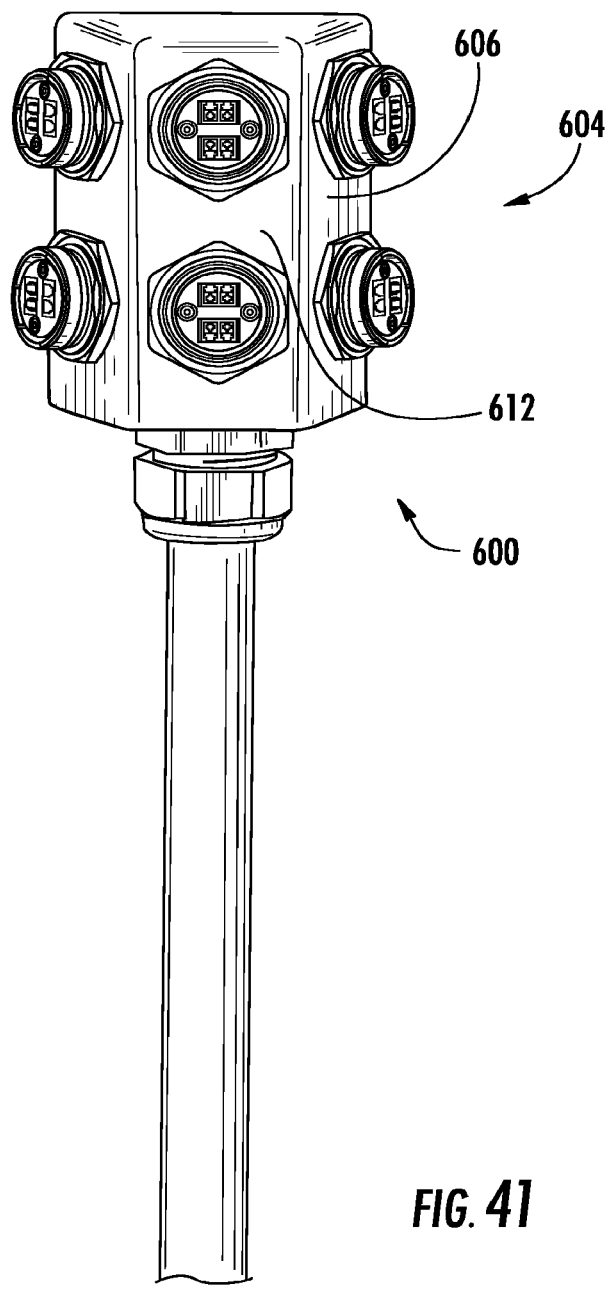
FIGS. 41-47 are various views of an enclosure according to yet further embodiments of the invention.
Figure 42:
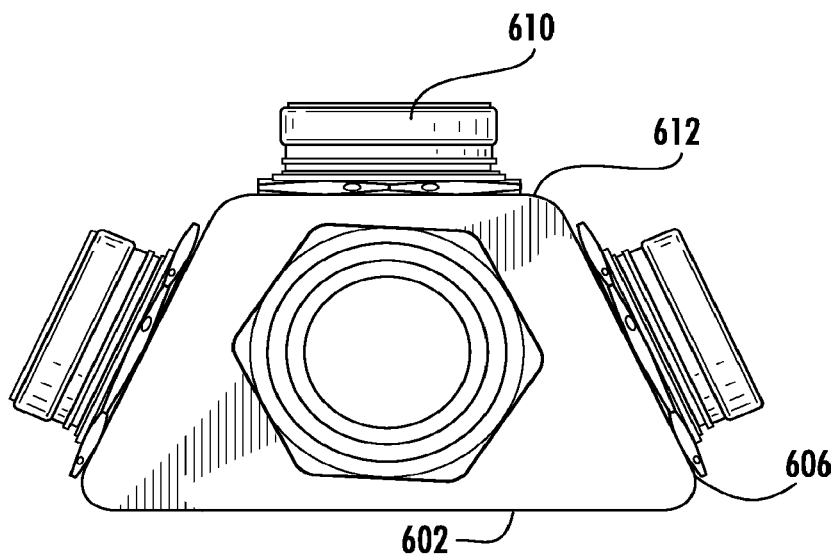
Figure 43:
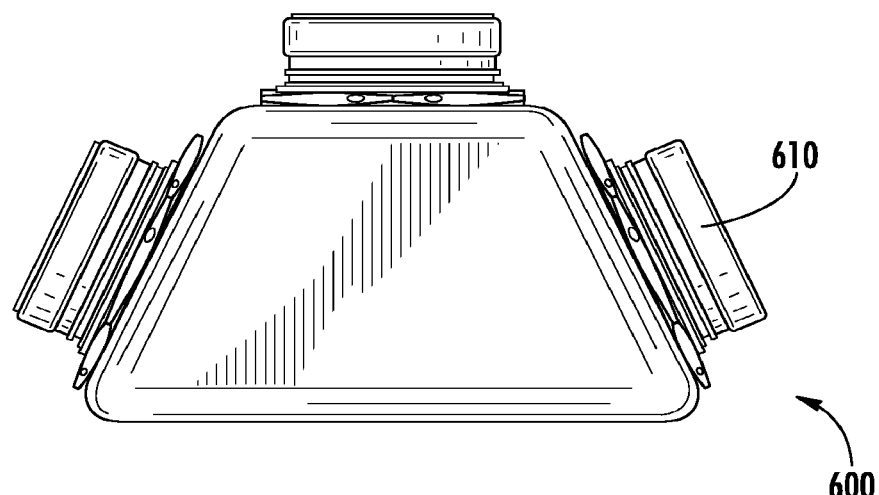
Figure 44:
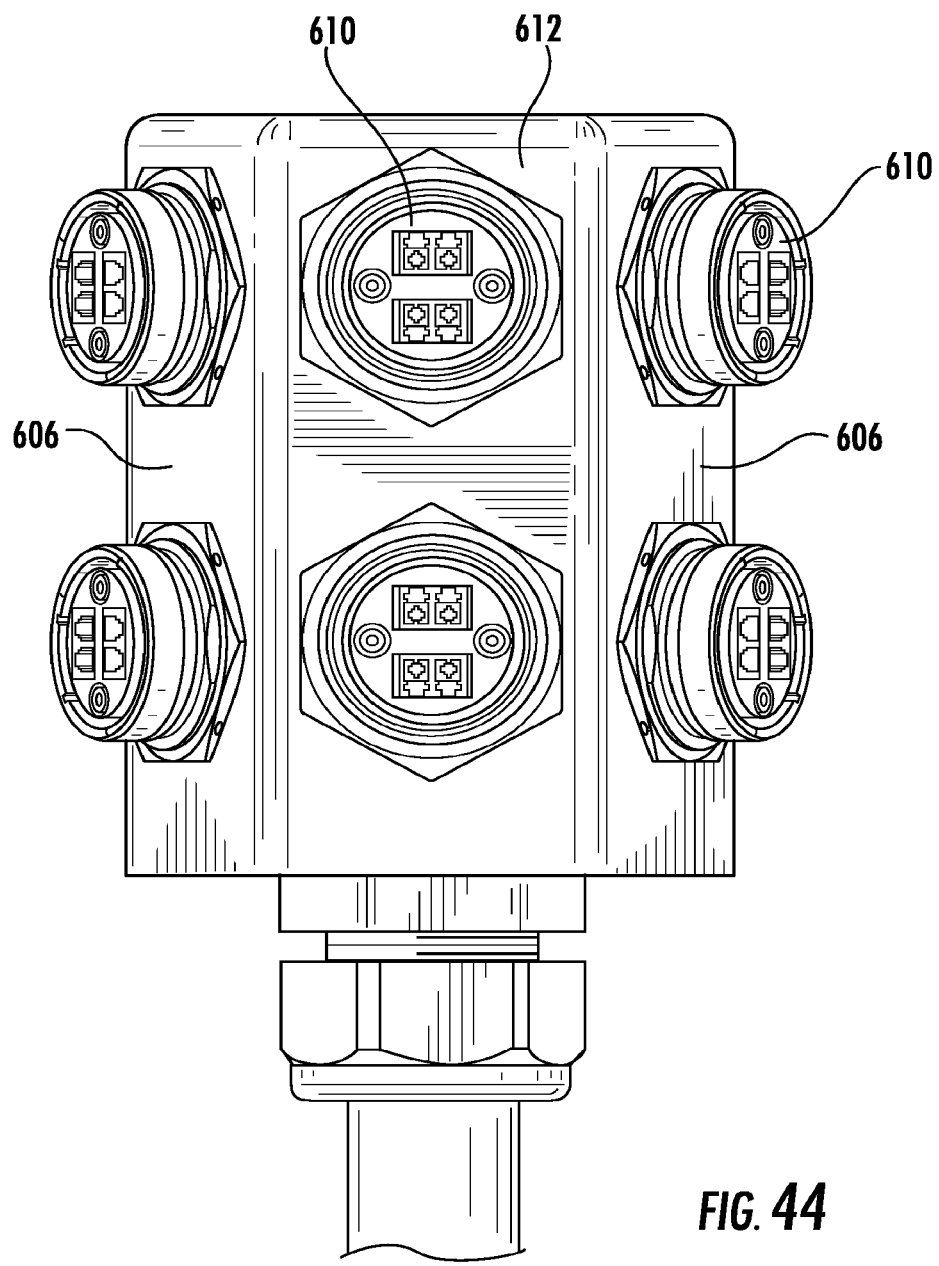
Figure 45:
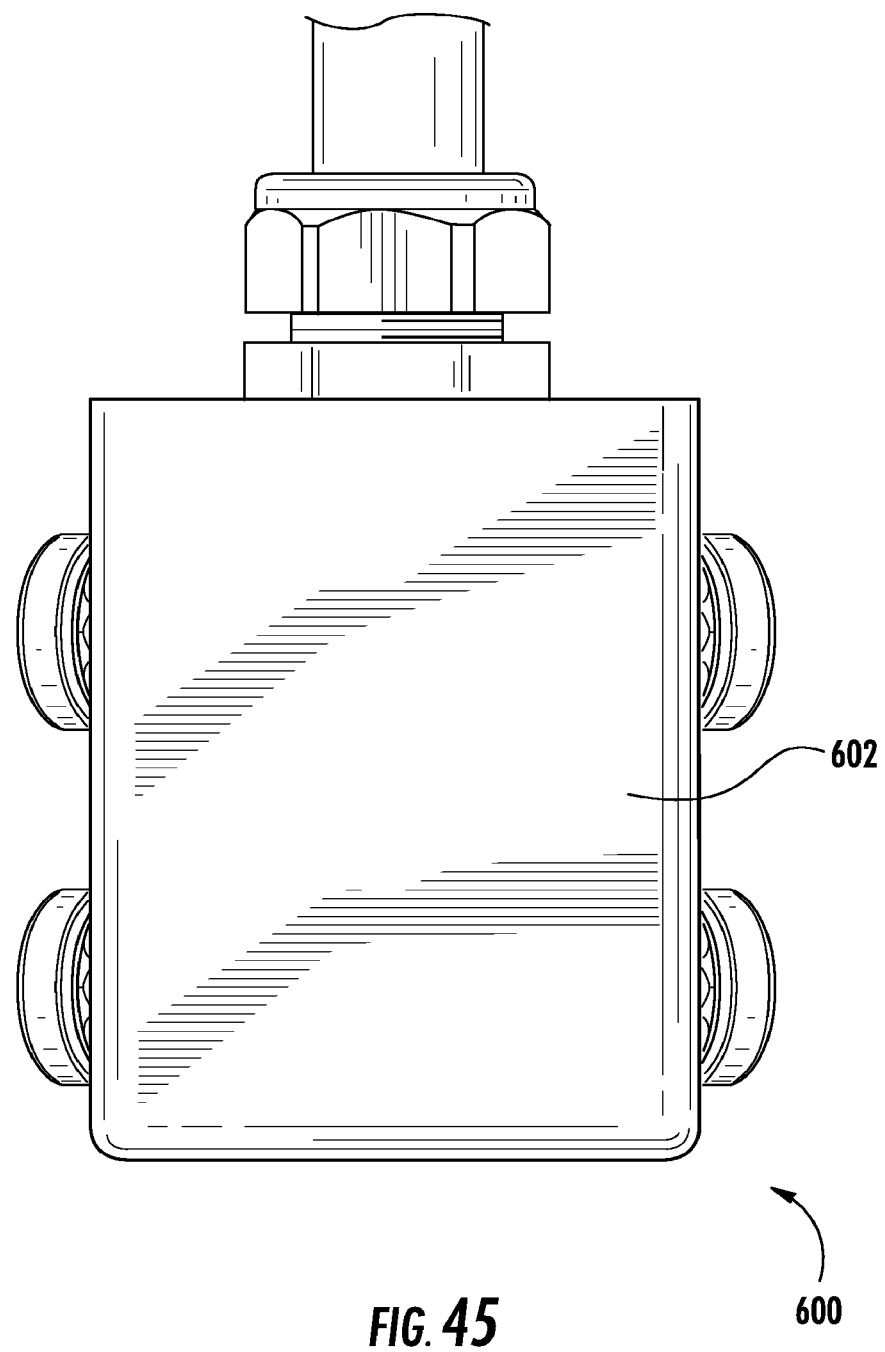
Figure 46:
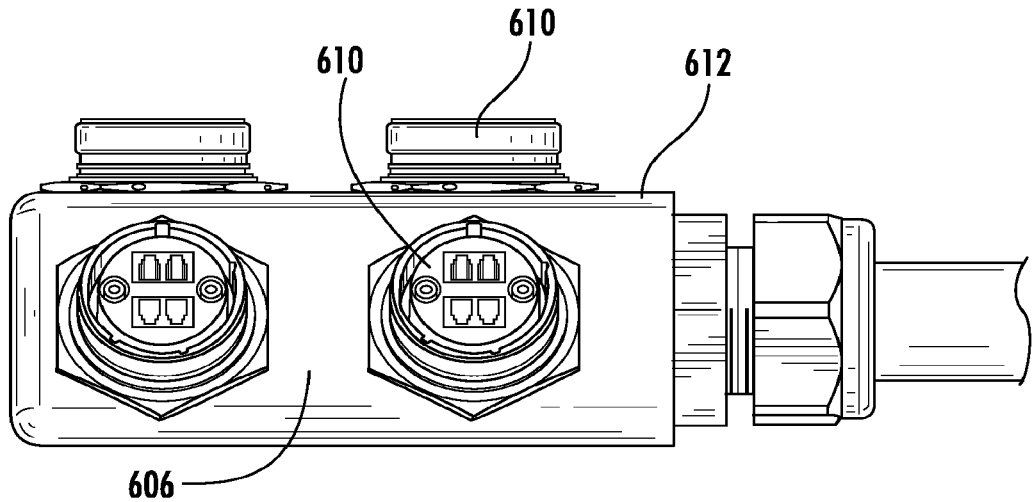
Figure 47:
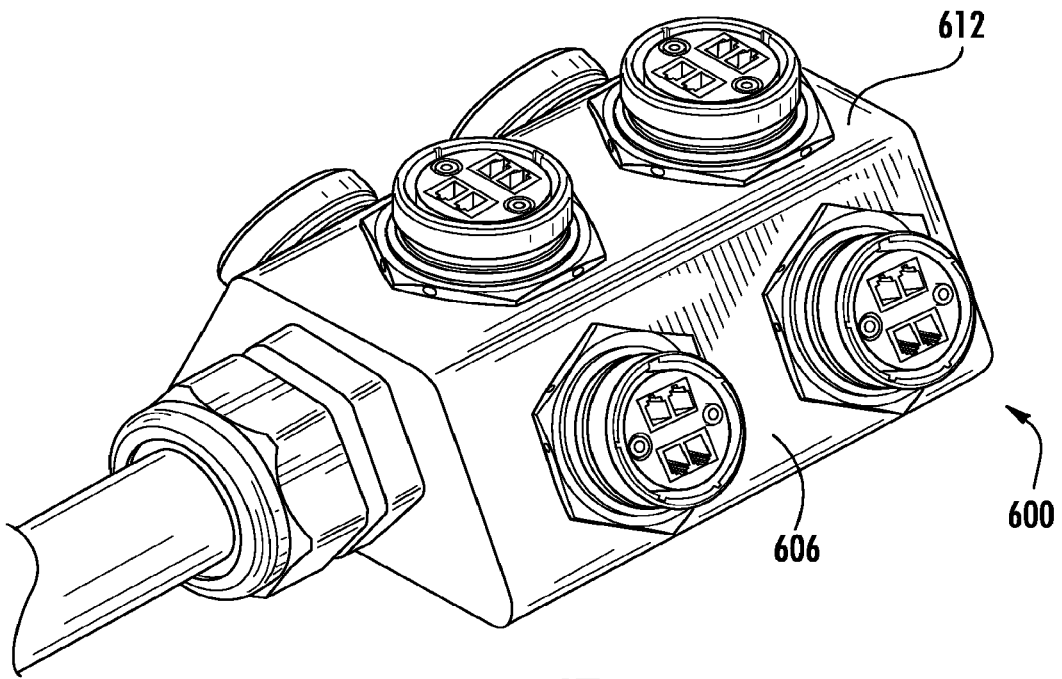
Figure 48:
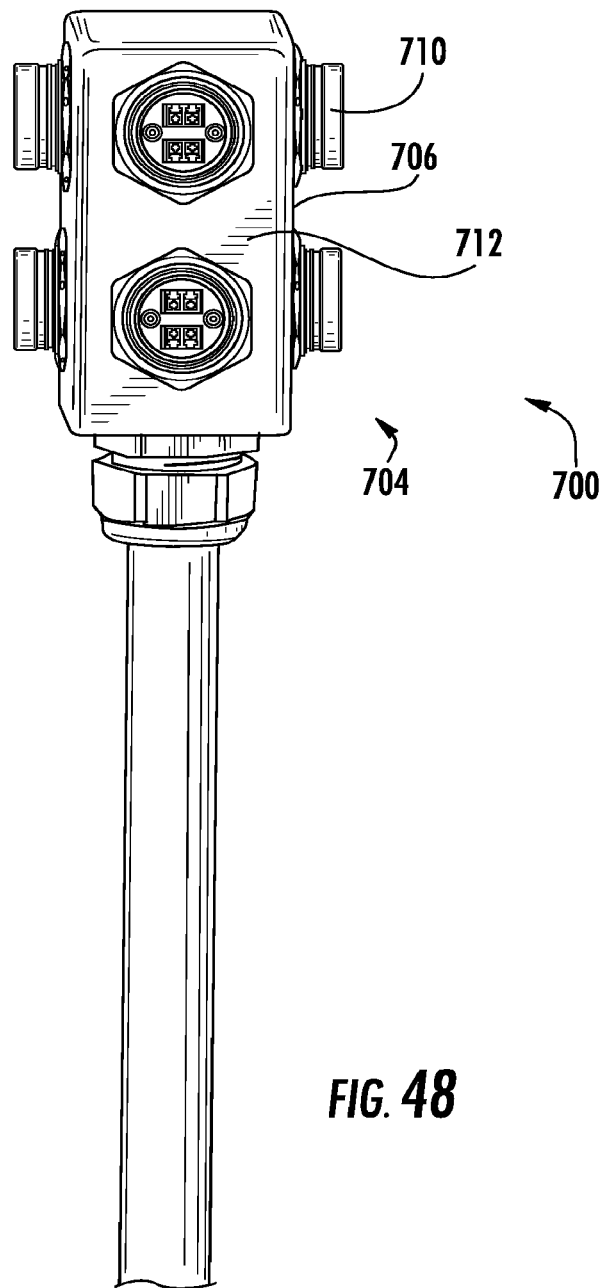
FIGS. 48-54 are various view of an enclosure according to still further embodiments of the invention
Figure 49:
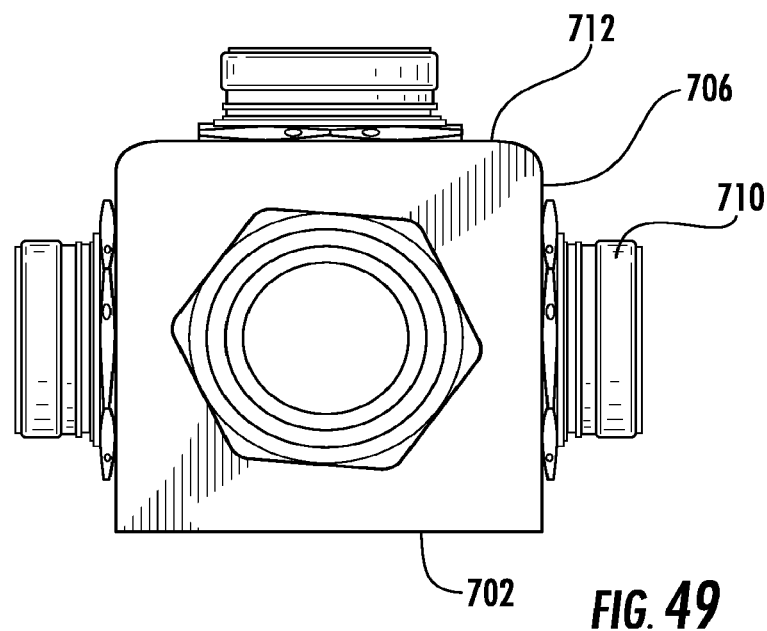
Figure 50:
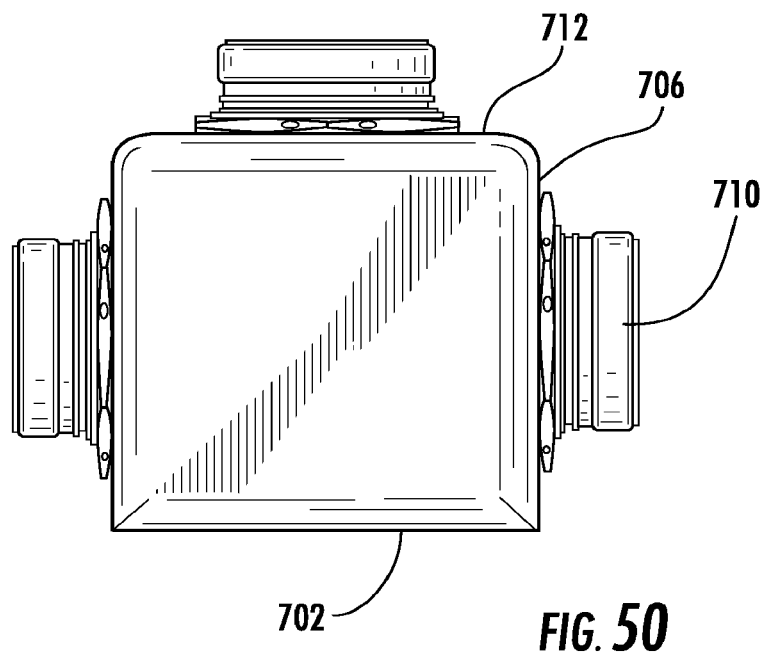
Figure 51:
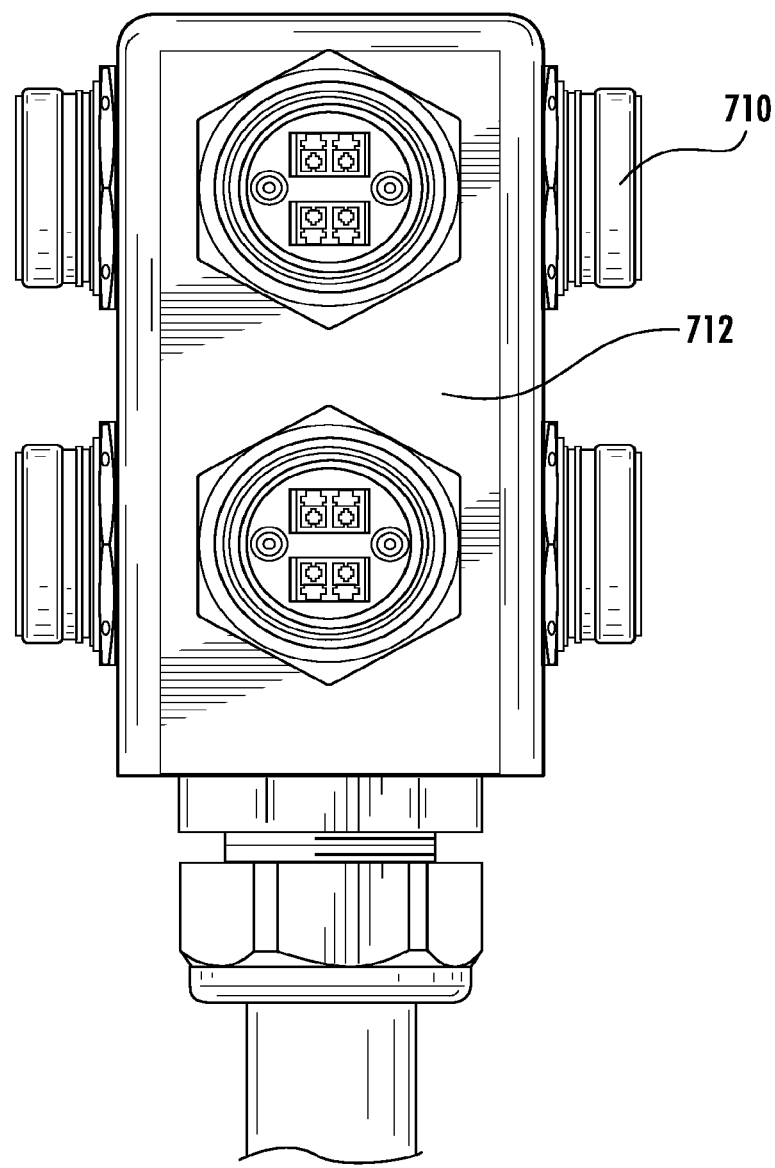
Figure 52:
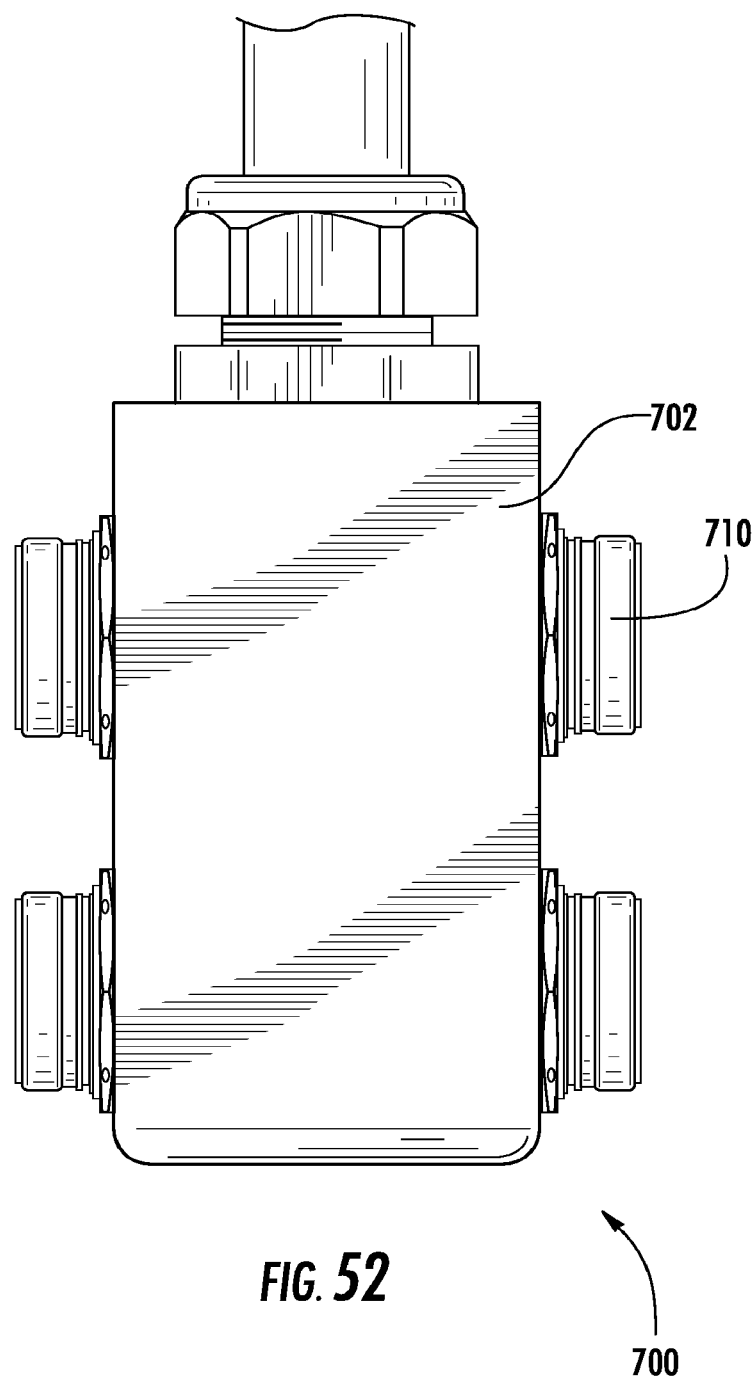
Figure 53:
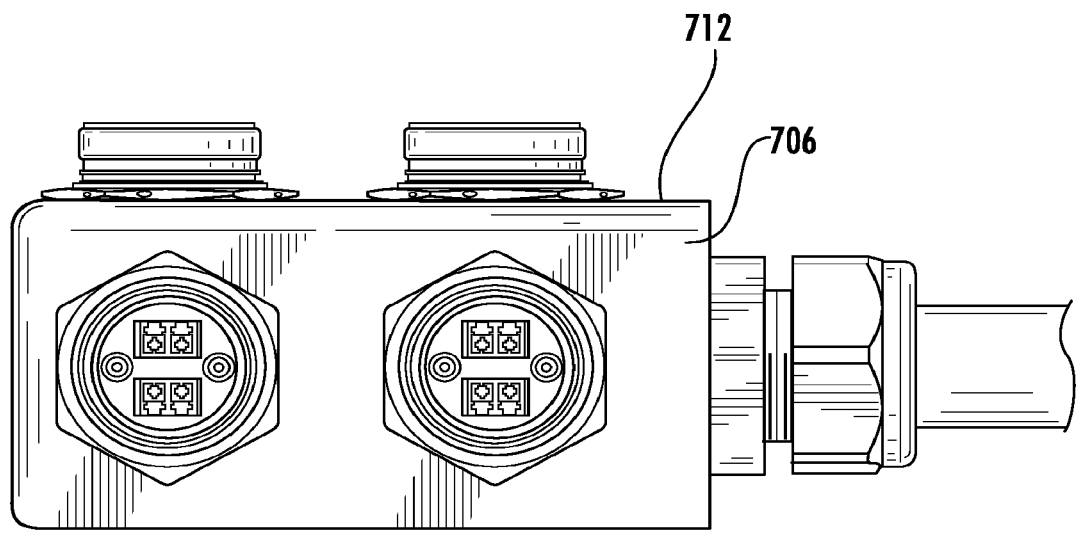
Figure 54:
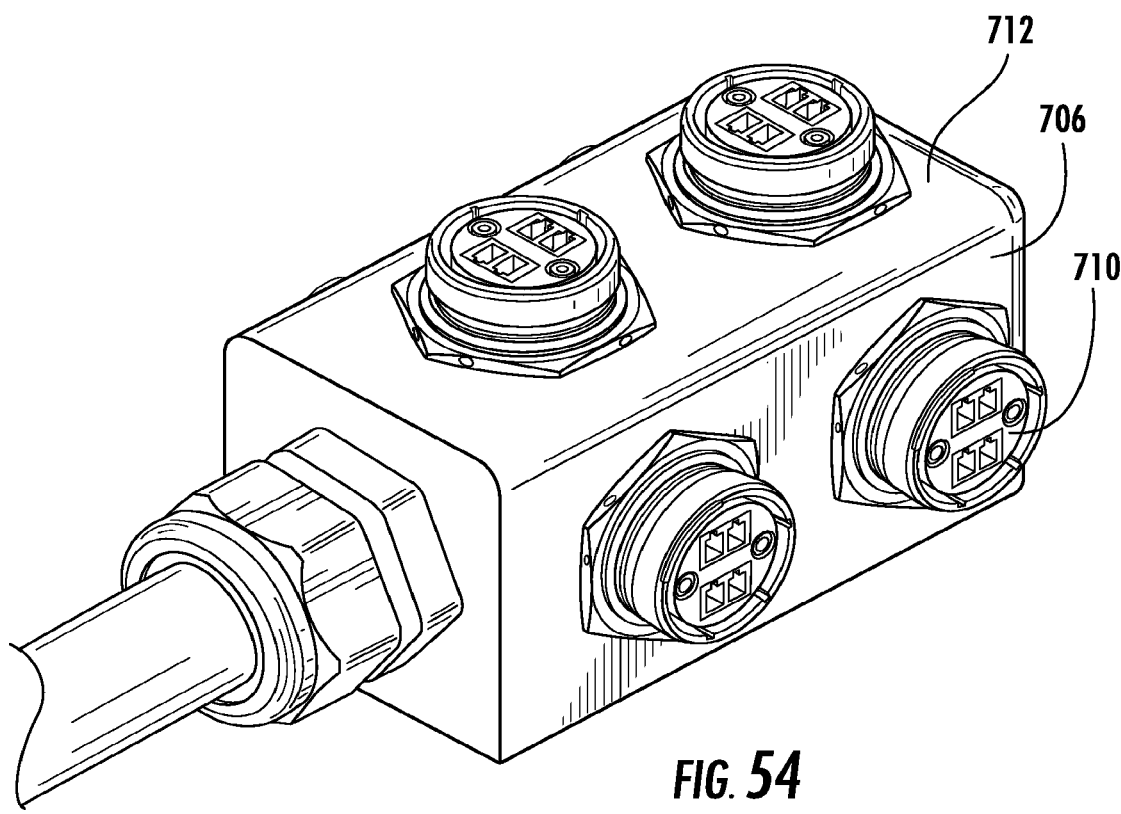
Figure 55:
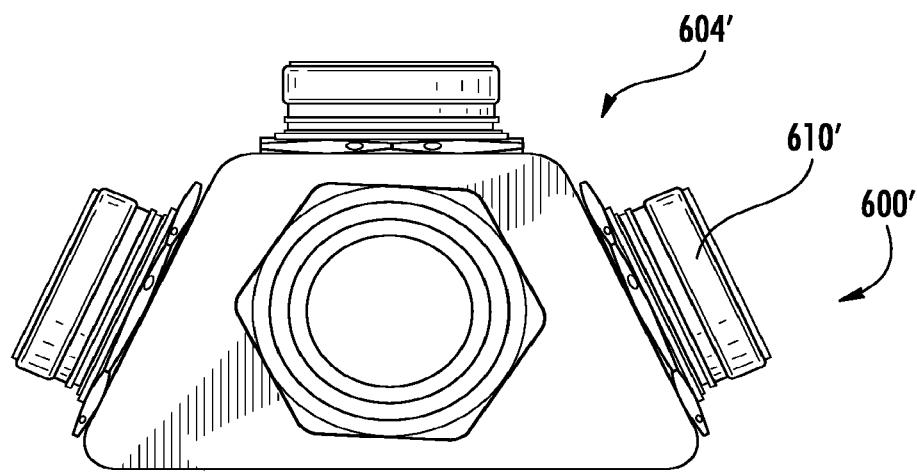
FIGS. 55-59 are various views of an enclosure according to yet further embodiments of the invention.
Figure 56:
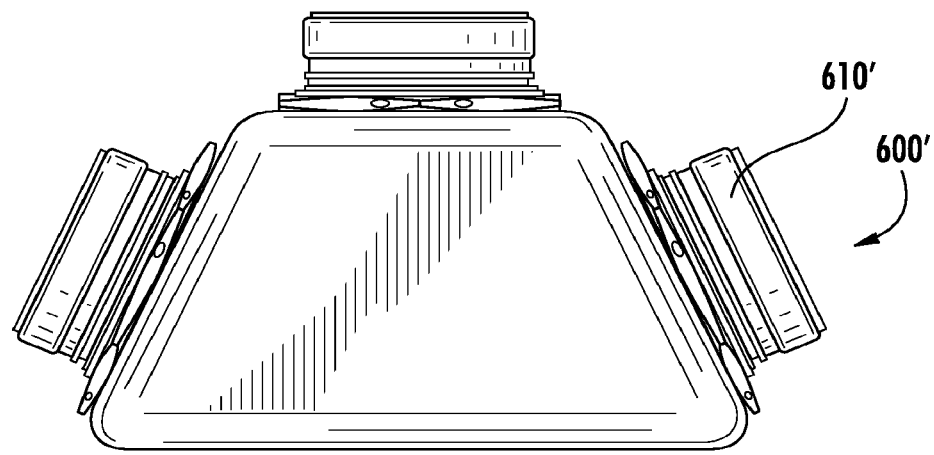
Figure 57:
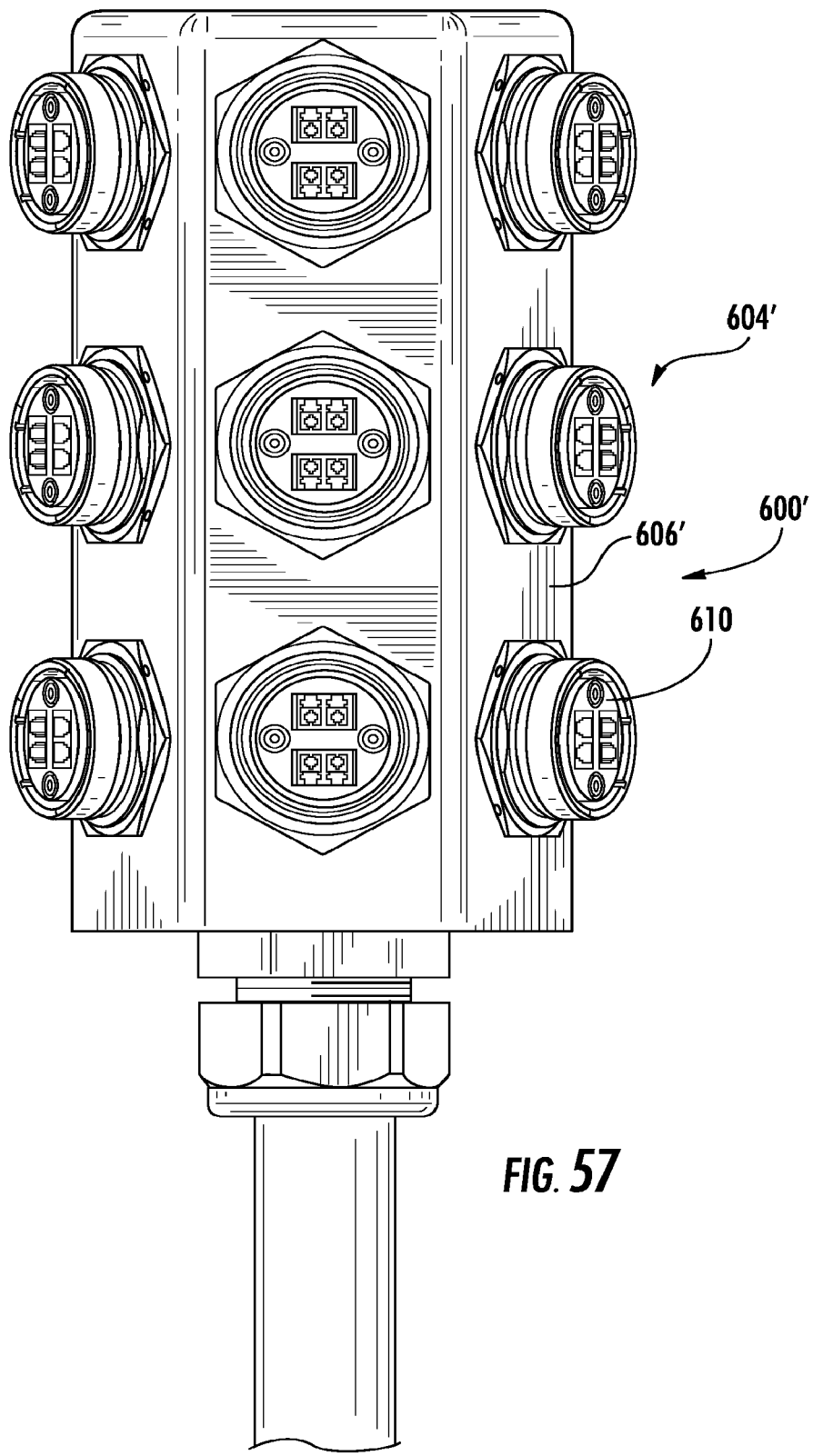
Figure 58:
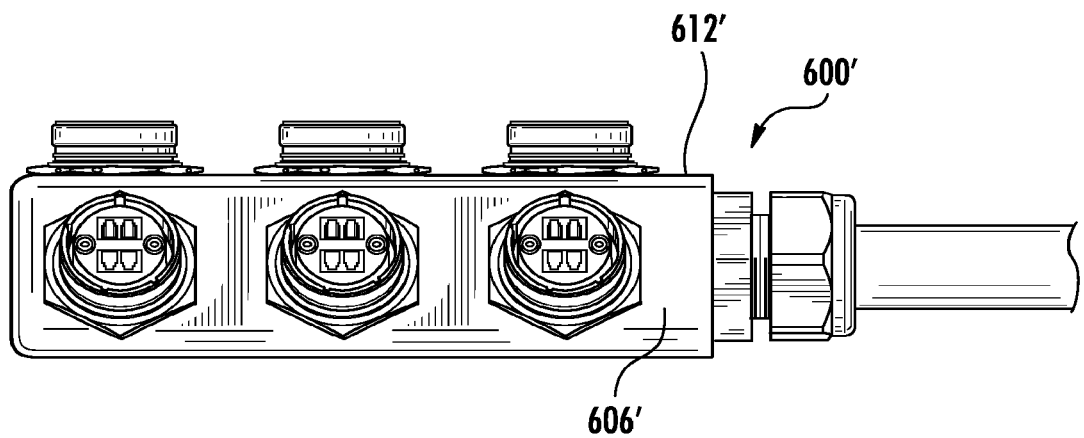
Figure 59:
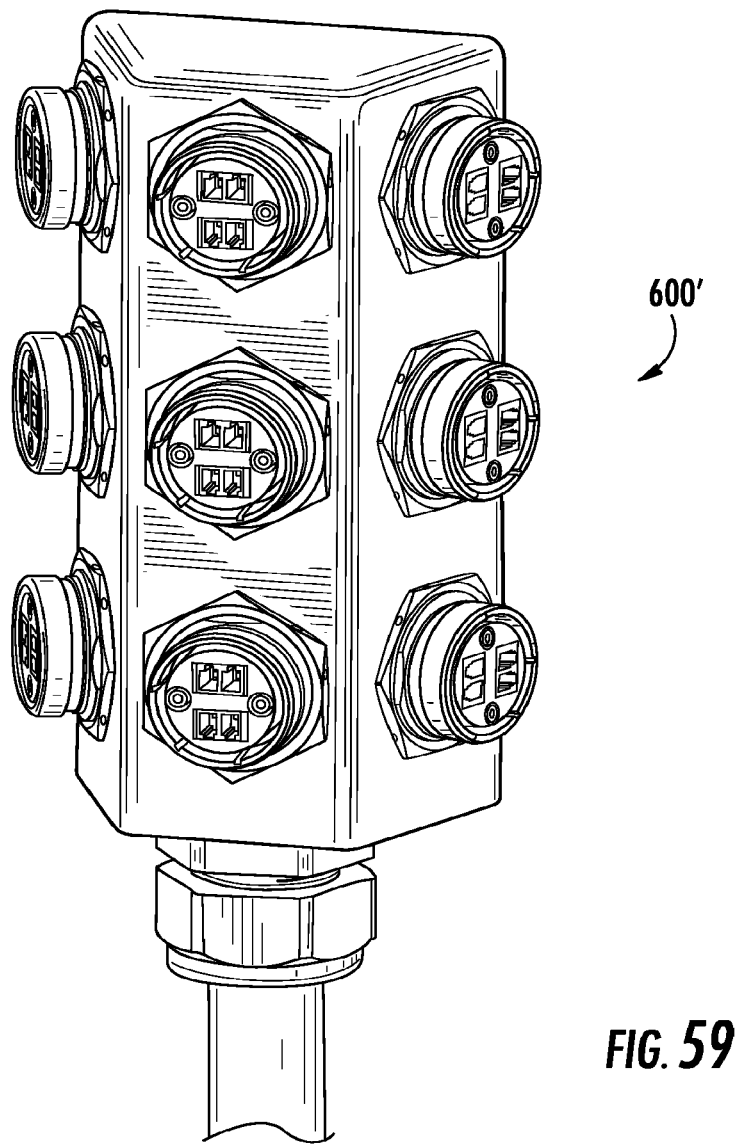
Figure 60:
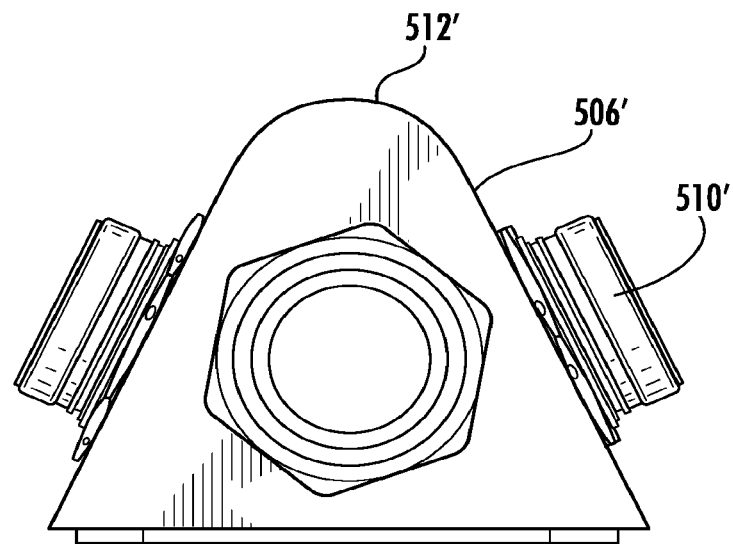
FIGS. 60-64 are various views of an enclosure according to still further embodiments of the invention.
Figure 61:
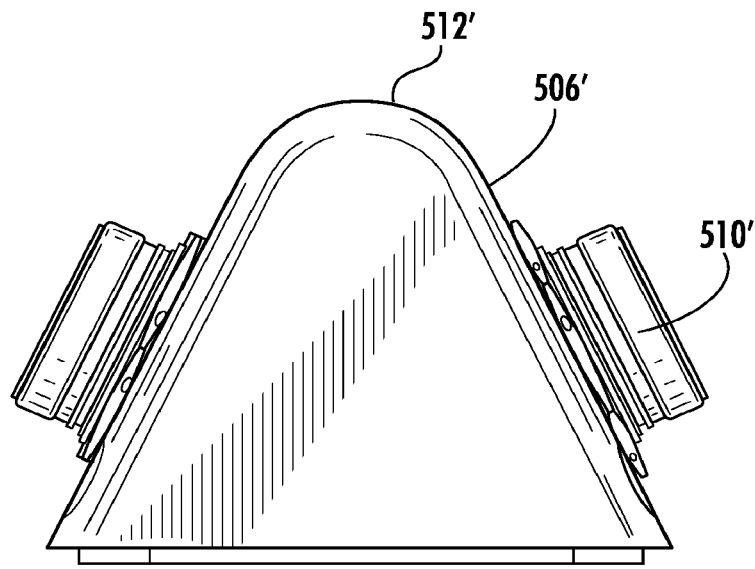
Figure 62:
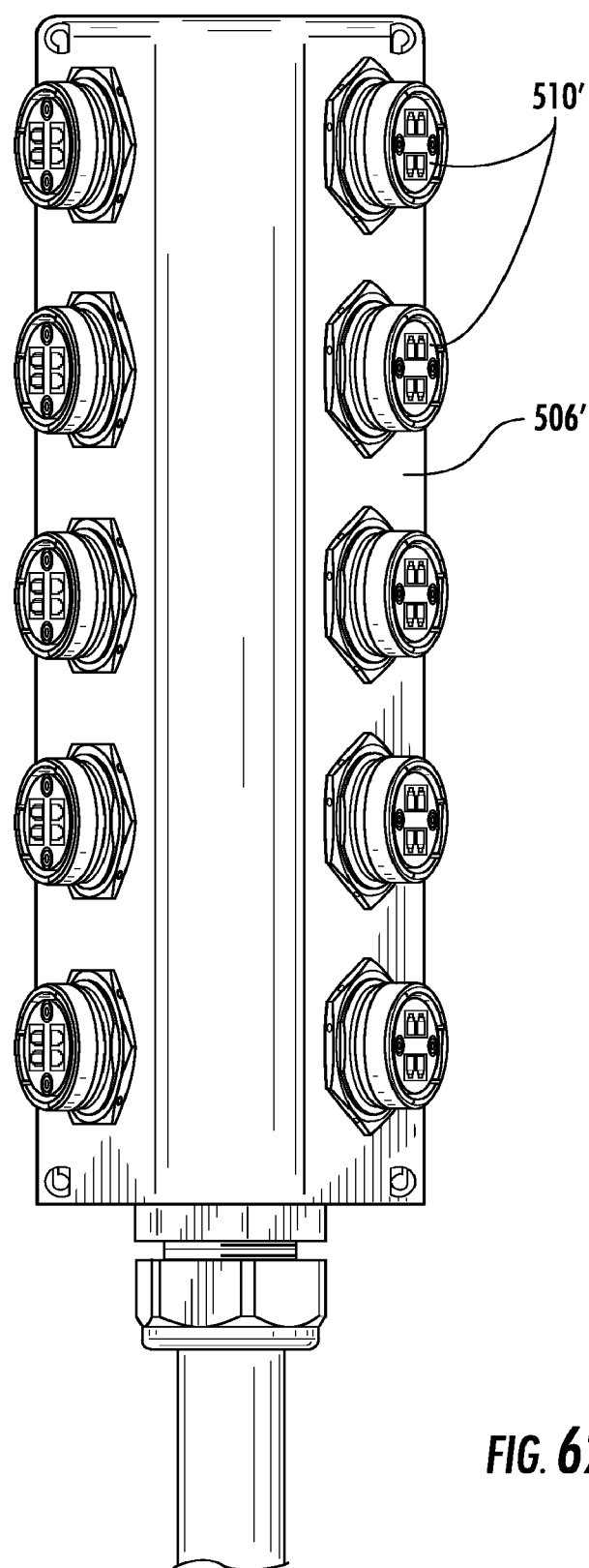
Figure 63:
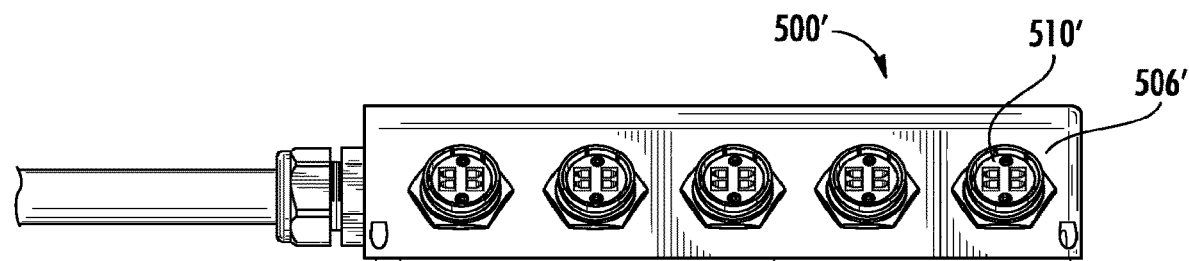
Figure 64:
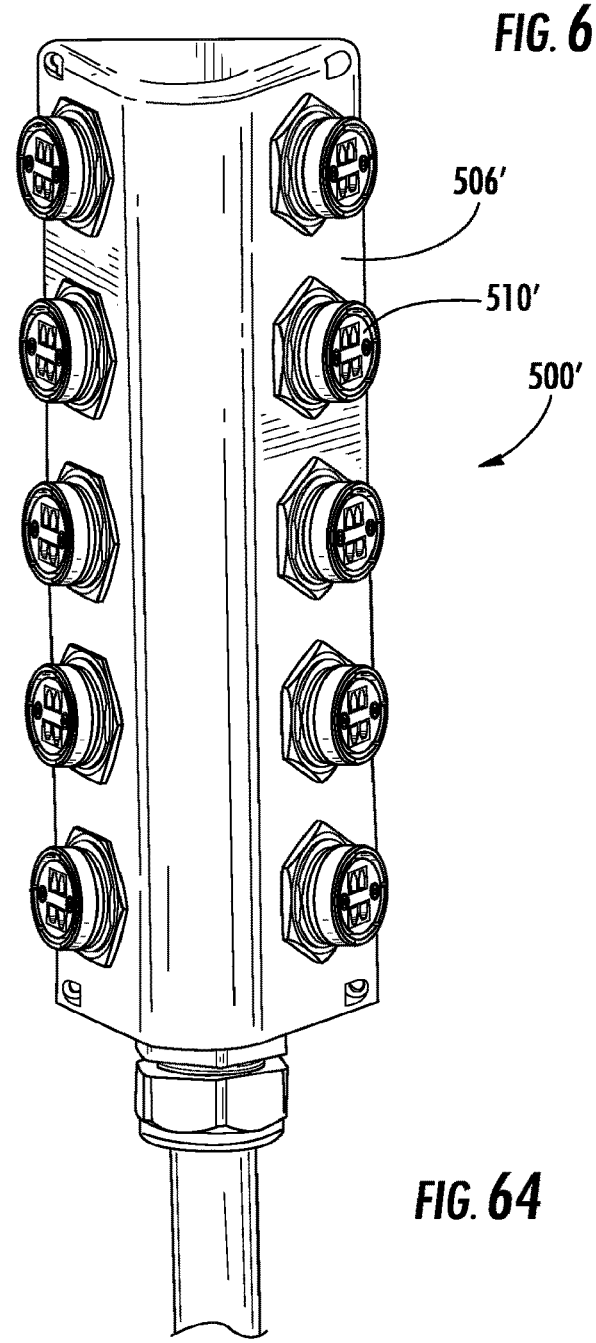
Figure 65:
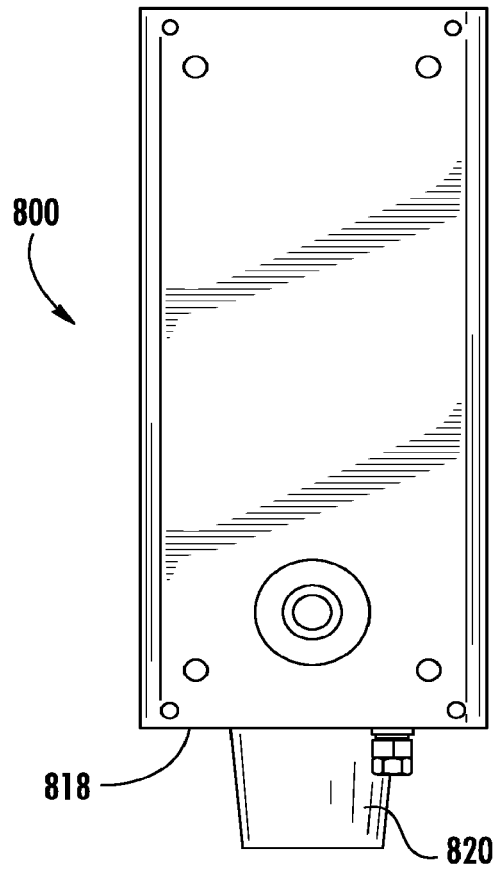
FIGS. 65-71 are various views of an enclosure according to yet further embodiments of the invention.
Figure 66:
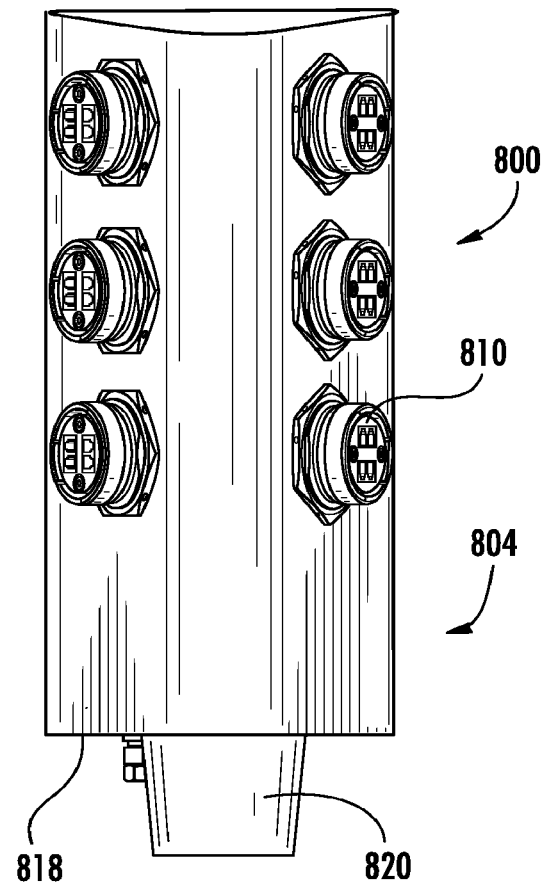
Figure 67:
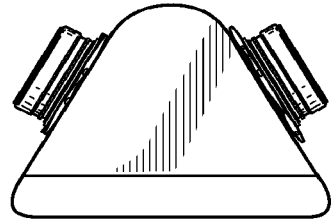

Enclosures 100 (shown in FIGS. 2-9), 200 (shown in FIGS. 10-17), and 300 (shown in FIGS. 18-25) aim to make it as easy as possible to pull the enclosure, while attached to the trunk cable, up to the top of the tower. As seen in FIGS. 2, 10 and 18, connectors 110, 210, 310 are on either side wall 106, 206, 306 of the shell 104, 204, 304, with a curved and smooth front 112, 212, 312 and top 114, 214, 314. There are three variations of the top surface 114, 214, 314 to make it easier to pull up the tower, e.g., to transition by and past any cross-beam of the tower, which contacts the top of the enclosure 100, 200, 300. The base 102, 202, 302 (best seen in FIGS. 7, 15 and 23) is attached to a pole or other mounting apparatus after the enclosure is pulled up the tower.

The enclosure 100 of FIGS. 2-9 has a fully rounded top 114 formed on the shell 104. The enclosure 100 may have the shortest length, but makes the shell 104 longer than the base 102, which may lead to a more expensive manufacturing process. The enclosure 200 of FIGS. 10-17 has a base 202 that is longer than the shell 204 and utilizes a half circle surface formed at the top 214 of the shell 204. The enclosure 300 of FIGS. 1 and 18-25 is essentially a curved spearheaded surface on the top 314 of the shell 304 that allows for deflection as the enclosure 300 is pulled up the tower, but minimizes the length of the enclosure 300.

The enclosures 100, 200, 300 provide smooth, sleek surfaces that should not catch on obstacles. Further, the designs may be more aesthetically pleasing than a typical box-shaped enclosure of the prior art. The flipping of the mounting surface from prior designs, e.g., the lid becomes the base, and the base becomes the shell, allows for such changes. In addition, the added curves at the front surfaces 112, 212, 312 and top surfaces 114, 214, 314 may help to decrease the wind load drag coefficient experienced by the enclosures 100, 200, 300 when mounted to the tower. The flat panel of the base 102, 202, 302 is mostly obstructed anyway, as it is the mount side of the enclosure 100, 200, 300.

For a sense of size, the embodiments depicted in FIGS. 1-25 are about 3.5"×3"×11".

Referring now to FIGS. 26-55, the enclosures 400, 500, 600, 700 illustrated therein aim to minimize the enclosure footprint on the tower. With the shell/base concept, as described above, the shape of the shell may be modified to a multitude of different shapes and attached to the base and mounted to the tower. Each of the different shell shapes has its pros and cons and may be selected by the technician to best fit the needs of the particular installation. However, all of the enclosures in FIGS. 26-55 can reduce or minimize enclosure size and provide good usability relative to the enclosures of the prior art.

Referring first to FIGS. 26-32, the enclosure 400 shown therein has a generally triangular profile, with side walls 406 of the shell 404 meeting a very narrow front 412. This arrangement can reduce space in such a way as to make the enclosure 400 narrower, which makes the enclosure easier to install, e.g., pull up the tower. Secondly, the connectors 410 mounted to the side walls 406 are no longer disposed at 90 degrees to the base 402; instead, the side walls 406 and connectors 410 are at disposed at an oblique angle (e.g., between about 30 and 65 degrees relative to the flat surface of the base 402, with a range of 55 to 60 being suitable for some embodiments), which can allow for more flexibility for the installation of jumper cables/cords in the connectors 410, as the bends that need to be made in the jumper cordage may be less severe. The enclosure 400 may also decrease overall wind load, as the wind load coefficient may be lower due to the triangular shape. The enclosure 400 includes a relatively flat top 414.

The enclosure 500 of FIGS. 33-40 is similar to the enclosure 400, but the front 512 of the shell 504 between the side walls 506 is wider and more gently curved. The base 502 is similarly wider.

The enclosure 600 shown in FIGS. 41-47 takes the minimization a step further. The enclosure 600 is an even shorter structure, as it employs a trapezoidal shell 604 with side walls 606 and a flat front 512, and it has a "3×2" array of connectors 610 rather than a "2×3" connector array configuration. The enclosure 600 has an increased width, potentially making it slightly less easy to pull up the tower and potentially increasing the wind load. However, once the enclosure 600 is mounted to the tower, the width may not be an issue, as the enclosure 600 has a very minimal footprint from its shell 604 and base 602 and the entire width may be covered by the surface of the tower supporting the enclosure. The trapezoidal shape of the shell 604 may also serve to decrease windload, due to the angled side surfaces and a reduction in height, which may also have a smaller wind drag coefficient. Furthermore, the smaller flat sidewalls 606 would also aid in decreasing windload. The larger mounting base 602 may be a negative factor for wind load; however, as the base 602 is mounted to the tower structure, this impact may be lower in some installations as the mounting surface of the structure can sometimes be larger than the mounting surface of the enclosure.

Referring now to FIGS. 48-54, the enclosure 700 shown therein has a shell 704 with side walls 706 and a front 712 in a generally square profile. The enclosure also has a "3×2" array of connectors 710. The enclosure 700 maintains the short length of the enclosure 600 of FIGS. 41-47, but minimizes the width. This may make the enclosure 700 a bit thicker in the direction from the base 702 to the front 712. The squared design may also increase the difficulty to route jumper cables to the connectors 710 mounted on the side walls 706 and the front 712 of the enclosure 700 due to increased bend angles on the jumper cordage. Wind load may or may not be decreased relative to the enclosure 600, as there is a negative tradeoff between the squared side walls 706 of the enclosure 700 versus the angled side walls 606 of the enclosure 600, and a positive tradeoff in that the enclosure 700 is more compact, e.g., narrower side-to-side, as compared to the enclosure 600.

For a sense of size, the enclosure 400 is about 10"×4"×4", the enclosure 500 is about 10"×6"×4", the enclosure 600 is about 6"×4.5"×2.5", and the enclosure 700 is about 6"×3"×3".

Although the enclosures shown herein illustrate the input cable 50 (see FIG. 1) connected to the enclosure via a cable gland, there are other options, such as a trunk connector or connectors, molding over the cable, an epoxied nozzle, or other methods of integration. The concepts of the designs in may be extended to accommodate different numbers of RRUs (remote radio units) deployed upon the tower. For example, the concepts could be extended to a 1×6 connector set-up, dependent on the number of RRUs supported, such as a hexagonal or octagonal shape. They can also be elongated to allow for additional RRU capacity. As another example, the enclosure 600' (FIGS. 55-59) has nine ports with connectors 610' instead of six ports, with the side walls 606' and the front 612' of the shell 604' being longer than those of the enclosure 600. Alternatively, an enclosure 500' (see FIGS. 60-64) has ten connectors 510' distributed on two side walls 506' that are longer than those of the enclosure 500.

Notably, as can be seen in FIGS. 65-71, the bottom end 818 of an enclosure 800 has a flat surface from which a nozzle 820 extends. A cable (not shown) is routed into the enclosure 800 through the nozzle 820 to be connected with the connectors 810 located on the exterior of the shell 804. The flat surface of the bottom end 818 can provide a bearing surface against which a technician's fingers can press when the nozzle 820 and cable are grasped to support the enclosure. Combined with the nozzle 820, it can provide an ergonomic and intuitive place to support the enclosure 800. Essentially, the installer can wrap his hand around the nozzle 820 with the upper part of the hand/pointer finger resting on the flat bottom end 818 of the enclosure 800. This moves the weight to the top of the hand rather than being solely dependent on the grip in the fingers. This allows for an easier installation and support of the enclosure 800. The cable entry port can also be moved to the center allowing flat flaps on all sides to support the weight of the enclosure 800 on the hand during installation. This also makes one-handed installation easier.

Figure 68:
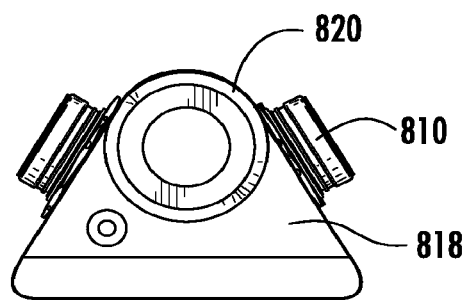
Figure 69:
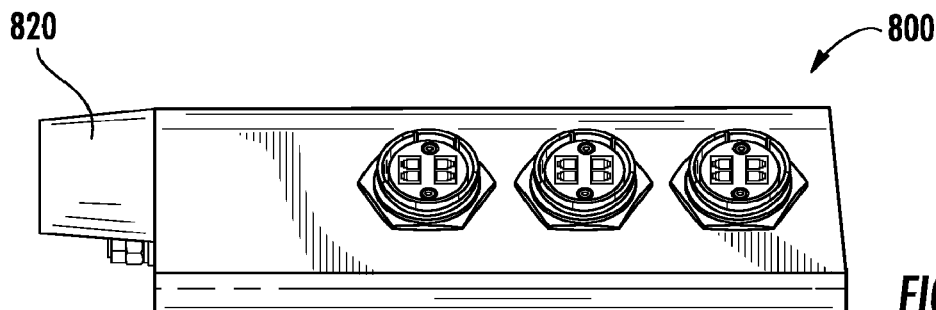
Figure 70:
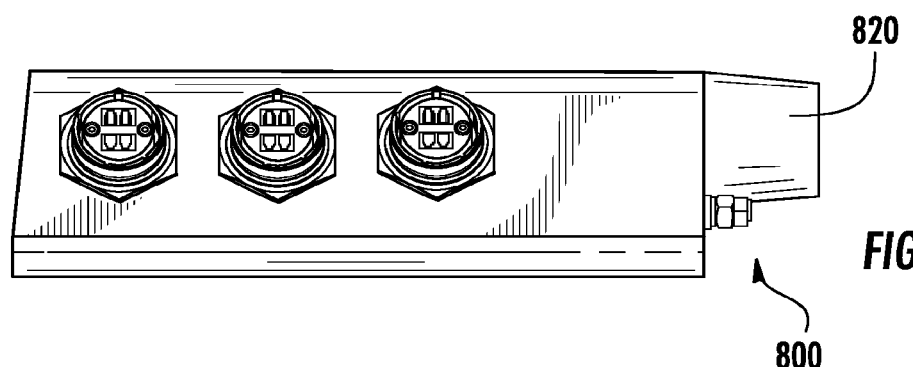
Figure 71:
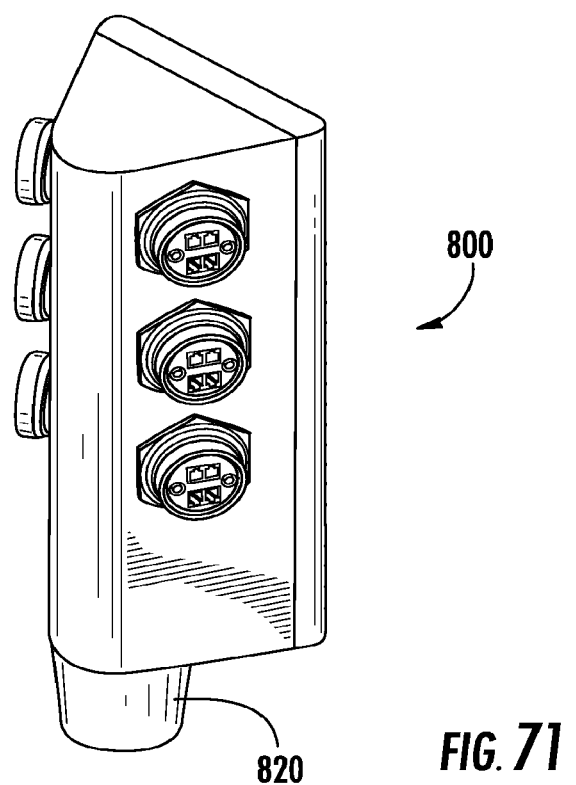
Figure 73:
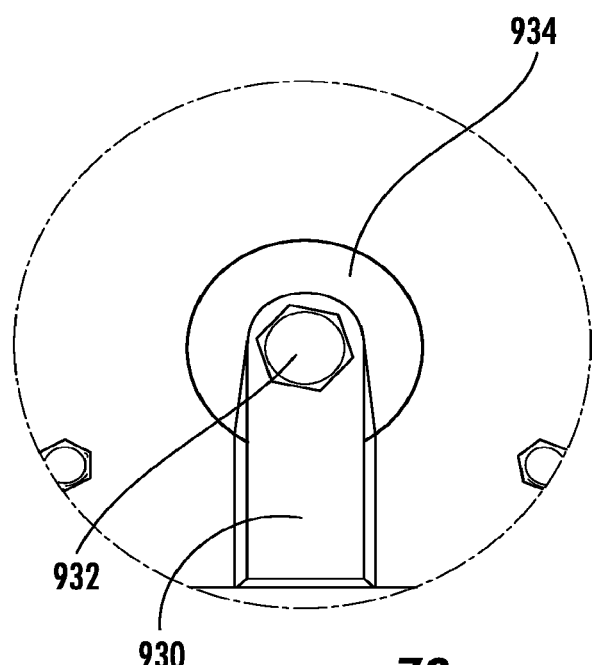
FIGS. 72-76 are various views of an enclosure according to still further embodiments of the invention.
Figure 72:
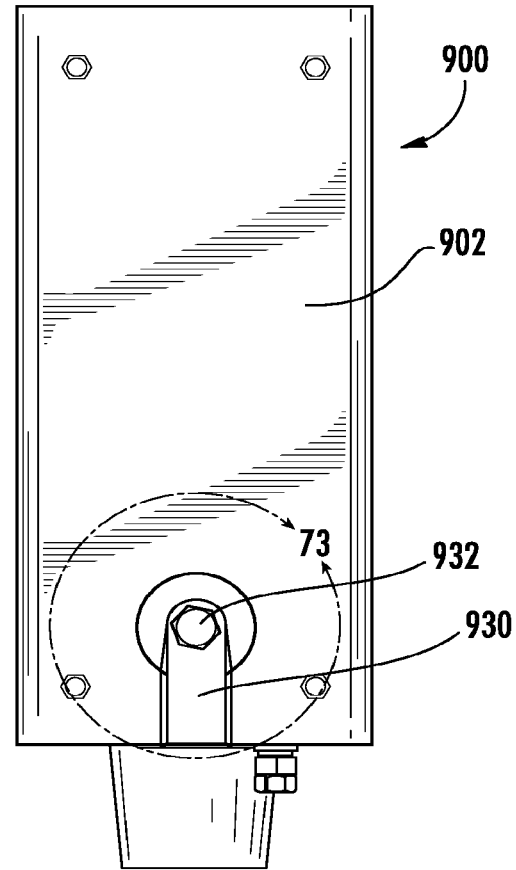
Figures 74, 75:
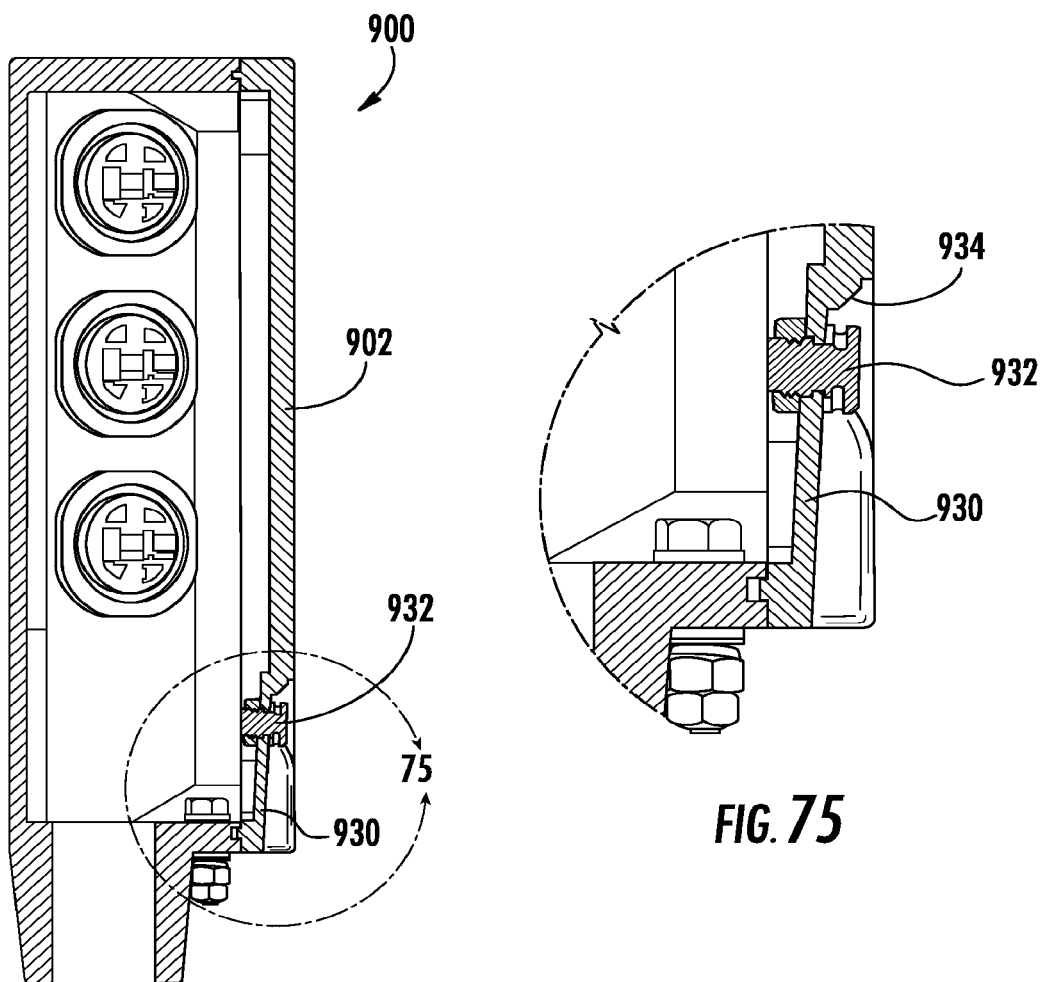
Figure 76:
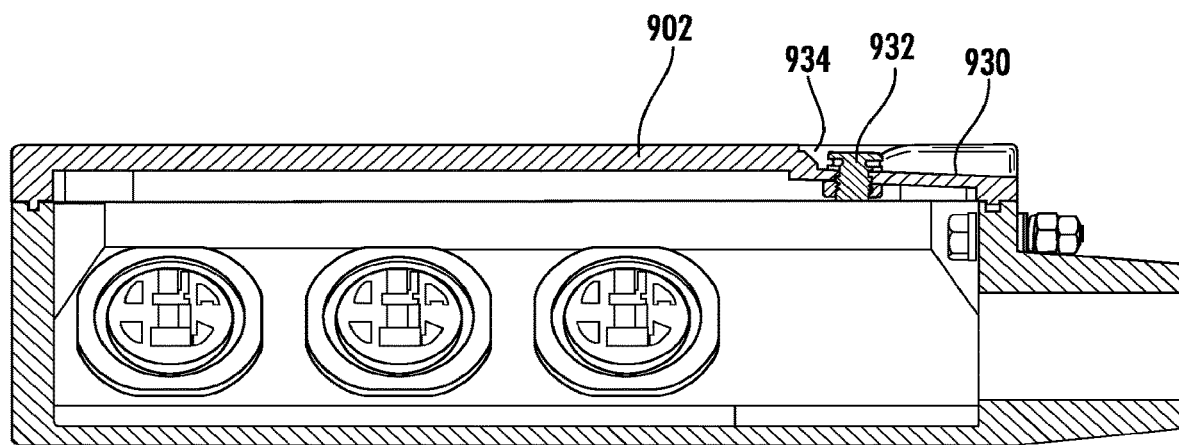
Figure 77:
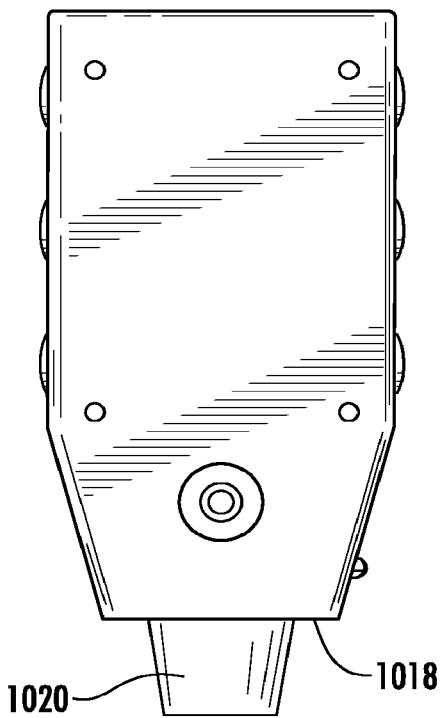
FIGS. 77-83 are various views of an enclosure according to even further embodiments of the invention.
Figure 78:
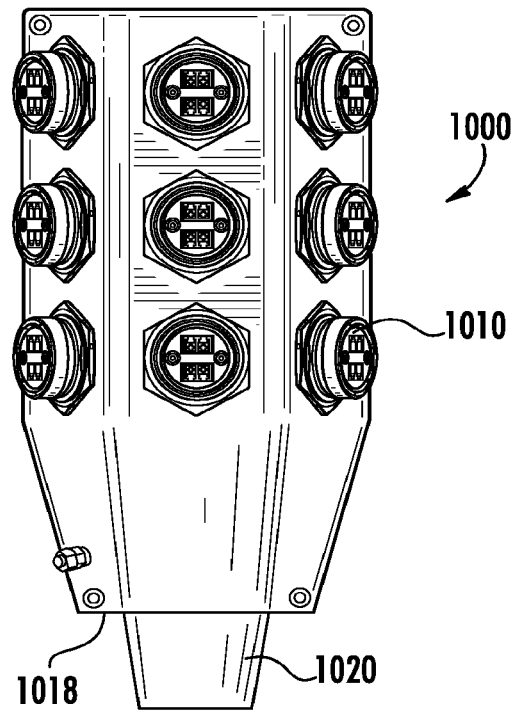
Figure 79:
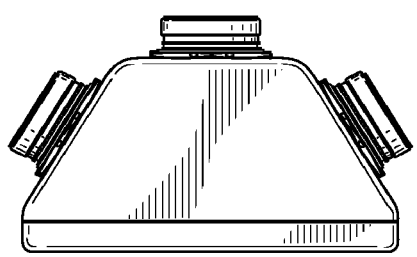
Figure 80:
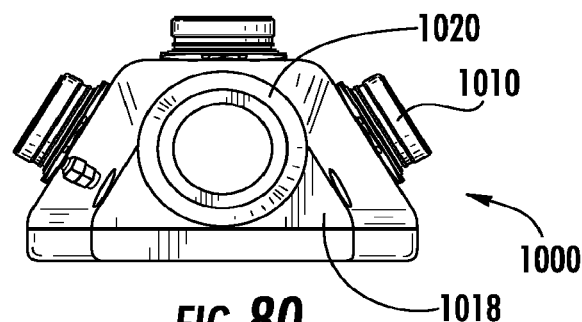
Figure 81:
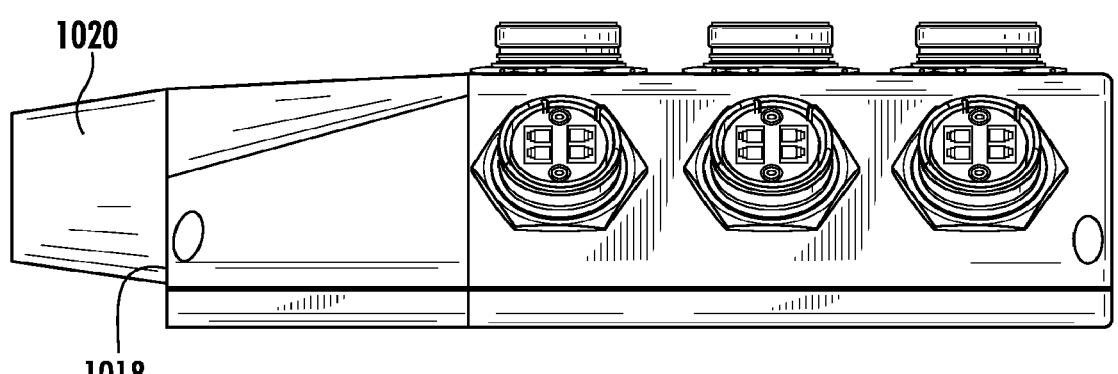
Figure 82:
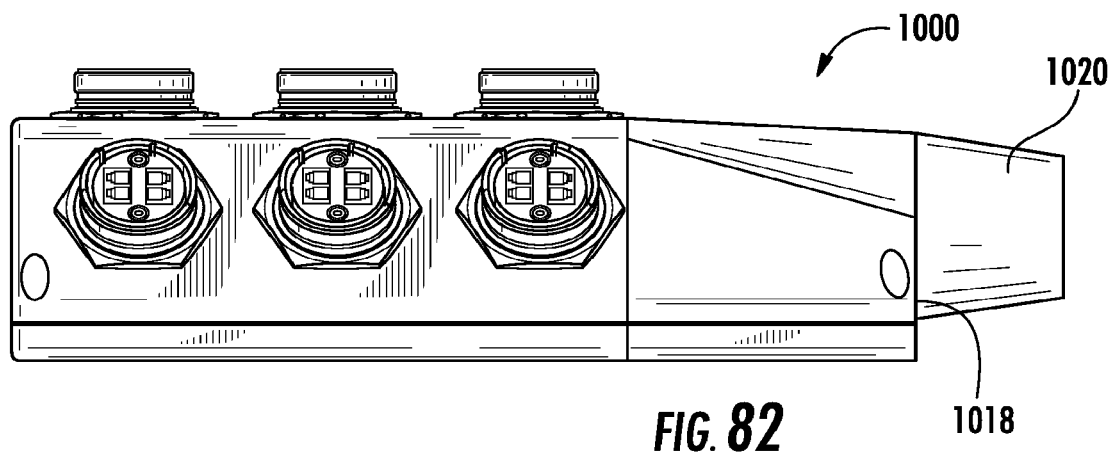
Figure 83:
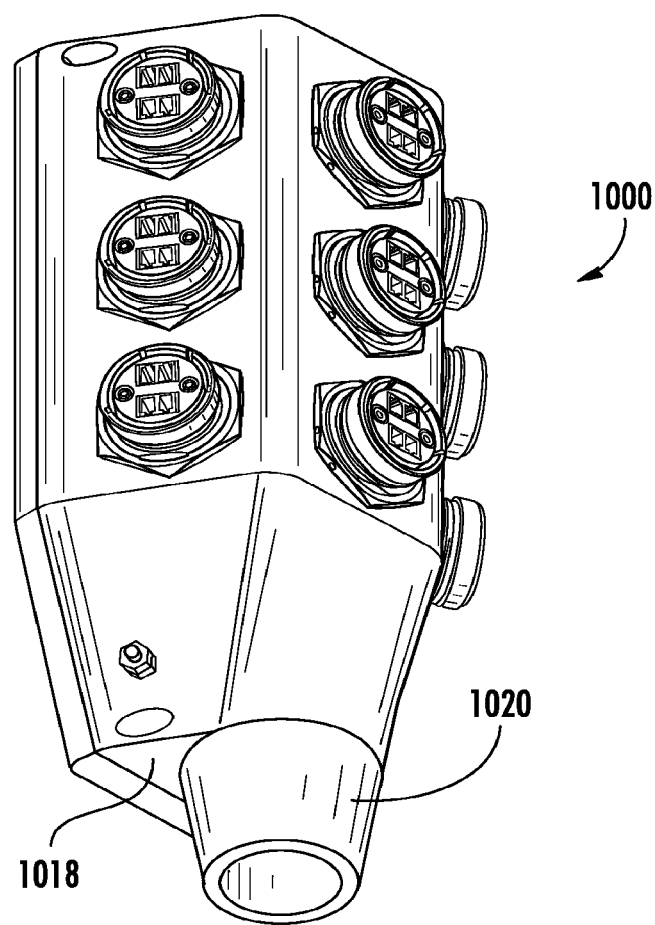
Figure 84:
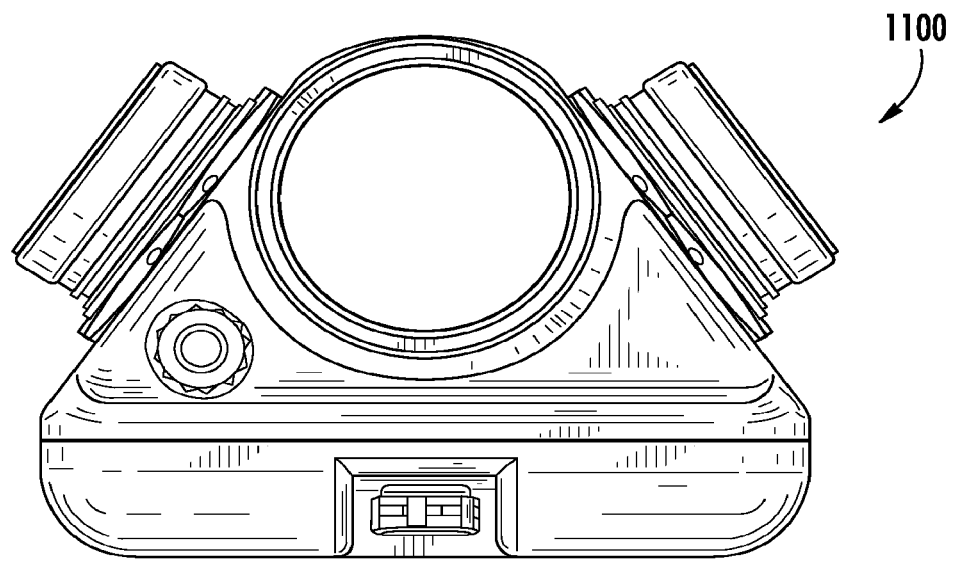
FIGS. 84-88 are various views of an enclosure according to still further embodiments of the invention.
Figure 85:
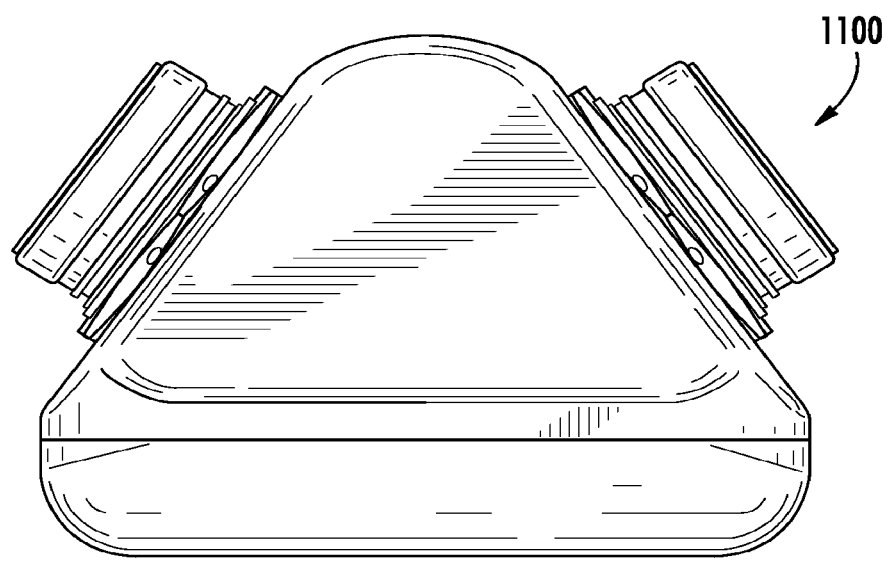
Figure 86:
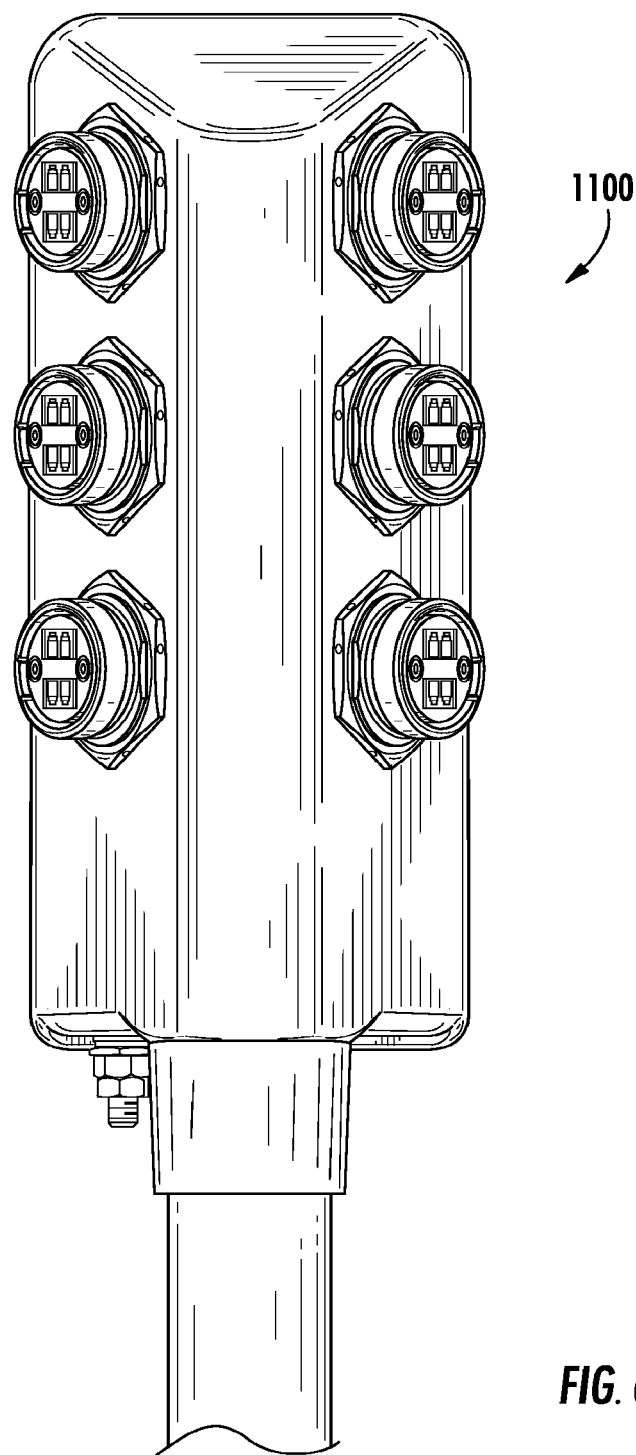
Figure 87:
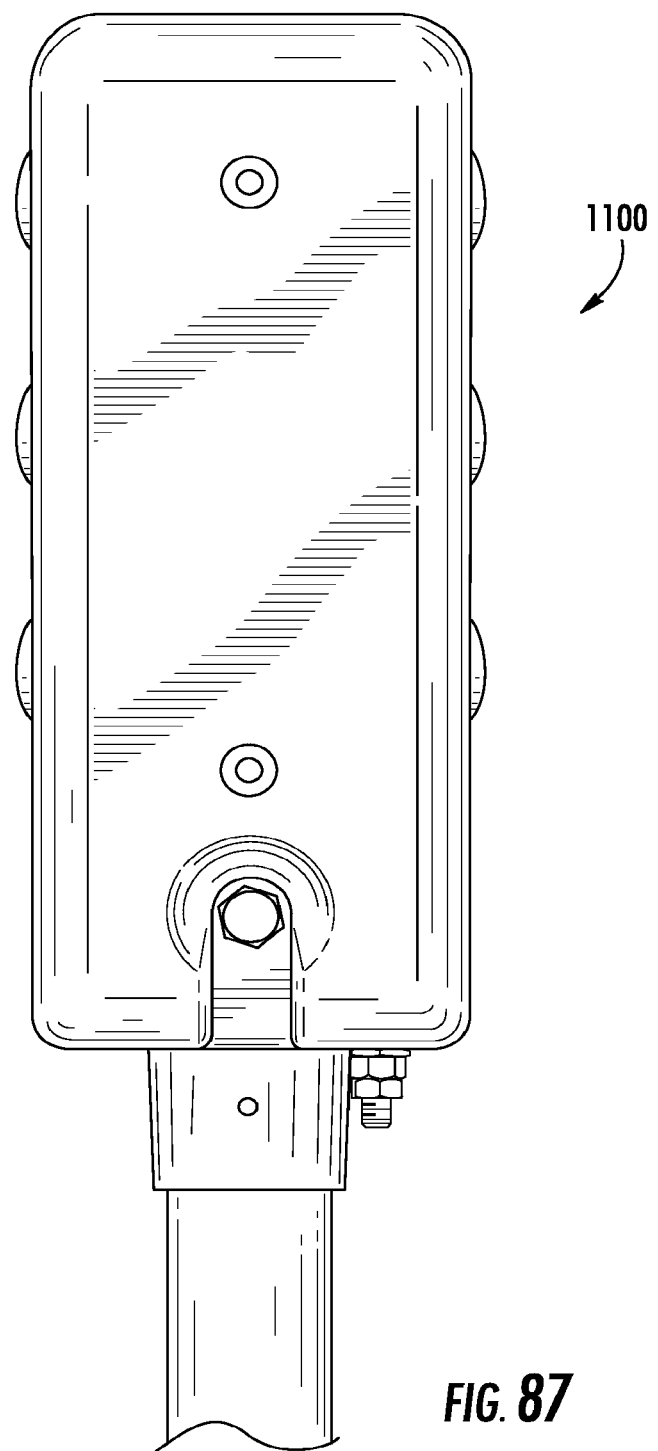
Figure 88:
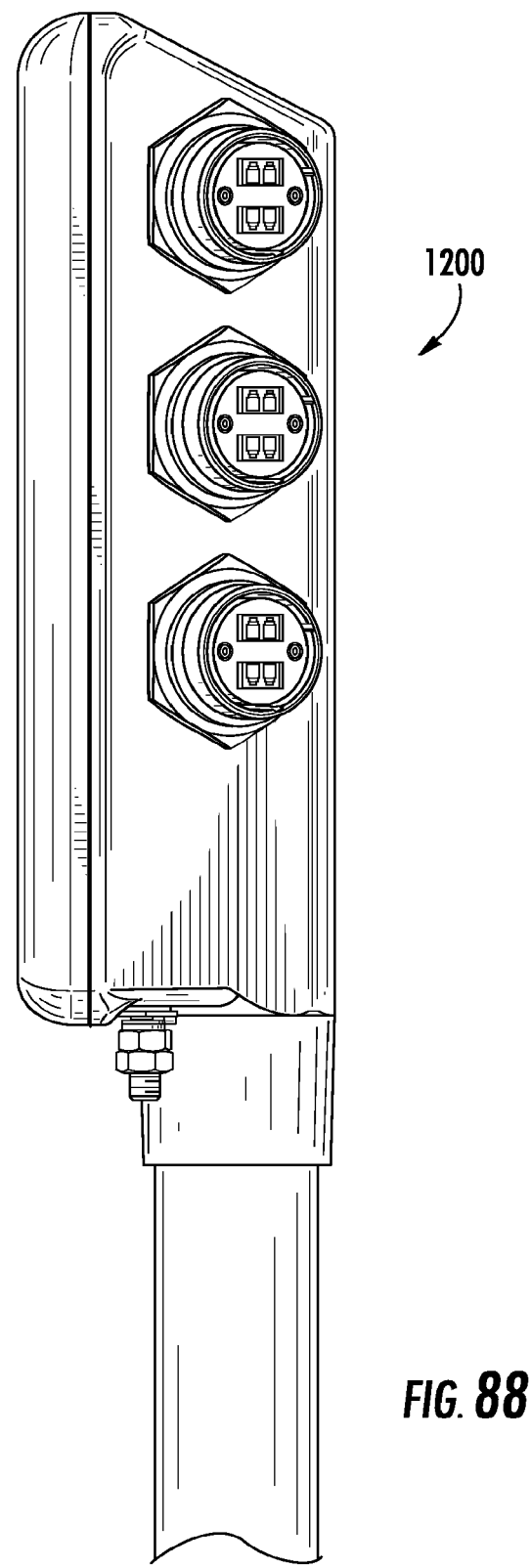
Figure 89:
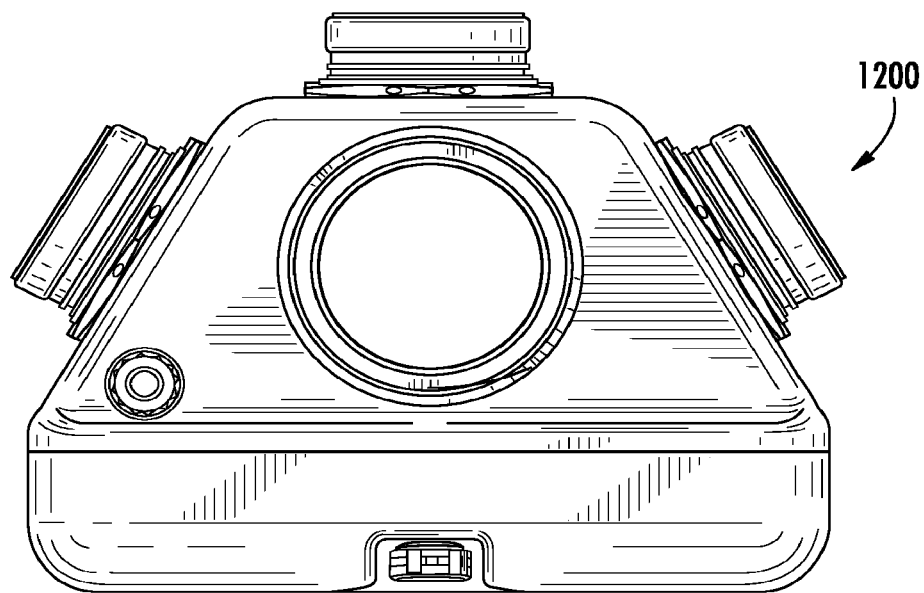
FIGS. 89-93 are various views of an enclosure according to even further embodiments of the invention.
Figure 90:
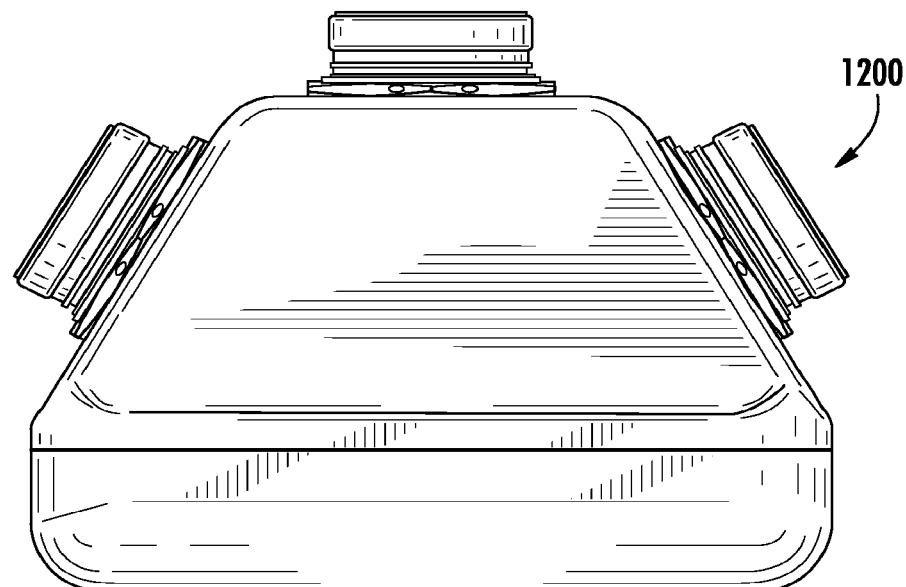
Figure 91:
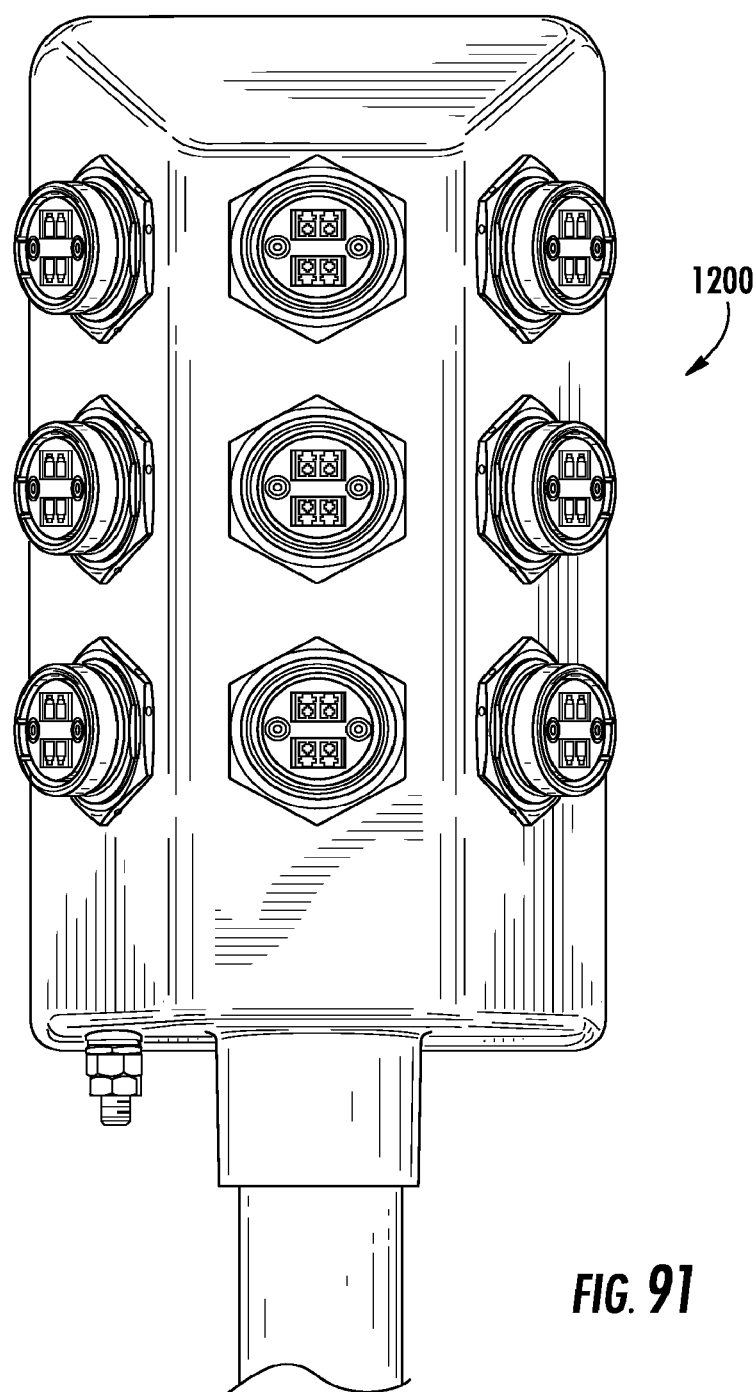
Figure 92:
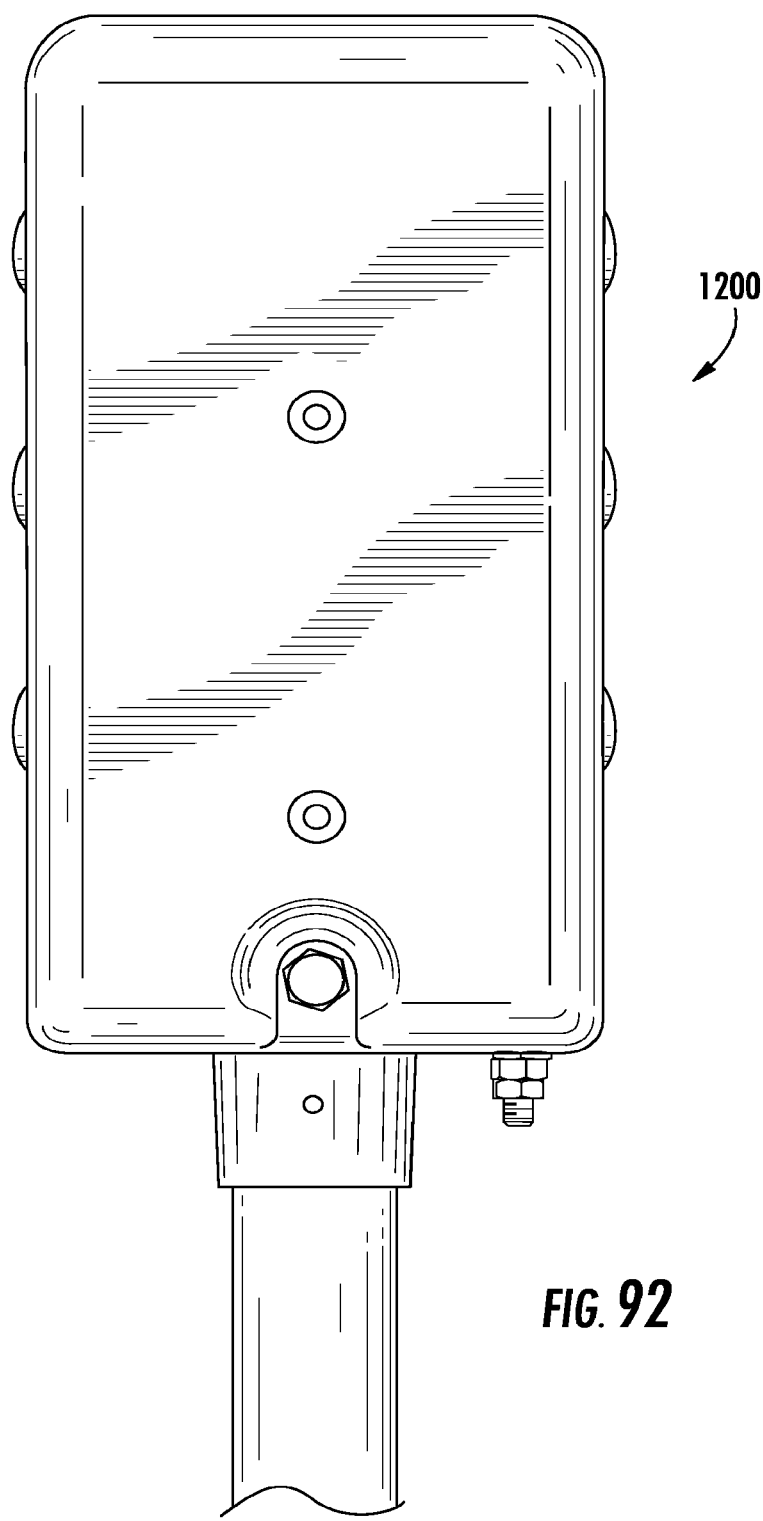
Figure 93:
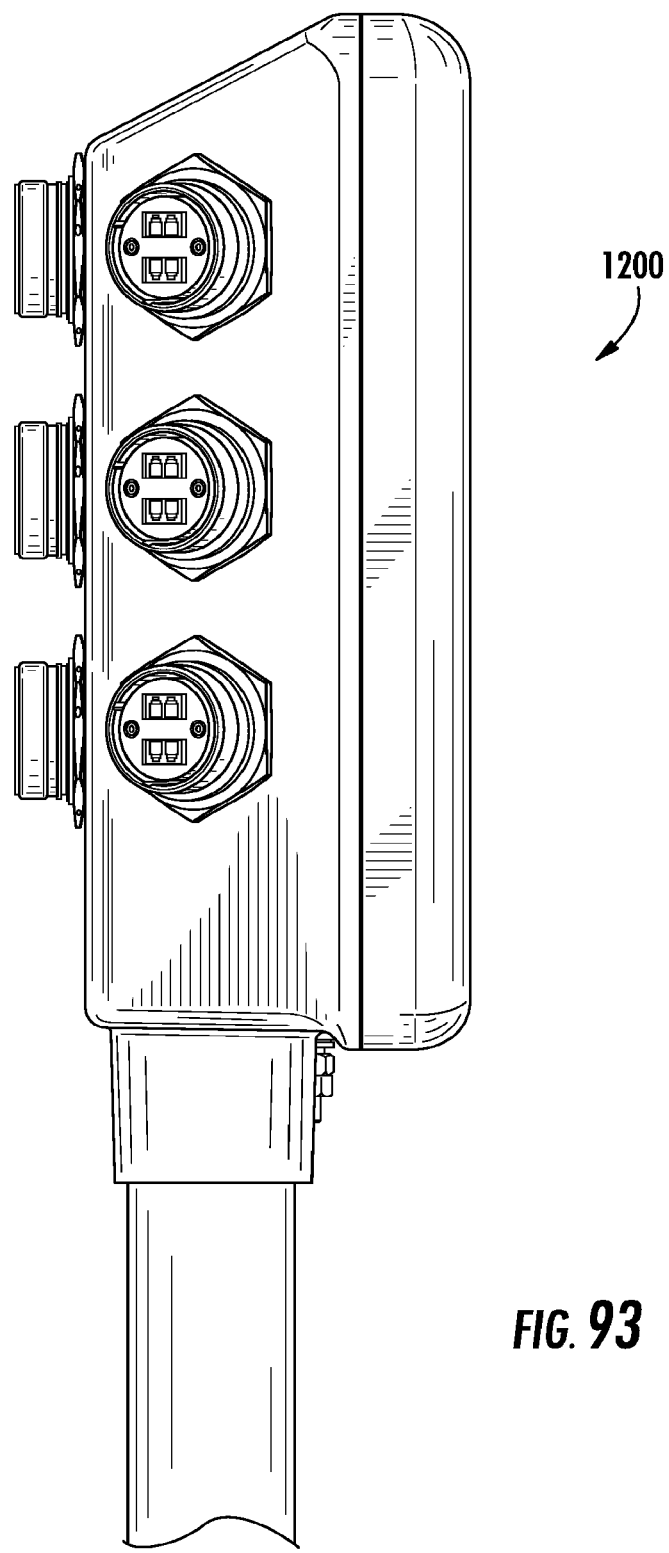

Also notable is the placement of the nozzle 820 on the bottom end 818 of the enclosure 800: namely, that the nozzle 820 is located in the "corner" of the triangular bottom end 818 (see FIG. 68). Placement of the nozzle 820 in this location can facilitate assembly of the enclosure 820. This placement means that the conductors in the hybrid cable need only slight manipulation for connection with the connectors 810 in the enclosure. With hybrid cable constantly increasing in size to higher and higher AWG cable, manipulating conductors in a small space and in short lengths can be very difficult. With this configuration, the cables rest on what is the "bottom" of the shell 804 during assembly where the shell 804 is flipped upside down. This arrangement can make it easier to splice or extend the conductors as well as simply route them to the connectors 810 if they are left whole. This arrangement also leaves more room for the assembler to route the optical fiber, as it can leave a large entire layer empty for fiber routing, which may be required/desirable in order not avoid overbending of the fiber.

Referring now to FIGS. 72-76, an enclosure 900 is shown therein. In this embodiment, a drainage channel 930 is included below a vent 932 in the flat base 902 of the enclosure 900. The vent 932 is included in the enclosure 900 to equalize the pressure in the enclosure 900 during temperature swings to alleviate stress on the joints. Notably, the entirety of the vent 932 is offset from the flat base 902 of the enclosure 900 (see FIG. 75) to protect it during installation. A rounded drainage surface 934 surrounds the vent 932.

It is desirable that water not be permitted to pool adjacent the vent 932, or that dust or other debris collect near the vent 932. The presence of the sloping channel 930 adjacent the vent 932 and in communication with the drainage surface 934 can ensure that water and debris can be conveyed away from the vent 932 in most orientations, including an orientation in which the flat base 902 of the enclosure 900 serves as the top surface (i.e. the orientation shown in FIG. 76). In addition, the sloped channel 930 can prevent ice build-up from pooled water. All these environmental factors can eventually damage or block the vent 932 from working. Only when the enclosure 900 is suspended upside down, with the cable extending upwardly, would the channel 930 not convey water and debris away from the vent 932, and this orientation is impractical and therefore disfavored.

Referring now to FIGS. 77-83, an enclosure 1000 has a hexagonal profile with nine connectors 1010 such as that of the enclosure 600' of FIGS. 55-59, but also includes a nozzle 1020 and a flat bottom end 1018 as described above. A slightly differently version of a six-connector enclosure similar to the enclosure 800 of FIGS. 65-71 is shown in FIGS. 84-88 at 1100. A slightly different version similar to the nine-connector enclosure 1000 of FIGS. 77-83 is shown at 1200 in FIGS. 89-93.

Figure 94:
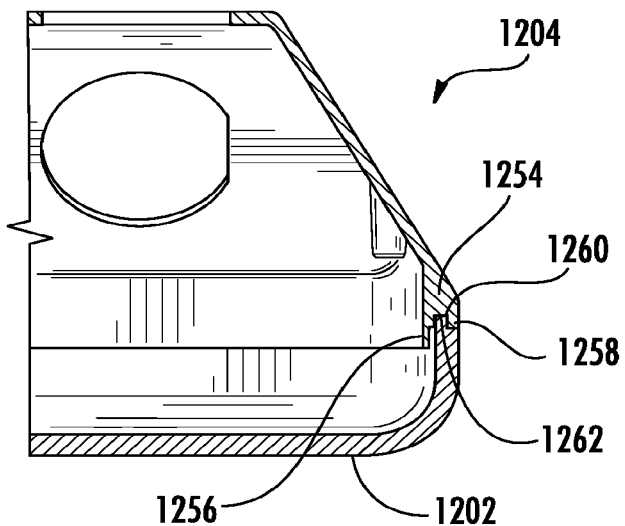
FIGS. 94 and 95 are enlarged section views of the enclosures of FIGS. 89 and 85 showing the mating of the base and cover.

Referring now to FIG. 94, a partial section view of the enclosure 1200 of FIGS. 89-93 illustrates that the lower end of the shell 1204 includes a thicker section 1254 from which an inner lip 1256 and an outer lip 1258 depend (forming a groove 1260 therebetween). The upper end of the base 1202 includes a rim 1262. The rim 1262 fits within the groove 1260 when the base 1202 and the shell 1204 are mated.

Figure 95:
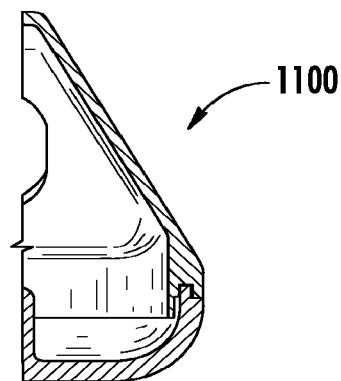

These design features coupled together can provide strong structural support in the breakout head despite a thin wall and multiple openings. First, the trapezoidal profile lacks a long flat section that would easy be compressed. Instead, a compressive force on the front of the shell 1204 is generally directed outwards towards the base 1202. The thicker sections 1254 of the lower ends of the shell 1204 can withstand the outwardly-directed force described above. Additionally, the presence of the inner and outer lips 1254, 1256 and the rim 1262 provides both the base 1202 and the shell 1204 with a large surface area on which a sealing adhesive (such as epoxy) can bond. This arrangement also provides an extremely strong connection to conjoin the two pieces, creating a more solidified object through which any external forces can transfer. The inner lip 1256 can also prevent any epoxy spillover inside the enclosure 1200 during assembly and adds even more surface area to conjoin the two pieces. The epoxy can also provides a water tight seal. FIG. 95 shows a similar sealing arrangement for the enclosure 1100 of FIGS. 84-88.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention.

That which is claimed is:

1. An assembly for breaking out a hybrid cable having a plurality of power conductors and a plurality of optical fibers, the assembly comprising:
an enclosure including a shell mounted to a base, the shell and the base cooperating to define an interior cavity, the enclosure including a top end positioned opposite from a bottom end, a left side positioned opposite from a right side, and a front side positioned opposite from a back side, the front side being defined by the shell and the back side being defined by the base, the enclosure including a length that extends between the top end and the bottom end, a depth that extends between the front side and the back side, and a width that extends between the left side and the right side;
a plurality of hybrid connectors mounted to a hybrid connector connection region of the shell, the hybrid connector connection region including a central connection region positioned between a left connection region and a right connection region, the plurality of hybrid connectors being arranged in a plurality of parallel columns each extending at least partially along the length of the enclosure, the plurality of columns of hybrid connectors including a left column of hybrid connectors mounted at the left connection region, a central column of hybrid connectors mounted at the central connection region, and a right column of hybrid connectors mounted at the right connection region, the hybrid connectors of the left column facing at least partially in a leftward direction and the hybrid connectors of the right column facing at least partially in a rightward direction;
the enclosure including a tapered portion positioned between the hybrid connector connection region and the bottom end of the enclosure, the tapered portion having a tapered configuration that gradually decreases the width of the enclosure as the tapered portion extends in a direction from the hybrid connector connection region toward the bottom end of the enclosure, wherein the width of the enclosure at the bottom end is reduced as compared to at the top end, and wherein the width of the enclosure is greater at the hybrid connector connection region as compared to at the bottom end; and
wherein the hybrid cable enters the enclosure through the bottom end of the enclosure and wherein the plurality of power conductors and the plurality of optical fibers are directed through the interior cavity of the enclosure and connected to respective ones of the plurality of hybrid connectors.

2. The assembly of claim 1, wherein the tapered portion includes a left front facet that aligns generally with the left connection region, a right front facet that aligns generally with the right connection region, and a central front facet that aligns generally with the central connection region, and wherein the left and right front facets are obliquely angled relative to the central facet.

3. The assembly of claim 1, further comprising a tapered nozzle that projects downwardly from the bottom end of the enclosure, the tapered nozzle being configured for receiving the hybrid cable.

4. The assembly of claim 1, wherein the tapered portion has a dimension measured along the length of the enclosure that is longer than a diameter of each of the plurality of hybrid connectors.

5. The assembly of claim 1, wherein the hybrid cable is connected to the enclosure by a cable gland.

6. The assembly of claim 1, wherein the hybrid cable is connected to the enclosure by a trunk cable connector.

7. The assembly of claim 1, wherein the base has a flat configuration.

8. The assembly of claim 1, wherein from a front view the tapered portion includes straight sides that converge as the straight sides extend toward the bottom end of the enclosure.

9. The assembly of claim 1, wherein from an end view the left and right connection regions are aligned at oblique angles relative to the central connection region.

10. The assembly of claim 1, further comprising a vent adapted to equalize pressure within the enclosure.

11. The assembly of claim 1, further comprising a terminal accessible from outside the enclosure.

12. The assembly of claim 1, wherein at least one of the left, right, or central connection region includes a flat surface on which the plurality of hybrid connectors are mounted.

13. An assembly enclosure for breaking out a hybrid trunk cable comprising:
 a hybrid trunk cable comprising a plurality of power conductors and a plurality of optical fibers;
 a housing defining a cavity configured to house at least a portion of the hybrid trunk cable, the housing comprising:
  a back surface configured to mount to a mounting surface;
  a front surface opposite the back surface;
  a pair of one or more side surfaces disposed between the back surface and the front surface, wherein each of the pair of one or more side surfaces comprise a first side surface substantially orthogonal to the back surface and a second side surface disposed between the first side surface and the front surface; and
  a pair of opposed end surfaces;
 a plurality of connectors mounted on the housing and at least one of each of the plurality of power conductors and the plurality of optical fibers of the hybrid trunk cable coupled to a respective one of the plurality of connectors, wherein at least some of the plurality of connectors are disposed on the front surface, and wherein the plurality of connectors are disposed on the second side surfaces and the front surface; and
 a cable receiver extending from one of the pair of opposed end surfaces and configured to rout the hybrid trunk cable into the cavity of the housing.

14. The assembly enclosure of claim 13, wherein the plurality of connectors are offset from the cable receiver, and at least a portion of the pair of one or more side surfaces taper inward towards the end surface having the cable receiver and within the offset of the plurality of connectors.

15. The assembly enclosure of claim 13, wherein the plurality of connectors are arranged on the housing in a plurality of rows, each row having three connectors.

16. An assembly enclosure for breaking out a hybrid trunk cable having a plurality of power conductors and a plurality of optical fibers, wherein the assembly enclosure comprises:
 a base having a generally flat surface adapted for mounting to a mounting surface;
 a shell mounted to the base to form a cavity configured to house at least a portion of the hybrid trunk cable, wherein the shell comprises:
  a front wall, wherein the front wall comprises a middle section disposed between two oblique sections;
  a pair of side walls extending from opposite sides of the front wall, wherein the pair of side walls are disposed about 90 degrees relative to the base, and wherein each of the two oblique sections extend from a corresponding side wall of the pair of side walls; and
  a pair of opposed end walls;
 a plurality of connectors mounted on the shell and adapted to couple to the plurality of power conductors and the plurality of optical fibers of the hybrid trunk cable, wherein at least some of the plurality of connectors are disposed on the front wall, and wherein at least some of the plurality of connectors are disposed on the middle section and at least some of the plurality of connectors are disposed on each of the two oblique sections; and
 a cable receiver extending from one of the pair of end walls and adapted to rout the hybrid trunk cable into the cavity of the assembly enclosure.

17. The assembly enclosure of claim 13, wherein at least one of the second side surfaces or front surface includes a flat surface on which the plurality of connectors are mounted.

18. The assembly enclosure of claim 16, wherein the plurality of connectors are offset from the cable receiver, and at least a portion of the pair of one or more side walls taper inward towards the end wall having the cable receiver and within the offset of the plurality of connectors.

19. The assembly enclosure of claim 16, wherein the plurality of connectors are arranged on the shell in a plurality of rows, each row having three connectors.

20. The assembly enclosure of claim 16, wherein at least one of the two oblique sections or middle section includes a flat surface on which the plurality of connectors are mounted.

* * * * *